(12) United States Patent
Parati

(10) Patent No.: US 12,483,101 B2
(45) Date of Patent: Nov. 25, 2025

(54) METHOD FOR THE MAKING OF A STATOR FOR ELECTRIC MOTORS, AND RESPECTIVE STATOR FOR ELECTRIC MOTORS

(71) Applicant: MARSILLI S.p.A., Castelleone (IT)

(72) Inventor: Gian Battista Parati, Castelleone (IT)

(73) Assignee: MARSILLI S.p.A., Castelleone (IT)

( * ) Notice: Subject to any disclaimer, the term of this patent is extended or adjusted under 35 U.S.C. 154(b) by 205 days.

(21) Appl. No.: 18/558,933

(22) PCT Filed: Mar. 21, 2022

(86) PCT No.: PCT/IB2022/052530
§ 371 (c)(1),
(2) Date: Nov. 3, 2023

(87) PCT Pub. No.: WO2022/234354
PCT Pub. Date: Nov. 10, 2022

(65) Prior Publication Data
US 2025/0079952 A1 Mar. 6, 2025

(30) Foreign Application Priority Data
May 6, 2021 (IT) .......................... 102021000011528

(51) Int. Cl.
*H02K 15/043* (2025.01)
*B21F 3/02* (2006.01)
(Continued)

(52) U.S. Cl.
CPC ........... *H02K 15/0431* (2025.01); *B21F 3/02* (2013.01); *H02K 3/28* (2013.01); *H02K 15/06* (2013.01); *H02K 15/066* (2013.01)

(58) Field of Classification Search
CPC ...... H02K 15/0431; H02K 3/28; H02K 15/06; H02K 15/066; H02K 1/148; H02K 15/065; B21F 3/02
See application file for complete search history.

(56) References Cited

U.S. PATENT DOCUMENTS 3,686,735 A * 8/1972 Hill ..................... H02K 15/068
140/92.1
5,062,200 A * 11/1991 Lanfranco ............ H02K 15/021
29/281.1

(Continued)

FOREIGN PATENT DOCUMENTS

CA 3215984 A1 * 11/2022 ............... H02K 3/28
CN 102812620 A * 12/2012 ......... H02K 15/0431

(Continued)

OTHER PUBLICATIONS

International Search Report and Written Opinion of the International Searching Authority, issued Aug. 16, 2022 in International Patent Application No. PCT/IB2022/052530 filed Mar. 21, 2022.

*Primary Examiner* — Pedro J Cuevas
(74) *Attorney, Agent, or Firm* — Ryan D. Jenlink; Conley Rose, P.C.

(57) ABSTRACT

A method for the making of a stator for electric motors, comprising: providing two jigs, each having a circular opening inside the jig and a series of teeth inside the circular opening extending towards a central axis, the teeth defining a series of slots; arranging the two jigs coaxially spaced along a central axis; winding, between the teeth, a plurality of wires to form a plurality of windings, so the wires of each winding occupy a plurality of the slots of both jigs, the windings including linear wire portions extending between the two jigs; inserting, from the inside, a plurality of first stator portions between the linear wire portions; and inserting, from the outside, a plurality of second stator portions (Continued)

complementary to the first stator portions between the linear wire portions, to form a stator body.

15 Claims, 43 Drawing Sheets

(51) Int. Cl.
*H02K 3/28* (2006.01)
*H02K 15/06* (2025.01)
*H02K 15/066* (2025.01)

(56) References Cited

U.S. PATENT DOCUMENTS

| | | | | |
|---|---|---|---|---|
| 6,229,241 | B1* | 5/2001 | Ishigami | H02K 3/28 |
| | | | | 310/216.069 |
| 7,275,299 | B2* | 10/2007 | Kuroyanagi | H02K 15/24 |
| | | | | 29/736 |
| 7,467,648 | B2* | 12/2008 | Hashimoto | H02K 15/043 |
| | | | | 140/71 C |
| 7,923,883 | B2* | 4/2011 | Yamaguchi | H02K 15/067 |
| | | | | 310/179 |
| 8,832,925 | B2* | 9/2014 | Mishina | H02K 15/067 |
| | | | | 29/596 |
| 9,425,666 | B2* | 8/2016 | Ishigami | B60L 50/61 |
| 10,153,673 | B2* | 12/2018 | Tsuiki | H02K 15/066 |
| 10,742,101 | B2* | 8/2020 | Ohno | H02K 15/064 |
| 10,826,364 | B2* | 11/2020 | Hatch | H02K 15/0485 |
| 11,303,177 | B2* | 4/2022 | Tsujimori | H02K 15/12 |
| 11,545,881 | B2* | 1/2023 | Tominaga | H02K 15/0431 |
| 11,705,793 | B2* | 7/2023 | Luettge | H02K 15/064 |
| | | | | 310/216.057 |
| 11,742,732 | B2* | 8/2023 | Ohashi | H02K 15/062 |
| | | | | 29/596 |
| 11,996,745 | B2* | 5/2024 | Ohashi | H02K 1/165 |
| 12,244,195 | B2* | 3/2025 | Hikima | H02K 3/345 |
| 12,301,077 | B2* | 5/2025 | Ohashi | H02K 3/345 |
| 2005/0005422 | A1* | 1/2005 | Kuroyanagi | H02K 15/0431 |
| | | | | 29/596 |
| 2006/0230604 | A1* | 10/2006 | Hashimoto | H02K 15/043 |
| | | | | 29/748 |
| 2007/0143983 | A1* | 6/2007 | Yamaguchi | H02K 15/067 |
| | | | | 29/598 |
| 2007/0261229 | A1* | 11/2007 | Yamaguchi | H02K 15/066 |
| | | | | 29/596 |
| 2008/0258570 | A1* | 10/2008 | Yamaguchi | H02K 15/067 |
| | | | | 310/208 |
| 2013/0000105 | A1* | 1/2013 | Hasegawa | H02K 15/0428 |
| | | | | 29/596 |
| 2013/0009509 | A1* | 1/2013 | Tsuge | H02K 3/14 |
| | | | | 310/201 |
| 2014/0042862 | A1* | 2/2014 | Ishigami | H02K 3/12 |
| | | | | 310/187 |
| 2017/0179780 | A1* | 6/2017 | Tsuiki | H02K 15/24 |
| 2017/0317565 | A1* | 11/2017 | Hatch | H02K 15/066 |
| 2019/0020239 | A1* | 1/2019 | Tsujimori | H02K 3/12 |
| 2019/0190359 | A1* | 6/2019 | Miyawaki | H02K 3/04 |
| 2020/0220438 | A1* | 7/2020 | Ide | H02K 3/345 |
| 2022/0286029 | A1* | 9/2022 | Ohashi | H02K 1/165 |
| 2022/0302806 | A1* | 9/2022 | Ohashi | H02K 15/066 |
| 2022/0302807 | A1* | 9/2022 | Ohashi | H02K 15/066 |
| 2023/0155462 | A1* | 5/2023 | Hikima | H02K 15/22 |
| | | | | 29/596 |
| 2023/0155464 | A1* | 5/2023 | Hikima | H02K 15/066 |
| | | | | 29/732 |
| 2023/0163667 | A1* | 5/2023 | Ohashi | H02K 15/10 |
| | | | | 29/734 |
| 2023/0170773 | A1* | 6/2023 | Hikima | H02K 15/085 |
| | | | | 29/732 |
| 2023/0318414 | A1* | 10/2023 | Hikima | H02K 15/026 |
| | | | | 29/596 |
| 2023/0327508 | A1* | 10/2023 | Hikima | H02K 15/105 |
| | | | | 310/215 |
| 2025/0079952 | A1* | 3/2025 | Parati | B21F 3/02 |
| 2025/0088081 | A1* | 3/2025 | Hirota | H02K 15/066 |

FOREIGN PATENT DOCUMENTS

| | | | | |
|---|---|---|---|---|
| EP | 3661017 | A1 | 6/2020 | |
| EP | 3731373 | A1 | 10/2020 | |
| JP | 2007166849 | A * | 6/2007 | H02K 15/066 |
| JP | 2008271720 | A * | 11/2008 | H02K 15/067 |
| JP | 5130777 | B2 * | 1/2013 | H02K 15/067 |
| WO | 2020030195 | A1 | 2/2020 | |
| WO | 2022084760 | A1 | 4/2022 | |
| WO | WO-2022234354 | A1 * | 11/2022 | H02K 15/066 |

* cited by examiner

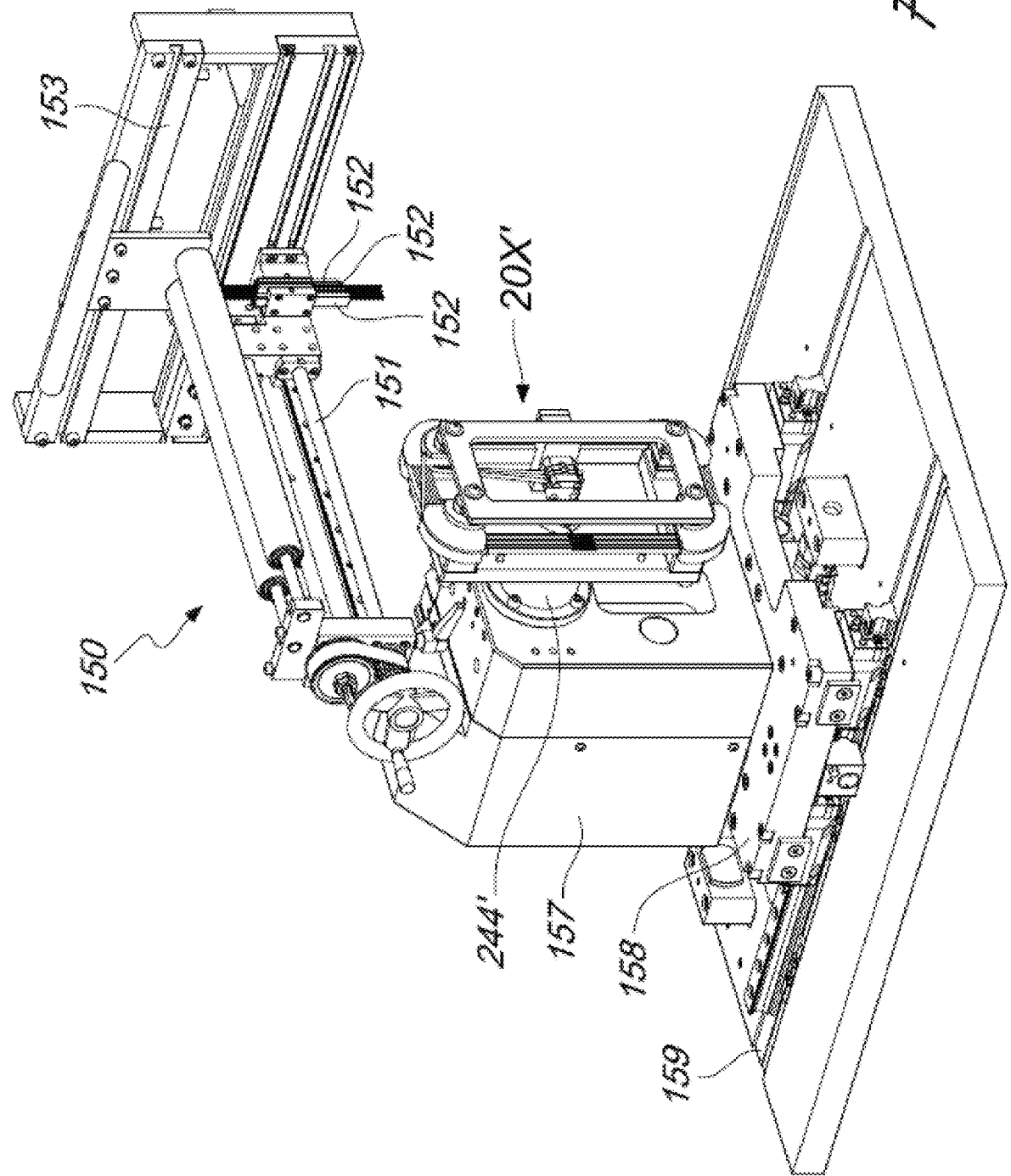

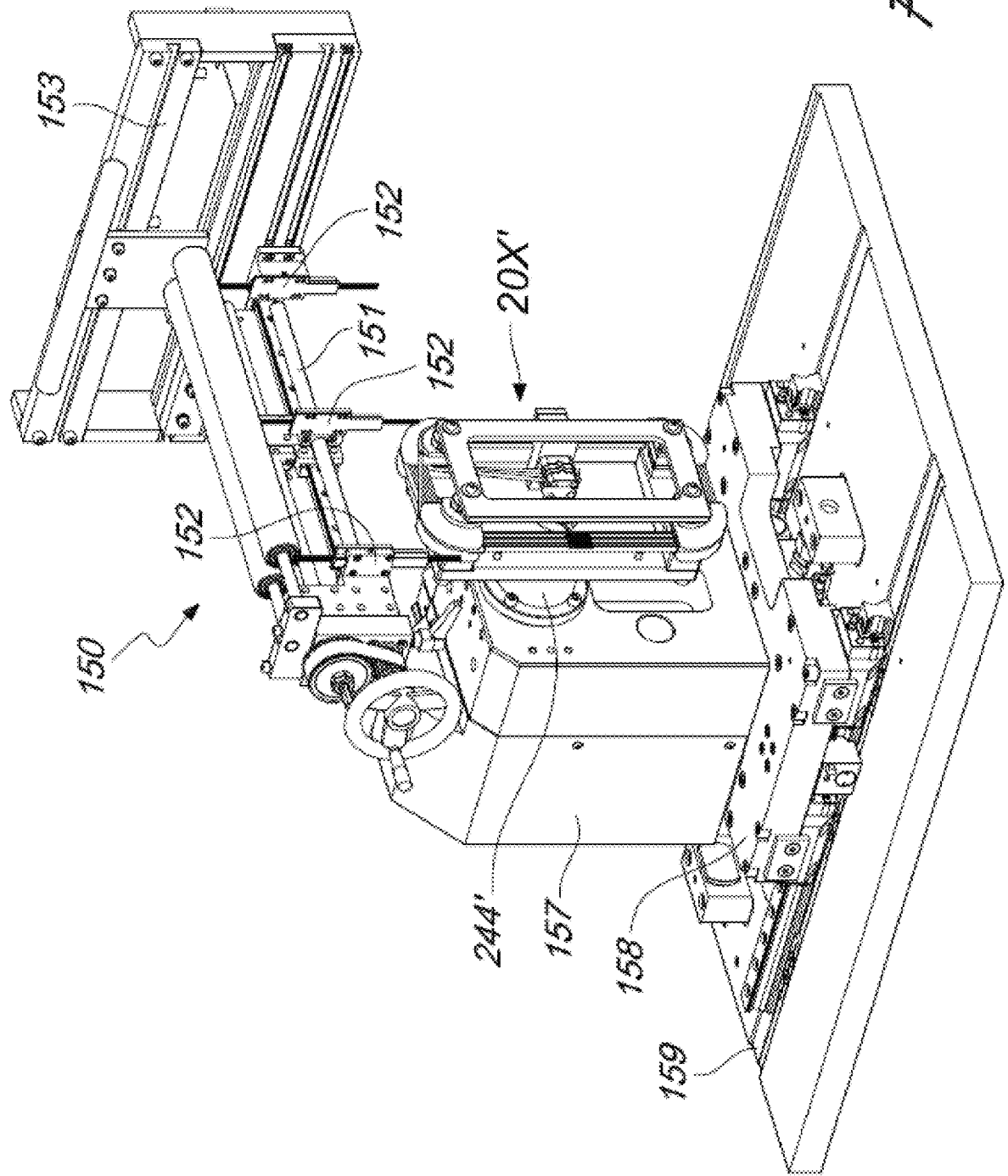

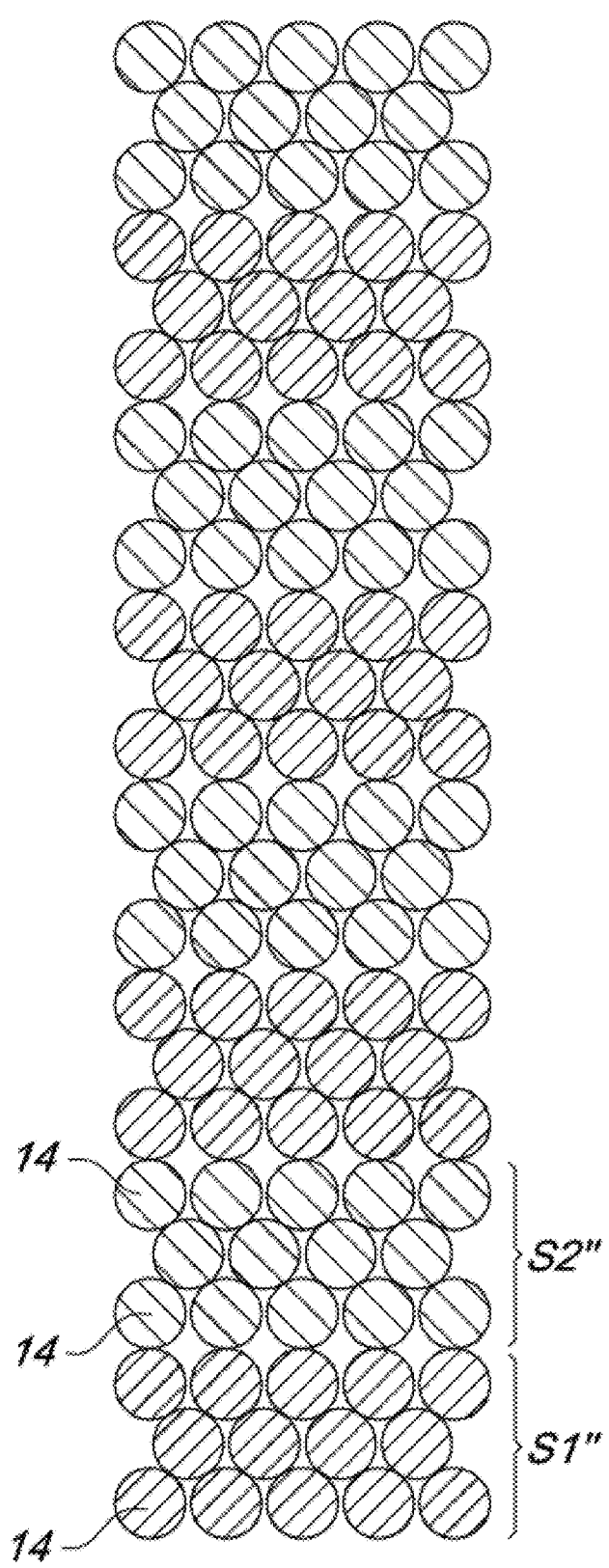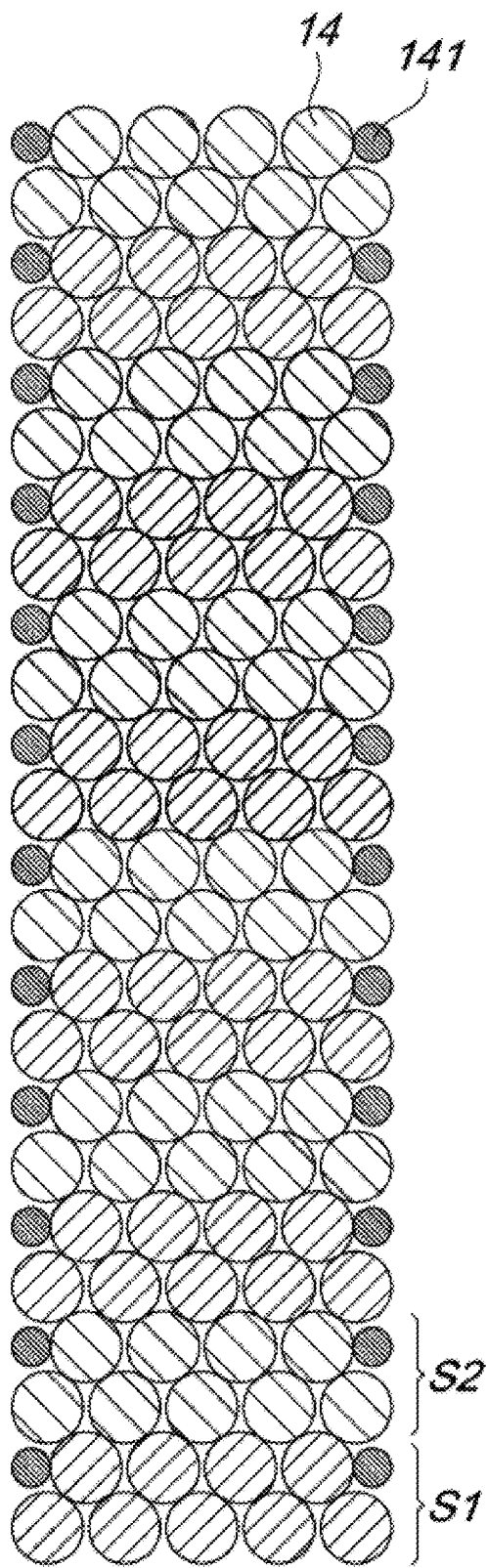

METHOD FOR THE MAKING OF A STATOR FOR ELECTRIC MOTORS, AND RESPECTIVE STATOR FOR ELECTRIC MOTORS

CROSS REFERENCE TO RELATED APPLICATIONS

This application is a filing under 35 U.S.C. 371 of International Application No. PCT/IB2022/052530, filed Mar. 21, 2022, entitled "Method for the Making of a Stator for Electric Motors, and Respective Stator for Electric Motors," which claims priority to Italian Patent Application No. 102021000011528, filed May 6, 2021, which is incorporated herein by reference in its entirety.

FIELD OF THE INVENTION

Objects of the present invention are a method for the making of a stator for electric motors, and a stator for electric motors manufactured according to such method.

STATE OF THE ART

As is known, the stators of electric motors are generally cylinder-shaped and comprise a plurality of stator poles formed by stator teeth arranged along the inner circumference of the cylinder and which are jutting out towards a common central axis.

One or more coils of conducting wires, also named windings, are placed between the stator teeth, and more precisely in the sectors constituted by the space between the same stator teeth.

Among the stators, there are the concentrated winding ones, in which the conducting wires are wound on an individual stator tooth, and the distributed winding ones, in which the conducting wires are wound on two or more teeth. The present invention particularly concerns the making of a distributed winding stator.

In the known art, in order to make a distributed winding stator, the cylindrical body of the stator is made by first assembling the teeth and—aside on the outside of the stator body—one or more windings of conducting wire which are then inserted into the sectors between the teeth of the already formed cylindrical body.

According to the patent application PCT/IB2021/057982, in the name of the Applicant, it is known to perform a step of pressing and/or carburizing (in the desired order) the linear wire portions of the windings before inserting them into the sectors between the teeth of the cylindrical body of the stator being formed.

This makes it necessary to have, between the ends of the teeth (named "pole shoes" in the technical field) of two adjacent teeth, an opening defined slot opening, sufficient enough to carry out the insertion of the windings.

Noise phenomena increase as the distance between the pole shoes increases, or as the slot opening increases, in particular torque ripple phenomena (also known as torque ripple and cogging), with a consequent drop in performance and increased vibrations and noise, and this is thus an aspect of the known art which can be improved.

An improvement of the filling factor of the sectors is also desirable in this type of stators, i.e. being able to insert a greater number of conducting wires, or the same number of wires of greater diameter, into the same sector, since this would improve the performance of the electric motor. The filling factor is defined as the ratio between the surface of the cross section occupied by conducting wires inside a stator slot with respect to the total area available (always considered in cross section) in the stator slot.

Moreover, a limit of these stators of the known type consists in the fact that, after having inserted the windings into the stator, the individual loops composing the winding are arranged such as some loops are always positioned towards the center of the stator and others always towards the outside of the stator and this involves an increase in the leakage currents of the motor and thus a consequent drop in the efficiency of the motor itself.

It is further desirable to be able to minimize the axial volumes of the stators, with equal performance, in order to achieve more compact and light electric motors with respect to those currently available.

SUMMARY OF THE INVENTION

Task of the present invention is to provide a method for the making of a stator for electric motors which overcomes the draw backs and exceeds the limits of the known art, in one or more of the aspects set forth above.

To achieve this task, an object of the present invention is to implement a method for the making of a stator which allows to achieve a stator for electric motors which improves the performance of the motor, in particular in terms of efficiency and/or performance and/or vibrations and/or noise.

A further object of the present invention is to implement a method for the making of a stator which allows to improve the filling factor of the sectors inside the stator.

A further object of the present invention is to implement a method for the making of a stator which allows to reduce the torque ripple (torque ripple and cogging) phenomena.

Another object of the present invention is to implement a method for the making of a stator which is easy to make and economically convenient with respect to the known art.

The task set forth above, as well as the objects mentioned and others which will become clearer hereunder, are achieved by a method according to claim 1 for the making of a stator for electric motors which comprises a stator body, which in turn comprises a plurality of stator teeth arranged radially about a common central axis and which define, between them, sectors in which one or more windings of conducting wire is/are at least partially inserted.

In particular, the method provides to have two jigs, each of which has an inner circumference defining a circular opening inside the jig and a series of teeth arranged along the inner circumference and jutting out inside the circular opening towards a common central axis Y. The teeth define, between them, a series of slots intended to accommodate a winding portion.

The two jibs are arranged coaxially, centered on the common central axis Y and spaced in height along the central axis Y. The spacing of the jigs on the central axis Y is equivalent to the height of the coils, in the sense that it corresponds to the length of the straight portions of the windings.

A plurality of windings of conducting wires is arranged between the teeth of the jigs, such as the conducting wires of each winding occupy a plurality of the slots of both jigs. The windings comprise linear wire portions extending between the two jigs, preferably linear portions that were pressed and carburized.

Once a stator skeleton has been made, with the two jigs supporting the windings such as the respective linear portions extend parallel to the central axis Y, between the slots of the jigs, the finishing of the stator proceeds by encapsulating the linear portions of the windings as will be now be explained.

Thus, a plurality of first stator portions is inserted, from the inside, between the linear wire portions.

A plurality of second stator portions complementary to the first stator portions is inserted, from the outside, between the linear wire portions, such as the joining of said first and second stator portions forms a stator body which includes the linear wire portions inside separate sectors which are defined between said first and second stator portions.

For the purposes of the present invention, it is irrelevant which stator portions, whether firsts or seconds, are inserted first between the linear portions of winding that extend between the jigs. The method can be implemented by starting with the insertion of the first stator portions, from the inside towards the outside in the radial direction, followed by the insertion of the second stator portions, from the outside towards the inside in the radial direction, or vice-versa.

This makes it such as the linear portions of the windings remain encapsulated between the first stator portions and the second stator portions which, as will be described, are joined, for example welded.

A second aspect of the present invention concerns a stator directly formed with the method described.

Simulations performed by the Applicant show that the stator obtained with the method described herein involves lower production costs and has greater efficiency and reduced torque ripple phenomena compared to a stator with the same characteristics obtained with a traditional method of filling the sectors between the teeth, over a wide speed range.

BRIEF DESCRIPTION OF THE FIGURES

Further characteristics and advantages will become clearer from the description of a preferred, but not exclusive, embodiment of the method for the making of a stator, depicted by way of example and without limitations with the aid of the accompanying drawings, in which:

FIGS. 28 and 29 are perspective views of a part of a second possible embodiment of a winding tool according to the present invention;

FIGS. 30a, 30b and 30c are sectional views of the loops of different possible types of coils;

FIGS. 31a, 31b and 31c are sectional views of the loops of different types of coils according to an optional solution;

DETAILED DESCRIPTION OF THE INVENTION

Figure 1A:
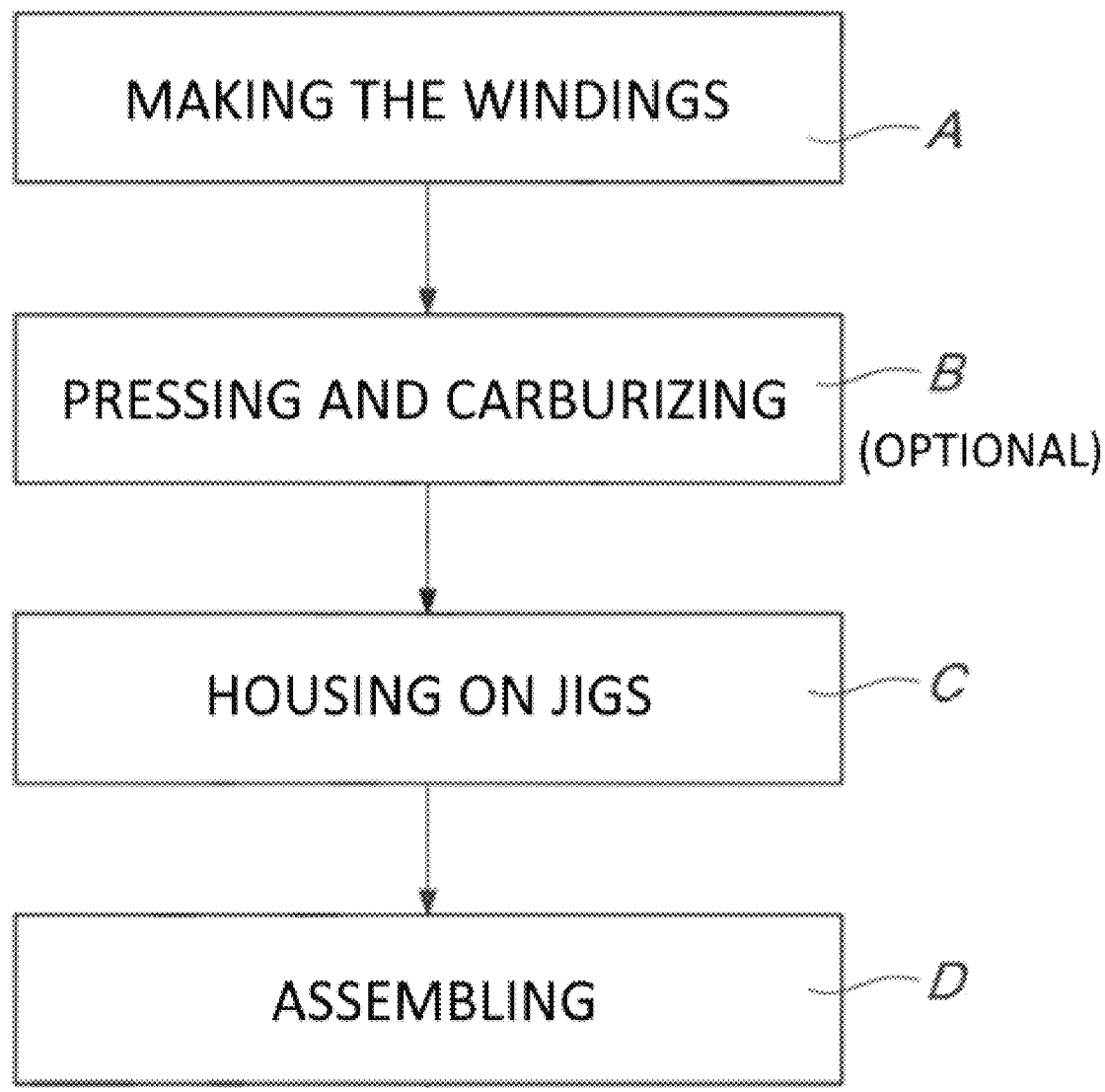
FIG. 1a is a flow diagram which shows the main steps of the method according to the present invention.

In its essential aspects, the method comprises the following steps, as shown in the flow diagram of FIG. 1a: a winding making step A, an optional pressing and/or carburizing step B, a step C of housing the winding on jigs, an assembling step D.

Figure 7:
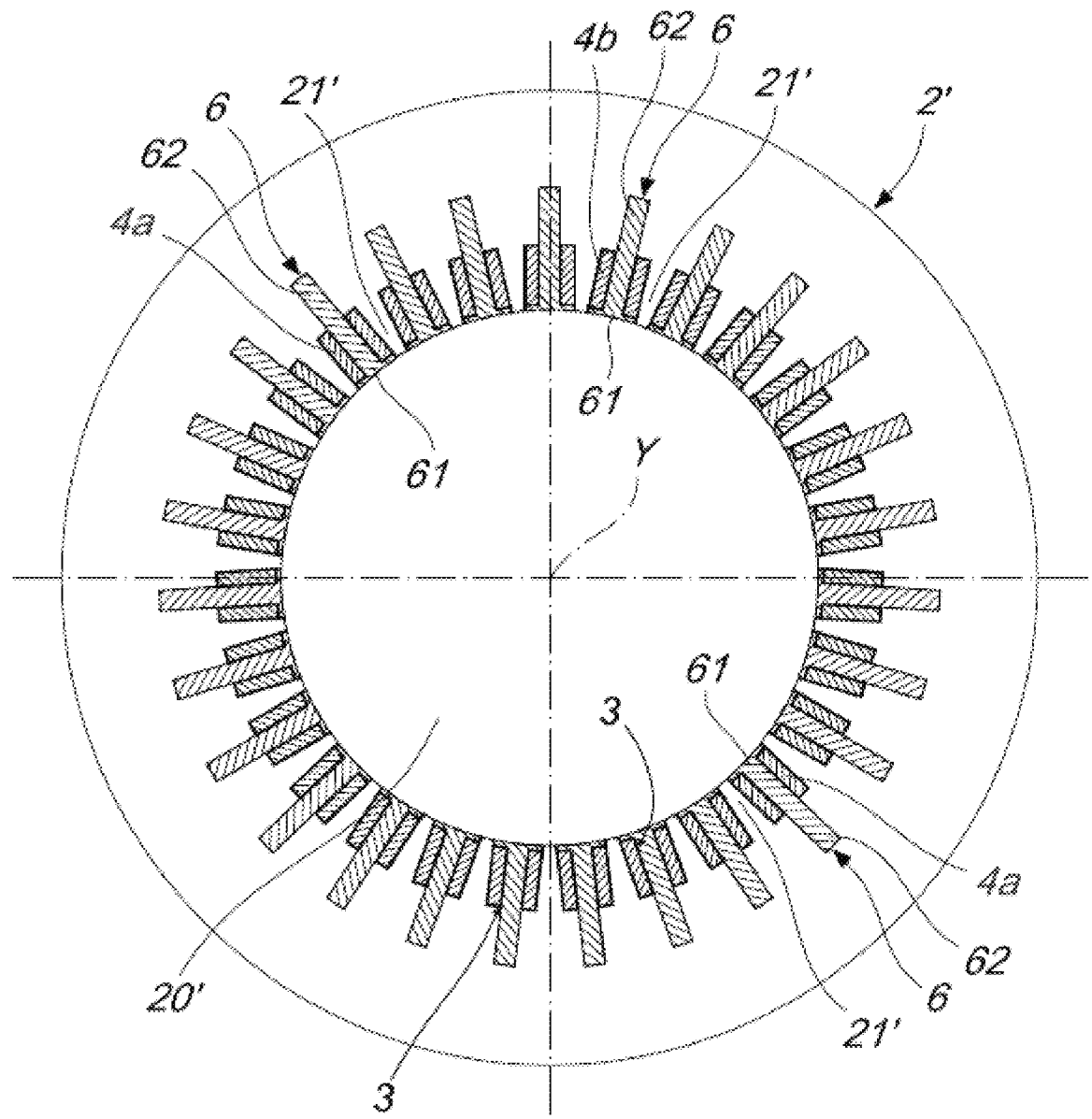
FIG. 7 is a sectional view; along a plane parallel to one of the jigs, of the image of FIG. 6.

With reference to the figures mentioned, the method aims to make a stator for electric motors, in particular a distributed-winding stator of the type comprising a stator body 10 which in turn comprises a plurality of stator teeth arranged radially about a common central axis Y, which jut out towards such central axis Y. Such teeth define, between them, a plurality of sectors 3 (i.e. of spaces delimiting the linear portions 4a, 4b of the windings 4) in which one or more windings 4 of conducting wire 14 are at least partially inserted, as visible in FIGS. 7-9.

More in detail, as known, the substantially straight portions 4a, 4b of longitudinal extent of the windings 4, i.e. of the conducting (electrically conducting) wires 14 henceforth named "linear portions" 4a, 4b, are housed in the sectors 3.

Figure 2:
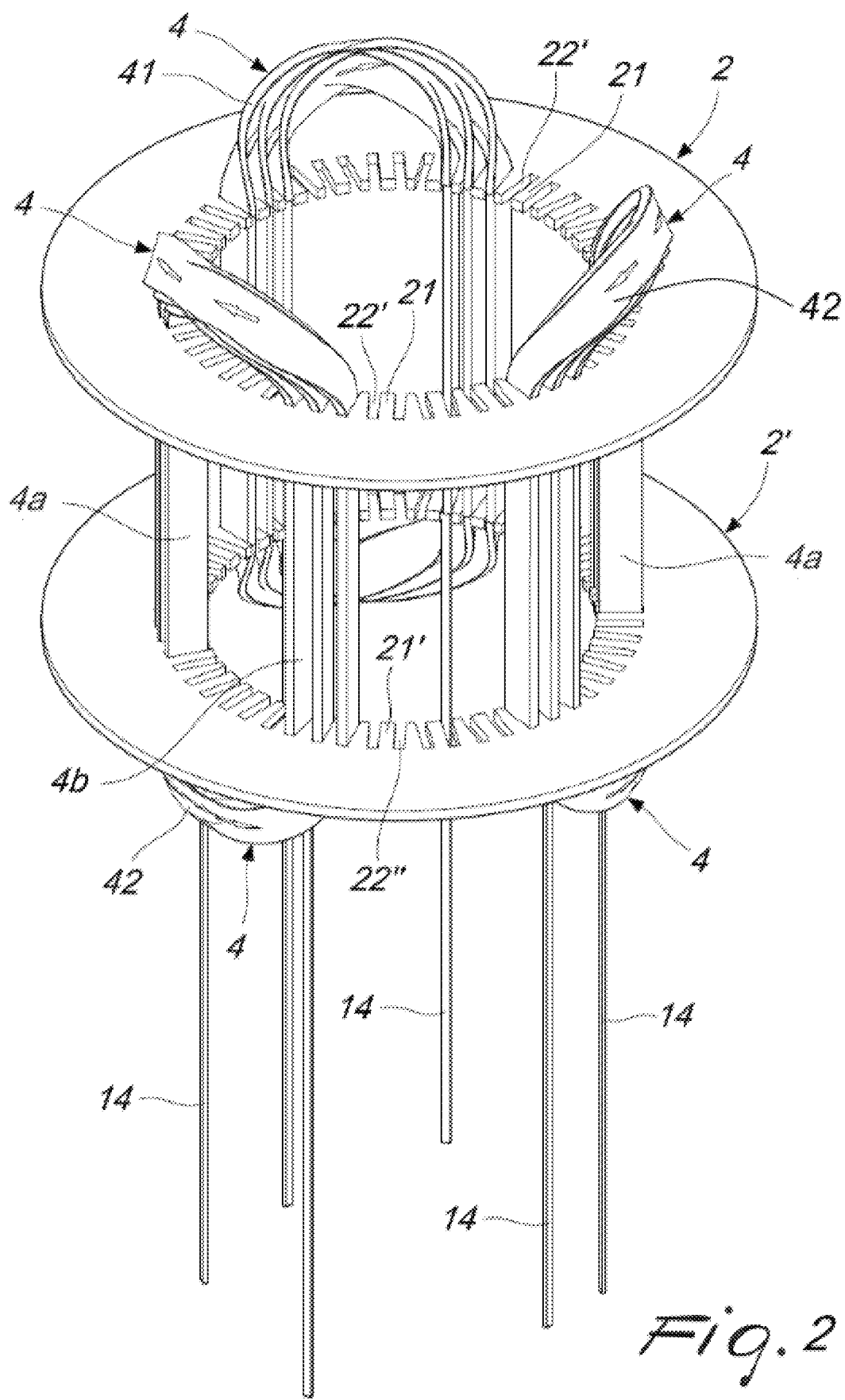
FIGS. 2, 3 and 4 depict, in perspective, successive steps of the winding stage of wires on the jigs of FIG. 1b for making the windings, in a possible embodiment of the method according to the present invention.
Figure 3:
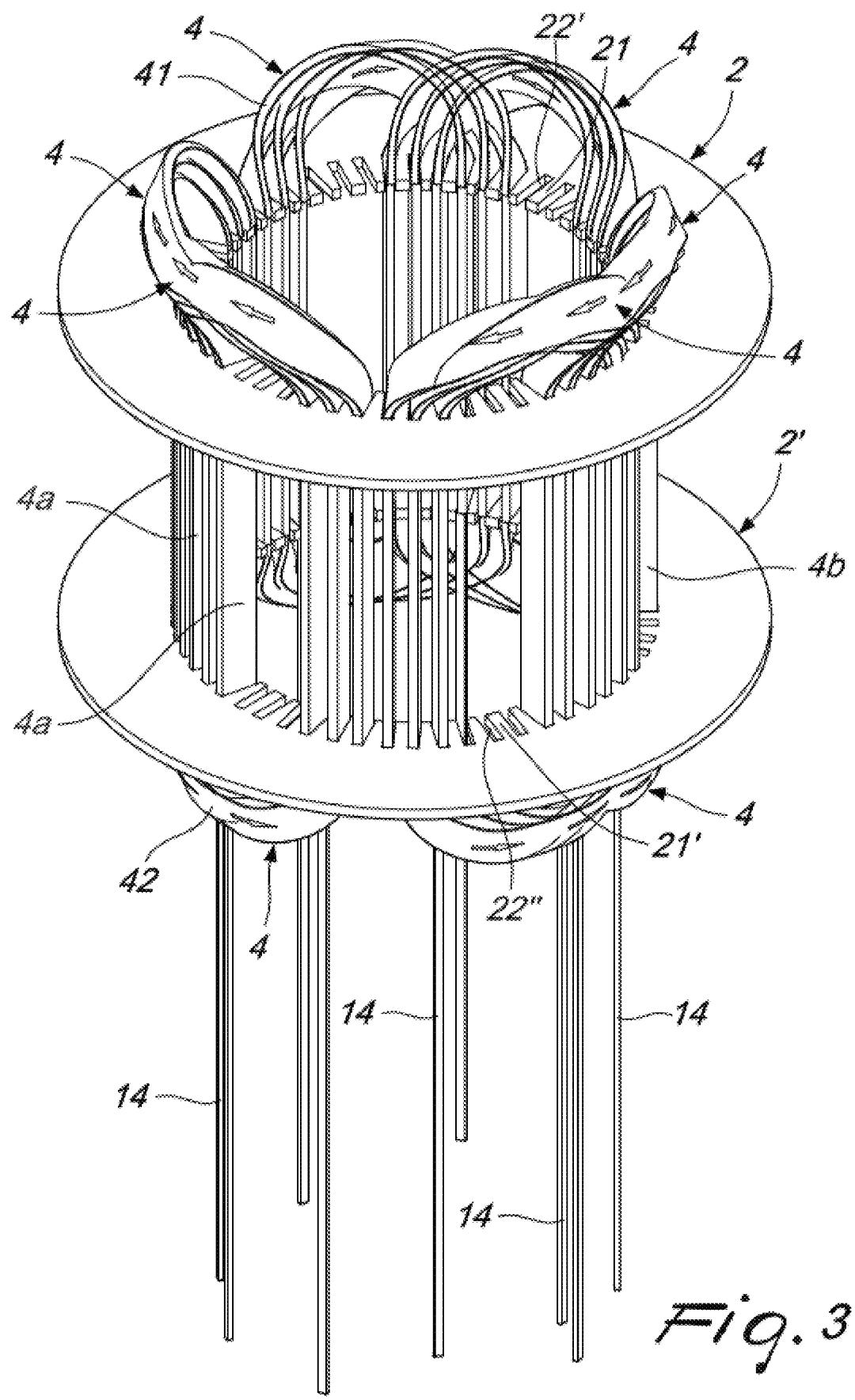
Figure 4:
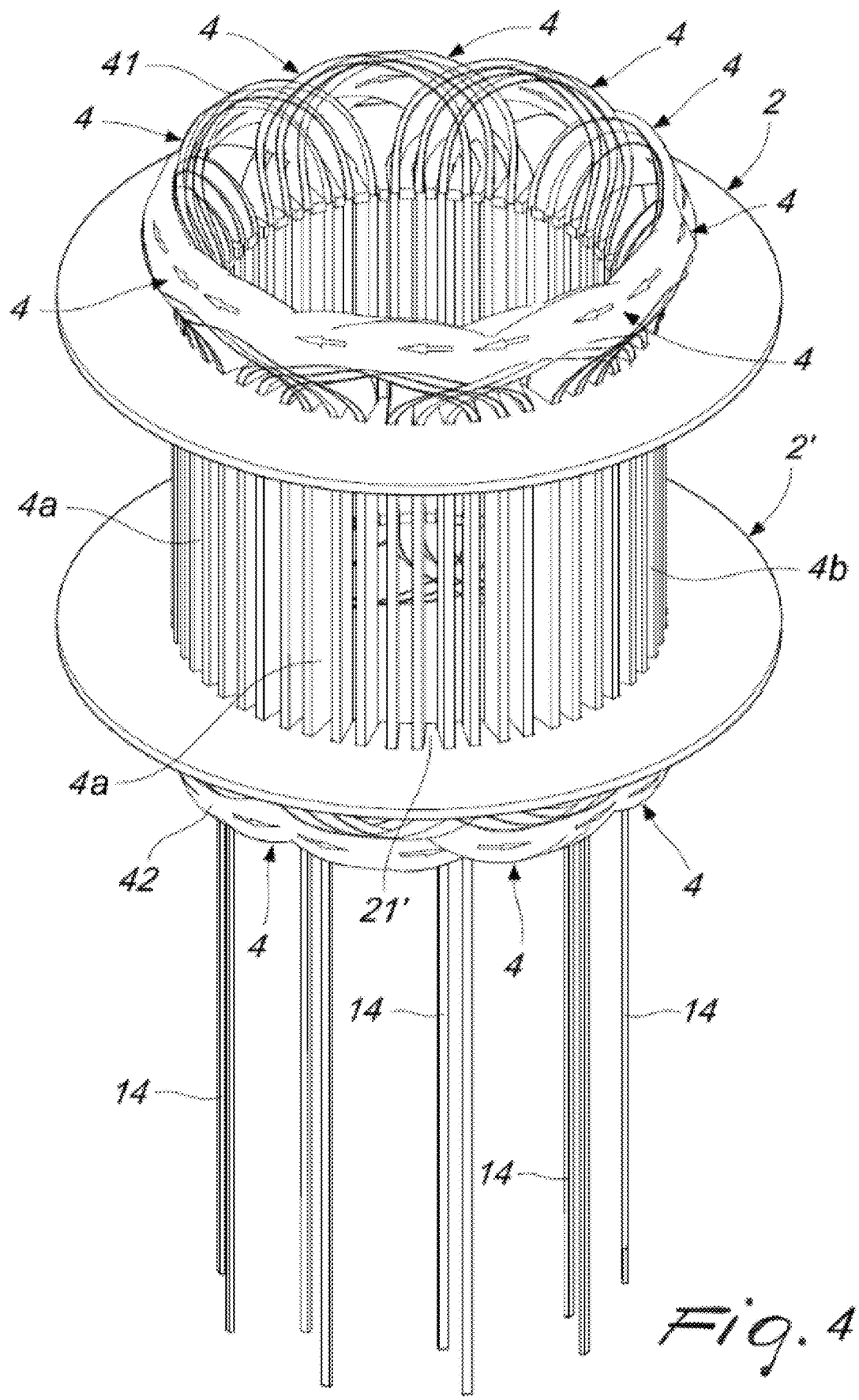
Figure 5:
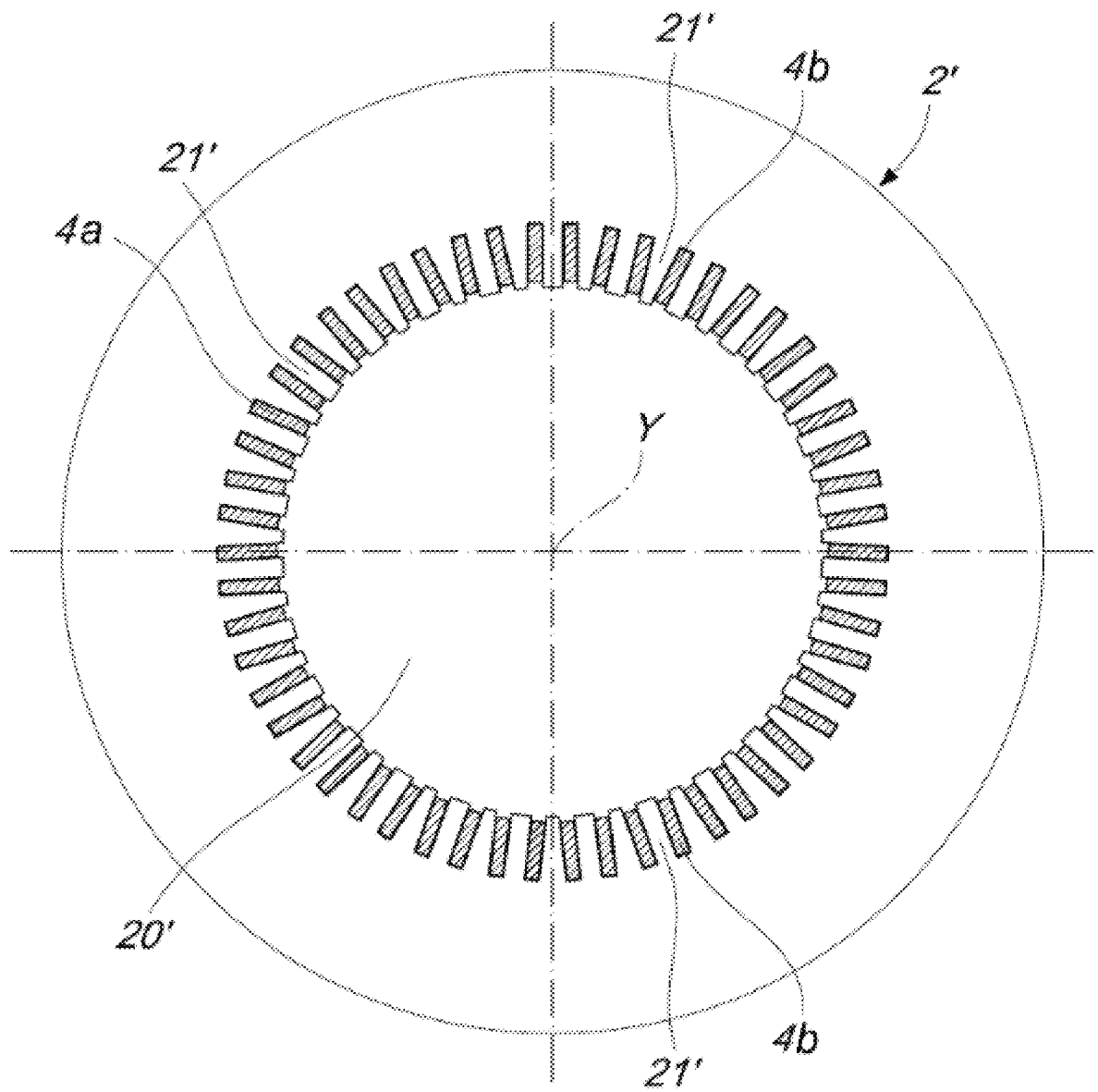
FIG. 5 is a sectional view; along a plane parallel to one of the jigs, of the image of FIG. 4.
Figure 6:
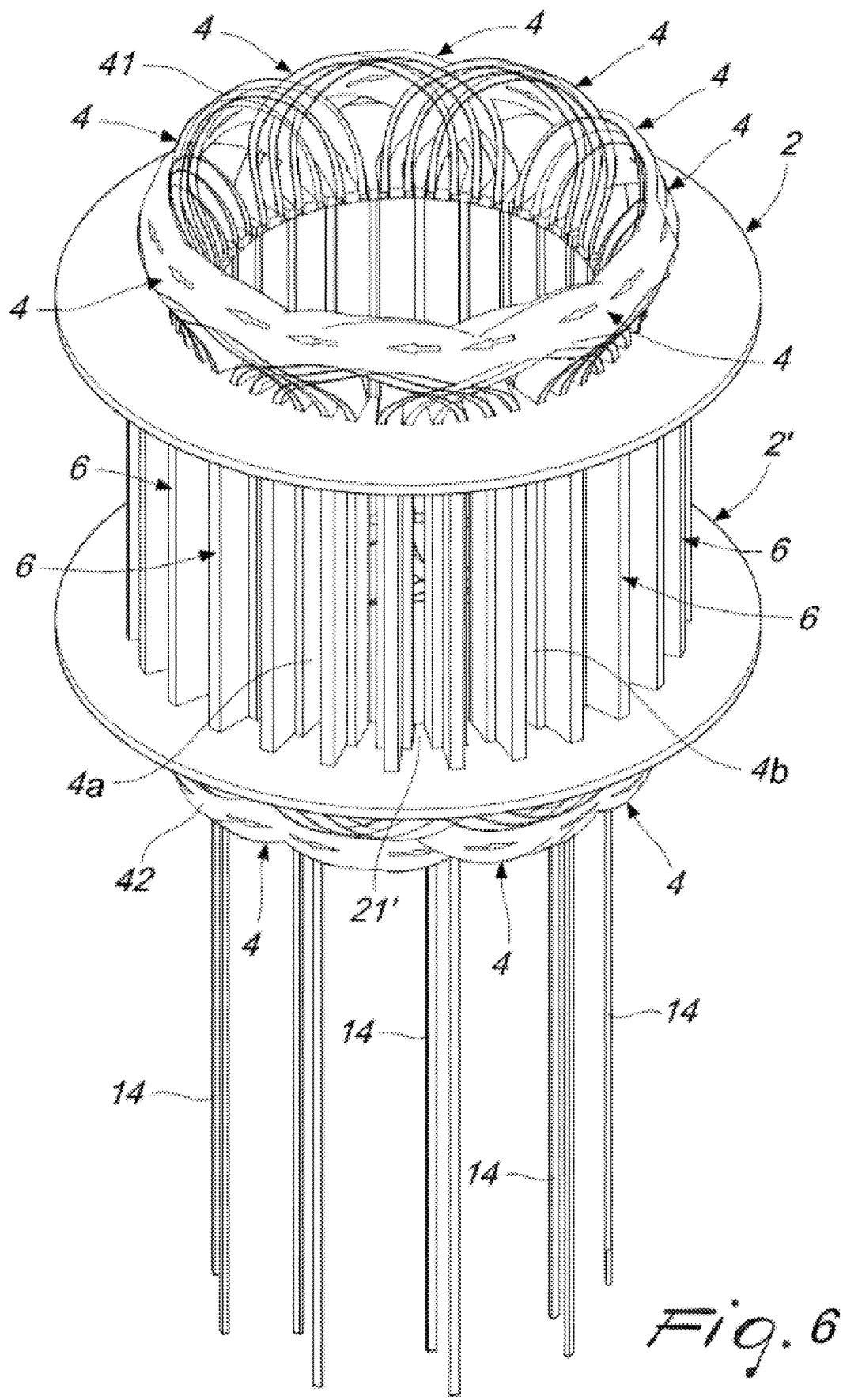
FIG. 6 shows the conclusion of the inserting stage of the first stator portions.

The method comprises the following steps which will be described in detail hereunder: arranging two jigs 2, 2' provided with inner teeth 21, 21', coaxially aligned and spaced from each other in height (FIG. 1b) (step A); winding a plurality of conducting wires 14 between the teeth 21, 21' of the jigs 2, 2', such as to form a plurality of windings 4 (FIGS. 2-4), or arranging the windings 4 on a winding tool and successively positioning them on the jigs 2, 2' (step C); in the desired order, inserting, from the inside, a plurality of first stator portions 6 and inserting, from the outside, a plurality of second stator portions 7 complementary to the first stator portions 6, such as to encapsulate the linear portions 4a, 4b and to form the finished stator body 10 (FIGS. 5-9) (step D).

Figure 1B:
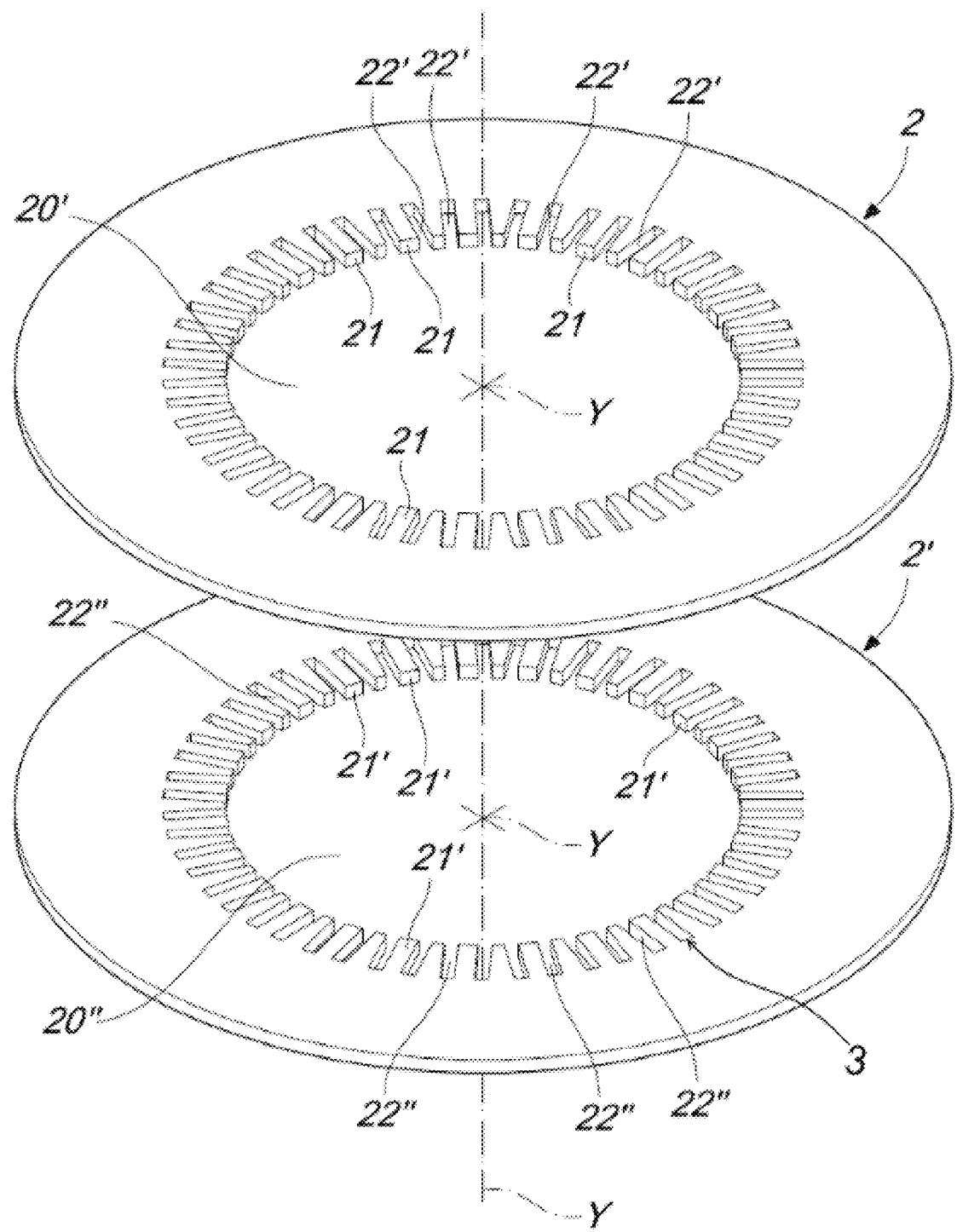
FIG. 1b is a perspective view of two jigs used in the method according to the present invention.

More in detail, in order to implement the method, it is necessary to provide two jigs 2, 2' (i.e. appropriately shaped elements adapted to act as a reference and to hold the conducting wires 14 in position), such as for example those depicted in FIG. 1b. Preferably, these jigs 2, 2' are substantially shaped like a circular crown in plan, but the shape of the outer profile can possibly vary according to the requirements.

Each of the jigs 2, 2' delimits an inner circumference defining a circular opening 20', 20" inside the jig 2, 2' itself; a series of teeth 21, 21' radially juts out towards a common central axis Y so that the teeth 21, 21' are arranged along such inner circumference.

In other words, such teeth 21, 21' jut out inside the circular opening 20', 20" towards a common central axis Y and define, between them, a series of slots, or recesses, or slits 22', 22".

In practice, these slots 22', 22" are configured to substantially correspond, in terms of shape and position, to the three sectors 3 of the stator body 10 of the stator to be made (i.e. the spaces between the stator teeth that house the conducting wires).

The method provides to arrange the two jigs 2, 2' coaxially, centered along a same common central axis Y and spaced in height along such central axis Y, in practice, like the two bases of an ideal cylinder.

Thus proceeding with a step A of winding a plurality of conducting wires 14 between the teeth 21, 21' of the jigs 2, 2', such as to form a plurality of windings 4 (i.e. of coils of conducting wires 14). These conducting wires 14 are wound such as the conducting wires 14 of each winding 4 occupy a plurality of slots 22', 22" of both jigs 2, 2'. The so-formed windings 4 thus comprise linear conducting wire portions 4a, 4b extending between the two jigs 2, 2", parallel to the central axis Y, and which are connected, on top and below; by non linear wire portions 42. The linear conducting wire portions 4a, 4b thus stay arranged circumferentially about the central axis Y, parallel to the axis Y, at a regular pitch corresponding to the pitch of the slots 22', 22".

Preferably, in this step, each winding 4 is made such as to comprise a first and a second linear portion 4a, 4b, parallel to each other and connected by non linear portions 42, which first and second linear portions 4a, 4b are each inserted into a different slit 22', 22" for each jig 2, 2.

Preferably, each winding 4 is formed by a plurality of conducting wires 14.

In general, each coil is made with one, or two or more wires 14 in parallel, such as to obtain windings 4 consisting for example of: one hundred loops made of only one wire 14, or fifty loops made of two wires in parallel, or ten loops made of ten wires 14 in parallel, etc.

Obviously, the number of wires 14 wound in parallel per each loop, the number of levels and the number of wires 14 per level can vary and be selected depending on the project requirements.

Even more in detail, in general: each loop can be formed by 1, 2, n layers; or each layer can be formed by 1, 2, n wires 14.

The number of wires of a layer can be equal to or different from the number of wires of the successive layer.

With reference to FIGS. 12-22, alternatively to winding the conducting wires 14 directly on the jigs 2, 2', the step A of making the windings 4 can be performed by winding one or more conducting wires 14 on a winding tool 20X, such as to form at least one winding 4 comprising at least one linear portion 4a, 4b, wherein each linear portion 4a, 4b in turn comprises a plurality of individual linear portions of wire and is intended to be inserted into one of the slots 22', 22" described above.

In this case, the step A is followed by a step C of housing the winding 4, schematically depicted in FIG. 1a, during which the linear portion 4a, 4b of the windings 4 is inserted into the slots 22', 22" after the winding 4 has been withdrawn from the winding tool 20X.

FIGS. 12-22 show a winding tool 20X adapted to make the windings 4 in detail.

Obviously, the number of conducting wires 14 wound in parallel per each loop (and thus of wire tensioning devices 203), the number of levels (and thus of ducts 251 in the wire guiding tube 204) and the number of conducting wires 14 per level can be varied and be selected depending on the project requirements.

Figure 23:
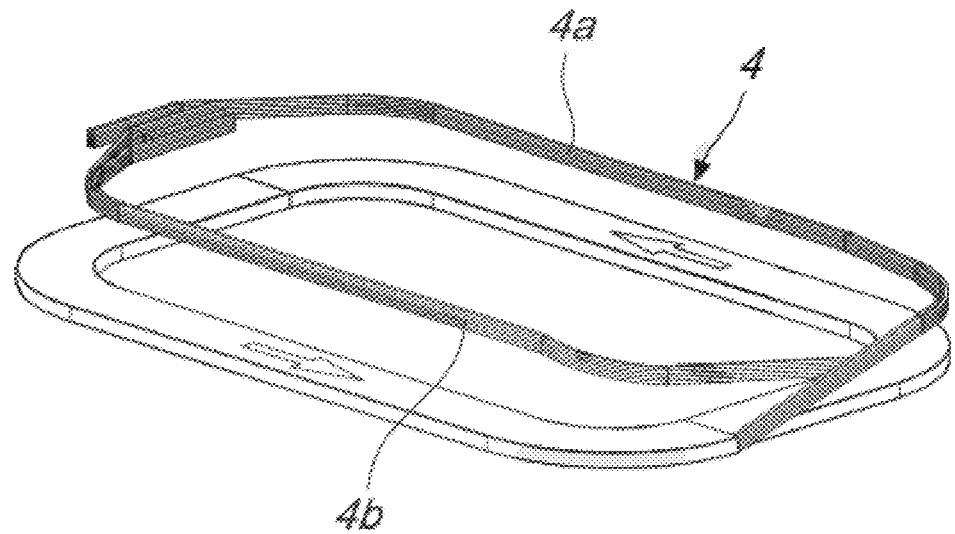
FIG. 23 is a perspective view of the winding made in the winding making step of the method.
Figure 24:
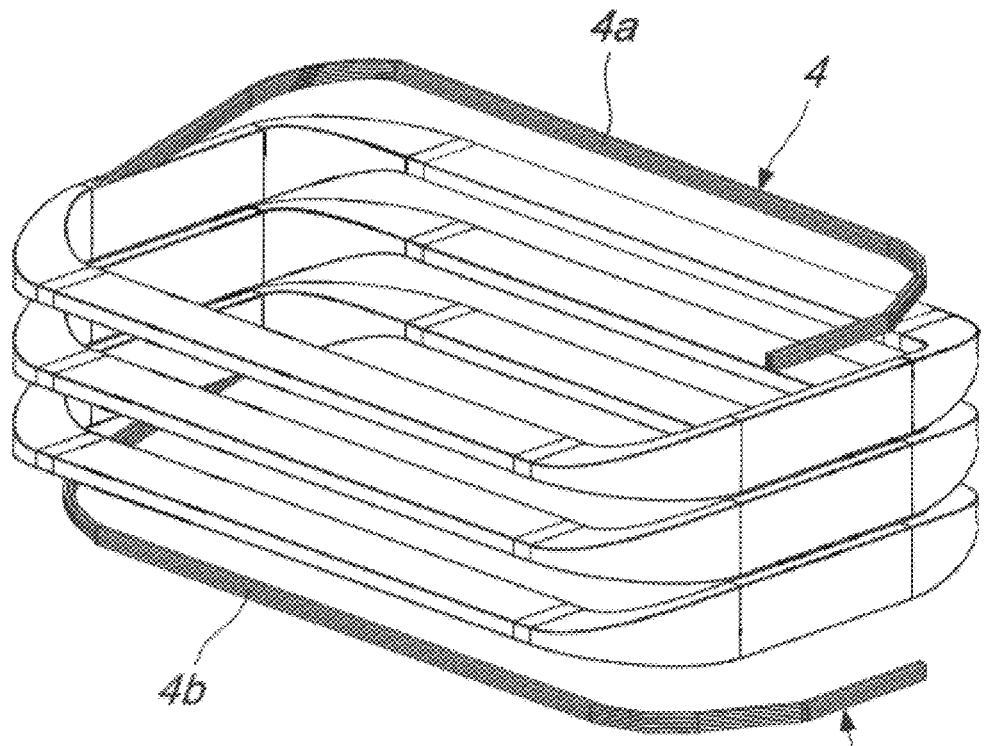
FIG. 24 is a perspective view of a plurality of windings made in the winding making step.

Only one winding 4 (as in FIG. 23) or a plurality of windings 4 in series (as in FIG. 24), depending on the implementation choices, can be wound on the winding tool 20X.

The winding is performed with one, or two or more wires in parallel, such as to obtain windings 4 consisting for example: of one hundred loops made of only one wire 14, or fifty loops made of two wires in parallel, or ten loops made of ten wires 14 in parallel, etc.

The winding tool 20X preferably comprises a plurality of movable walls 22 comprised between an anchoring wall 23 and a removable disassembly wall 24.

The anchoring wall 23 is configured to be coupled operatively to a winding spindle 244 such as to drive the rotation of the movable walls 22 and optionally comprises, for this purpose, a sleeve for hooking to the spindle 25.

The removable disassembly wall 24 can be decoupled from the anchoring wall 23 to release the movable walls 22 and allow the displacement of the windings 4 wound.

The movable walls 22 form one or more winding chambers inside which the conducting wires 14 are wound to form the windings 4.

More in detail, in the preferred embodiment depicted, the anchoring wall 23 further comprises a wire clamp 26 configured to clamp the incoming wires 14 (which are already arranged in the proper configuration) to the winding.

Conveniently, the anchoring wall 23 is further provided with a centering pin 27 to center the movable walls 22, which centering pin juts out towards the removable wall 24 and engages a tunnel formed by central holes 28 which are obtained at the center of each movable wall 22.

A hooking end 271, for the hooking of the hooking wall 24 to the removable wall 24, is present at the end of the centering pin 27.

Advantageously, the hooking wall 23 is further provided with a plurality (four in the example depicted) of axial positioning pins 231 also jutting out towards the removable wall 24 and which have the task of keeping the proper axial position of the movable walls 22 during the winding, by occupying respective positioning holes 29 obtained in the movable walls 22, such as to ensure the proper dimension of the winding chambers.

As can be noted from the figures, the axial positioning pins 231 are formed by a plurality of longitudinal portions of different and decreasing diameters towards the removable wall 24, and the positioning holes 29 are of a different diameter in each movable wall 22, decreasing towards the removable wall 24, such as each movable wall 22 is locked on a respective longitudinal portion of the axial positioning pins 231.

The movable walls 22 thus ensure the axial dimension (determined by the thickness of the walls 22 and by the distance between the walls 22 themselves) during the winding step (of making the windings 4), but can be moved close to each other under the thrust of a press during the pressing step, which will be described hereunder. Such axial dimension is conveniently ensured by mechanical reference elements 291 which ensure the repeatability of the process and the consistency of the final dimensions of the pressed winding (i.e. of the coil 4). In practice, the winding tool 20X is configured such as the movable walls 22, under the action of a pressure, can move close to each other up to a distance defined by the mechanical reference elements 291 which act as a limit abutment.

The number of movable walls 22 in the winding tool 20X is determined by the number of windings 4 to be made in series (equal to the number of windings per electric pole and thus per sector 3)+1; thus by the formula Np=nm+1, wherein Np is the number of movable walls 22 and nm is the number of windings. In practice, the nm windings are the windings which will be part of an individual electric pole.

The movable walls 22 are substantially rectangular in plan, both in vertical section and in horizontal section. Preferably, the movable walls 22 are provided, on the sides jutting out outside the winding tool 20X, with manipulation seats 249.

In the preferred embodiment, each movable wall 22 is formed by a central support 221, two winding cheeks 222 fixed to the two sides of the central support 221, in this case the manipulation seats 249 are obtained in the winding cheeks 222. In practice, in these embodiments, the winding chambers are defined between the winding cheeks 222.

Preferably, a thermal insulator is interposed, between the central support 221 and the winding cheeks 222, to limit thermal loss during the thermal carburizing treatment which will be described hereunder.

The removable disassembly wall 24 is removable in the sense that it can be decoupled from the fixed wall to allow to pull out the movable walls 22.

In the preferred embodiments, the removable wall 24 is also provided with a respective wire clamp 261 configured to clamp the wires 14 coming out of the coil, thus keeping them arranged in the proper configuration.

The removable wall 24 then comprises a coupling device 241 for the direct or indirect coupling to the anchoring wall 23 in which, for example, the hooking end 271 of the centering pin 27 of the anchoring wall 23 is hooked.

Preferably, the removable wall 24 further comprises a gripping element 242 adapted to be grasped or hooked to allow its movement.

In the preferred embodiments, the winding tool 20X comprises a plurality of corner elements 245 coupled to the removable wall 24, which can slide on respective appropriately inclined guides 246. Such guides 246 extend from the removable wall towards, and preferably up to, the anchoring wall 23. The corner elements act as abutment for the wires 14 during the winding.

Preferably, the corner elements 245 are at least four, one for each corner.

Figure 9:
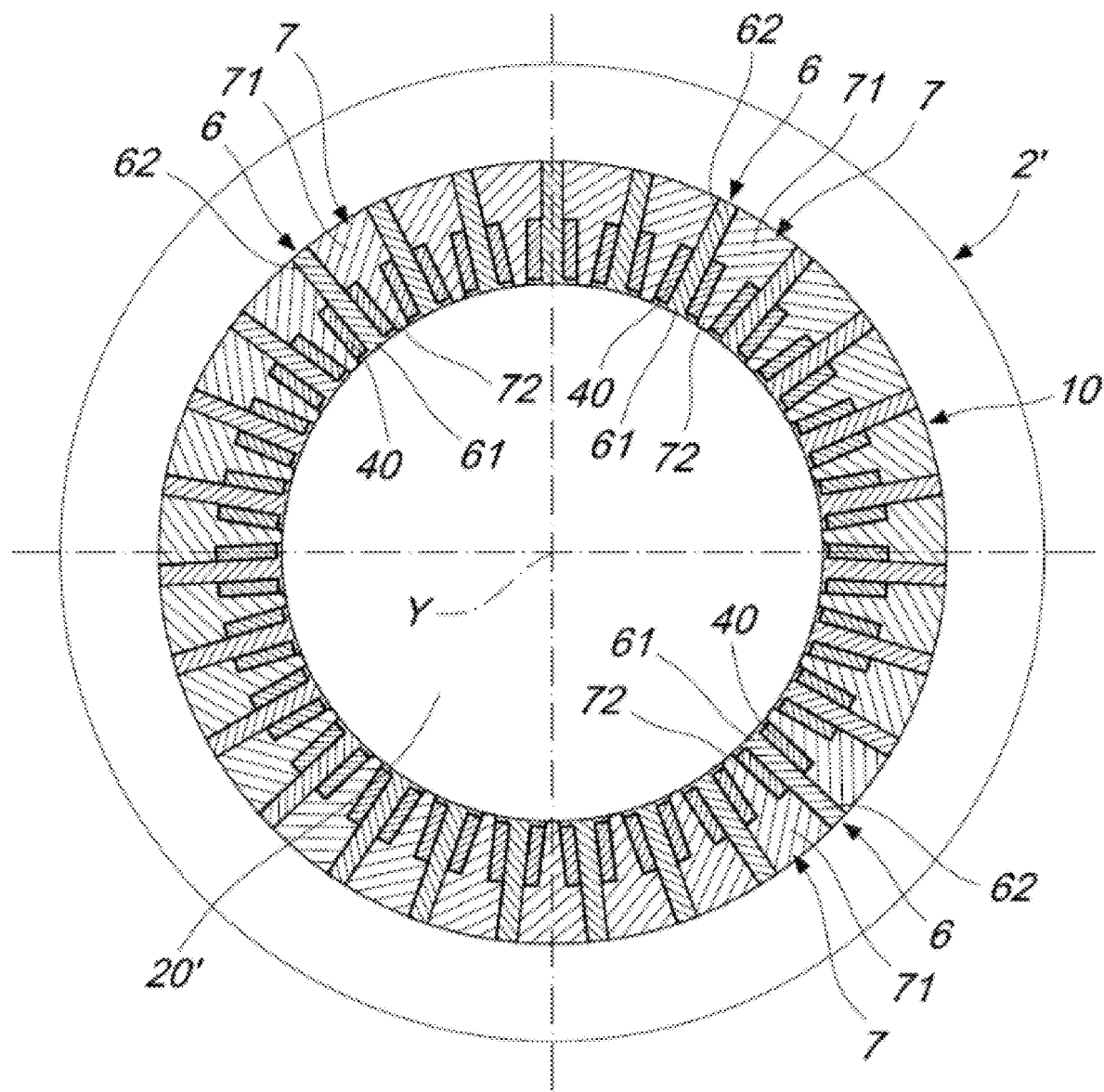
FIG. 9 is a sectional view; along a plane parallel to one of the jigs, of the image of FIG. 8.
Figure 10:
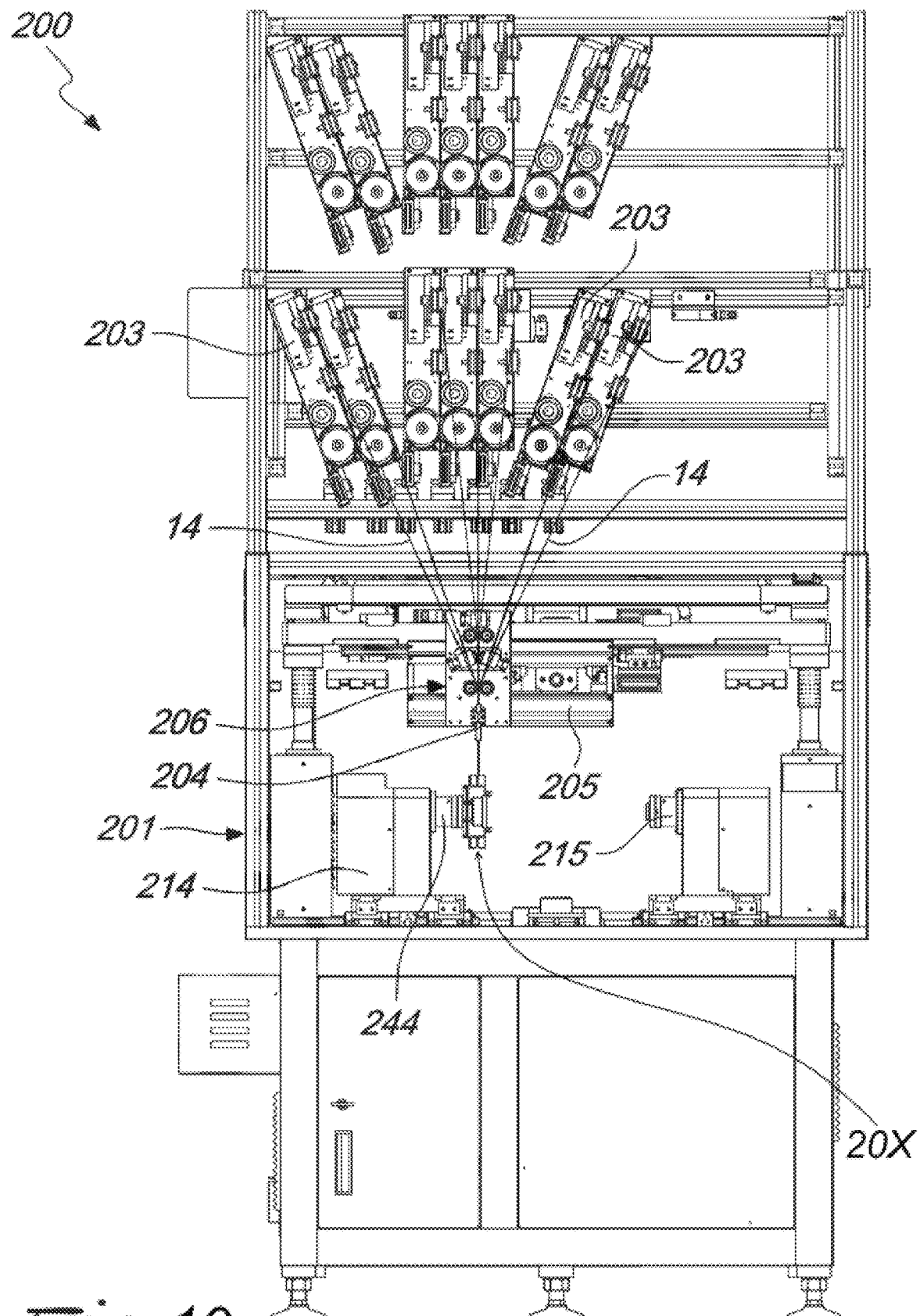
FIG. 10 is a side elevation view of a possible embodiment of a winding machine.

Thanks to this detail along the guides 246, the corner elements 245 slide towards the center of the winding tool 20X (as shown in FIGS. 9 and 10) during the pulling out of the removable wall 24 from the hooking wall such as to loosen the wires 14 forming the windings 4 and thus allowing the removal of the windings 4 without scrapes such as to prevent damage to the wire 14.

In a possible method, during the winding making step A, complementary conducting wires, having a smaller section with respect to the section of the main conducting wires, are added to the conducting wires 14, definable as main wires; the complementary conducting wires occupy the free spaces between the main side-by-side conducting wires 14.

Preferably, the method further comprises a step of insulating the conducting wires 14. An electrically insulating layer: is applied at least on the linear portions 4a, 4b of the winding 4, after the pressing and/or carburizing step B, whenever provided (described hereunder), or is applied between the first stator portions 6 and the second stator portions 7 before inserting them between the linear portions 4a, 4b of the windings 4 such as to encapsulate them.

Preferably, the step A of making the windings 4 is implemented by making a series of windings 4 on the winding tool 20X, by making sure to keep a linear portion 4a, 4b of a winding 4 spaced from the linear portion 4a, 4b of the successive winding 4, according to a predetermined pitch distance.

Figure 41:
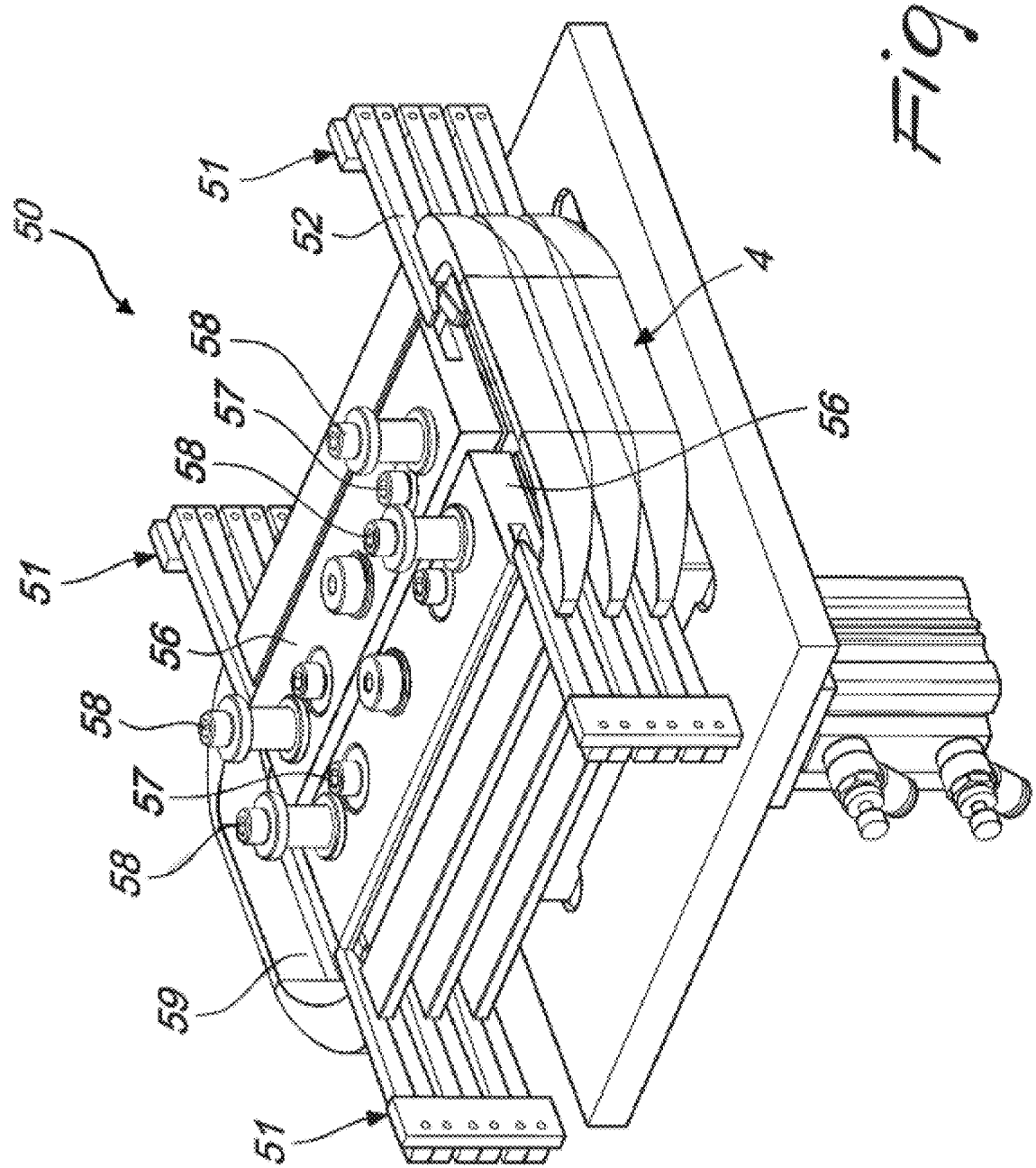
FIGS. 41 and 42 are perspective views showing a making sequence of a pitch-correcting step by means of a pitch-correcting device.
Figure 42:
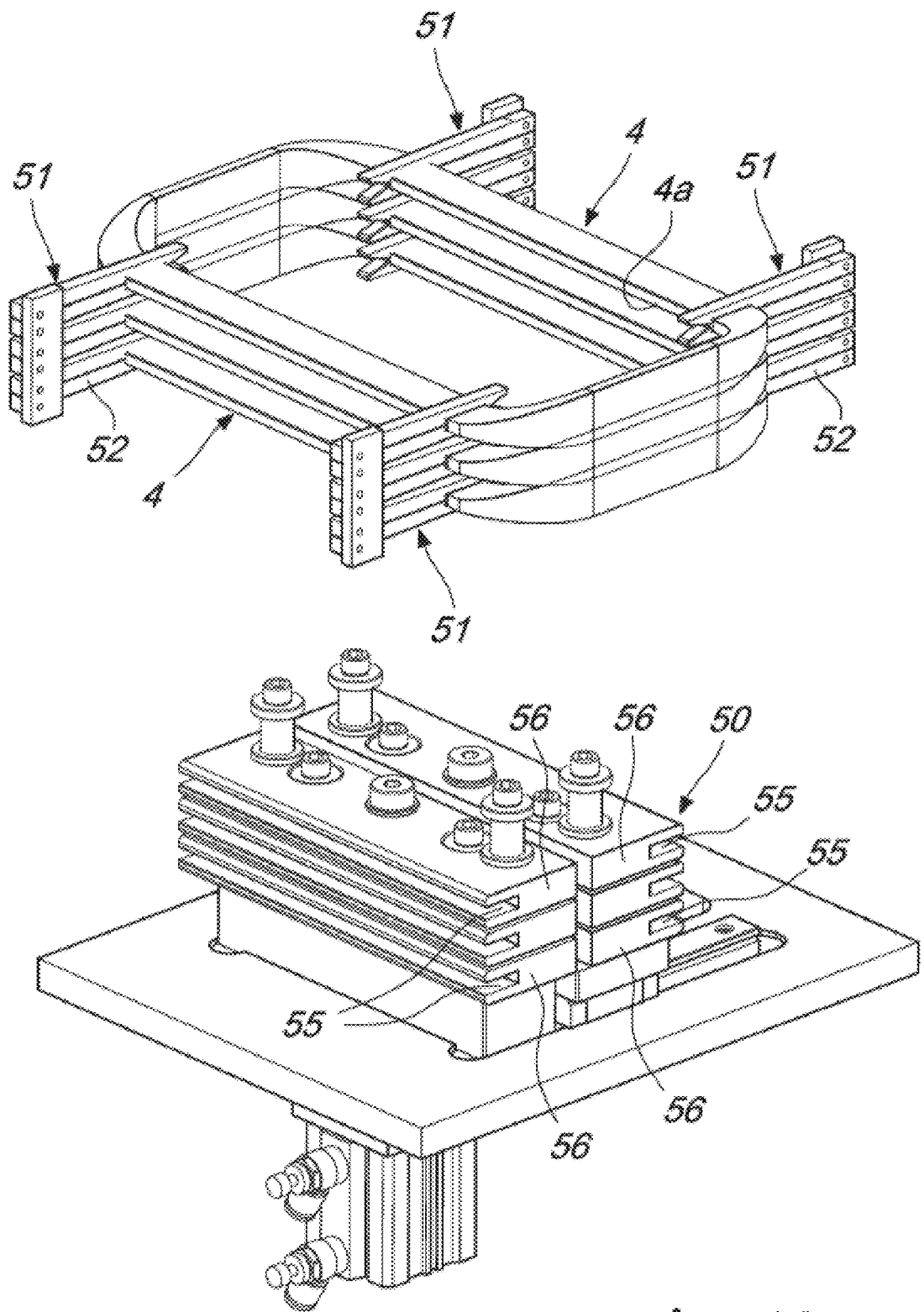

In this circumstance, before housing the windings 4 between the slots 22'. 22" of the jigs 2, 2", the method provides for: making the series of windings 4 interact mechanically with a pitch-correcting device, such as the one shown in FIGS. 41 and 42, for example provided with pliers movable by actuators and configured to correct the pitch distance between the linear portions 4a, 4b of the different windings, to make it correspond to the pitch between the slots 22', 22" of the jigs 2, 2', whenever necessary; displacing the windings 4 by means of the pliers such as to keep the pitch distance constant between the linear portions 4a, 4b; and using the pliers to insert the linear portions 4a, 4b between the slots 22', 22" of the jigs 2, 2".

Whenever the windings 4 are formed on a winding tool 20X, after the step A, a step C of housing linear portions 4a, 4b of the windings into the slots 22', 22" of the jigs 2, 2' is provided. This step is implemented with pliers and actuators that withdraw the windings 4 from the winding tool and, without modifying the pitch between the linear portions 4a, 4b, provides to insert the linear portions 4a, 4b into the slots 22', 22" of the jigs 2, 2".

FIG. 10 shows a possible embodiment of a winding machine 200 by means of which the conducting wires 14 are wound on the winding tool 20X shown in FIGS. 12-22. The winding machine 200 is provided with a supporting structure 201 which supports: a plurality of wire tensioning devices 203 (of known type) for tensioning the conducting wires 14 to be wound; a wire guiding device 206 provided with a wire guiding tube 204 and movable along a wire guiding guide 205 (preferably consisting of a bar); and a winding spindle 244 rotated by a motor 214 and adapted to rotate the winding tool 20X previously described, in practice being coupled to the sleeve for hooking to the spindle 25.

Such winding machine 200 can thus be configured in an operative winding configuration, wherein the conducting wires 14 to be wound are tense and come out of the wire tensioning devices 203 towards the wire guiding device 206, which guides the conducting wires 14 towards the winding tool 20X during the rotation thereof.

Optionally, the winding machine 200 further comprises a tailstock 215 positioned coaxially to the spindle 244 and adapted to be coupled to the removable wall 24 of the winding tool 20X.

Figure 11:
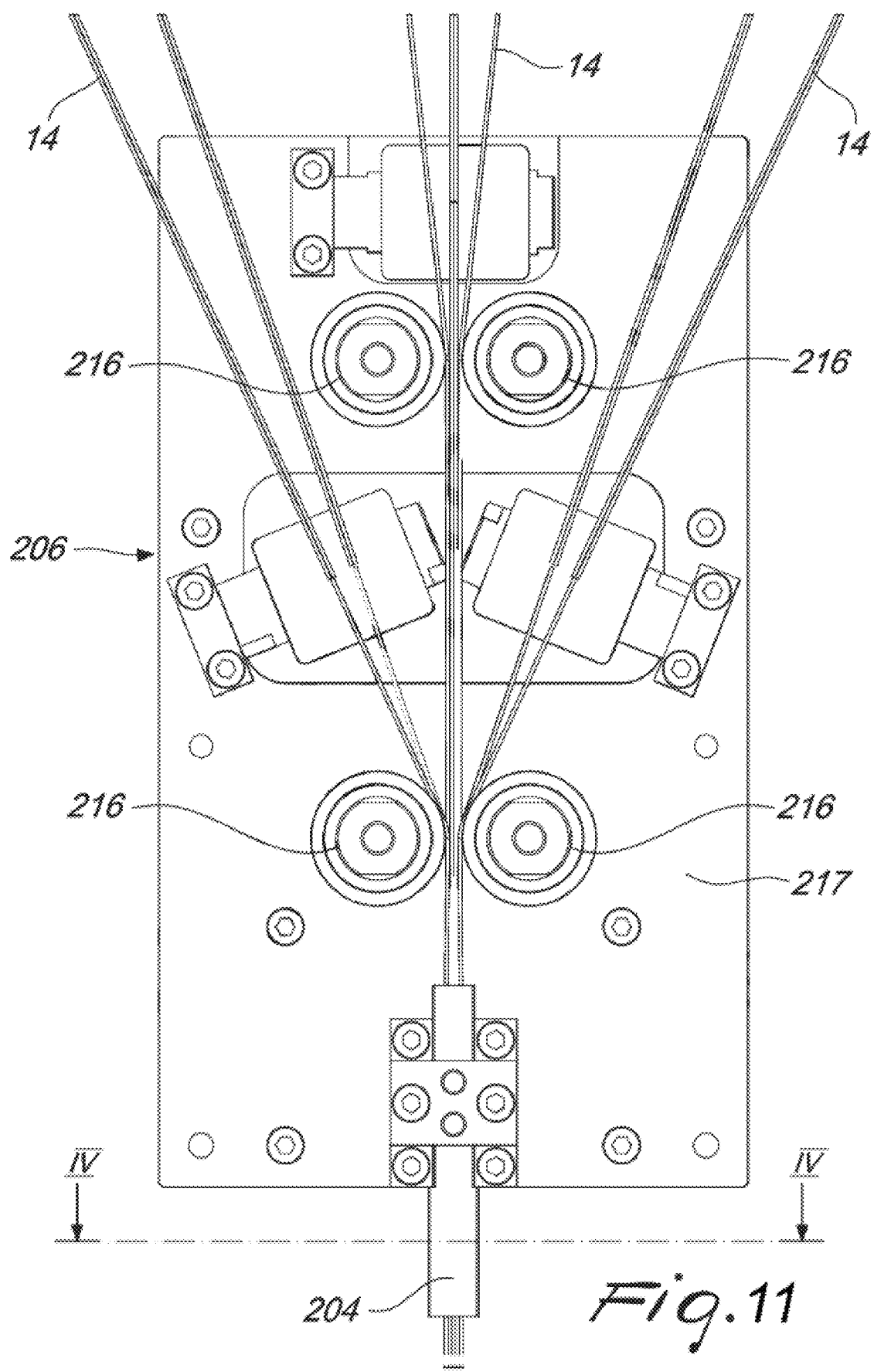
FIG. 11 is a plan detail of the machine of FIG. 10.

FIG. 11 shows, in detail, the wire guiding device 206 which comprises a base 217 on which wire directing elements 216 (preferably pairs of wheels) are fixed and direct the conducting wires 14 into the wire guiding tube 204 which is placed at the end of the base 217 which is facing the winding tool 20X.

Figure 12:
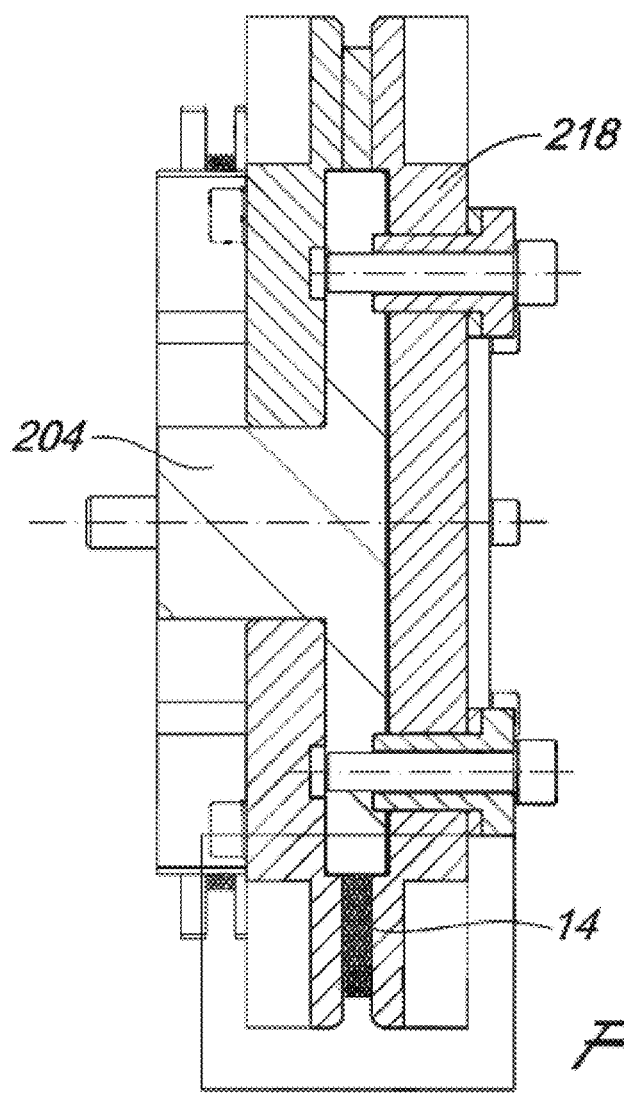
FIGS. 12, 13 and 14 are sectional details of the machine of FIG. 10.
Figure 13:
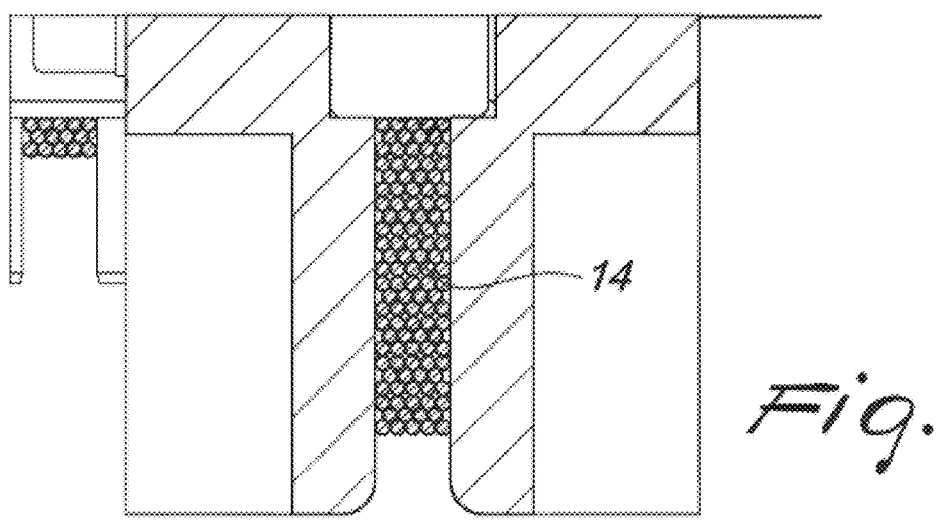
Figure 15:
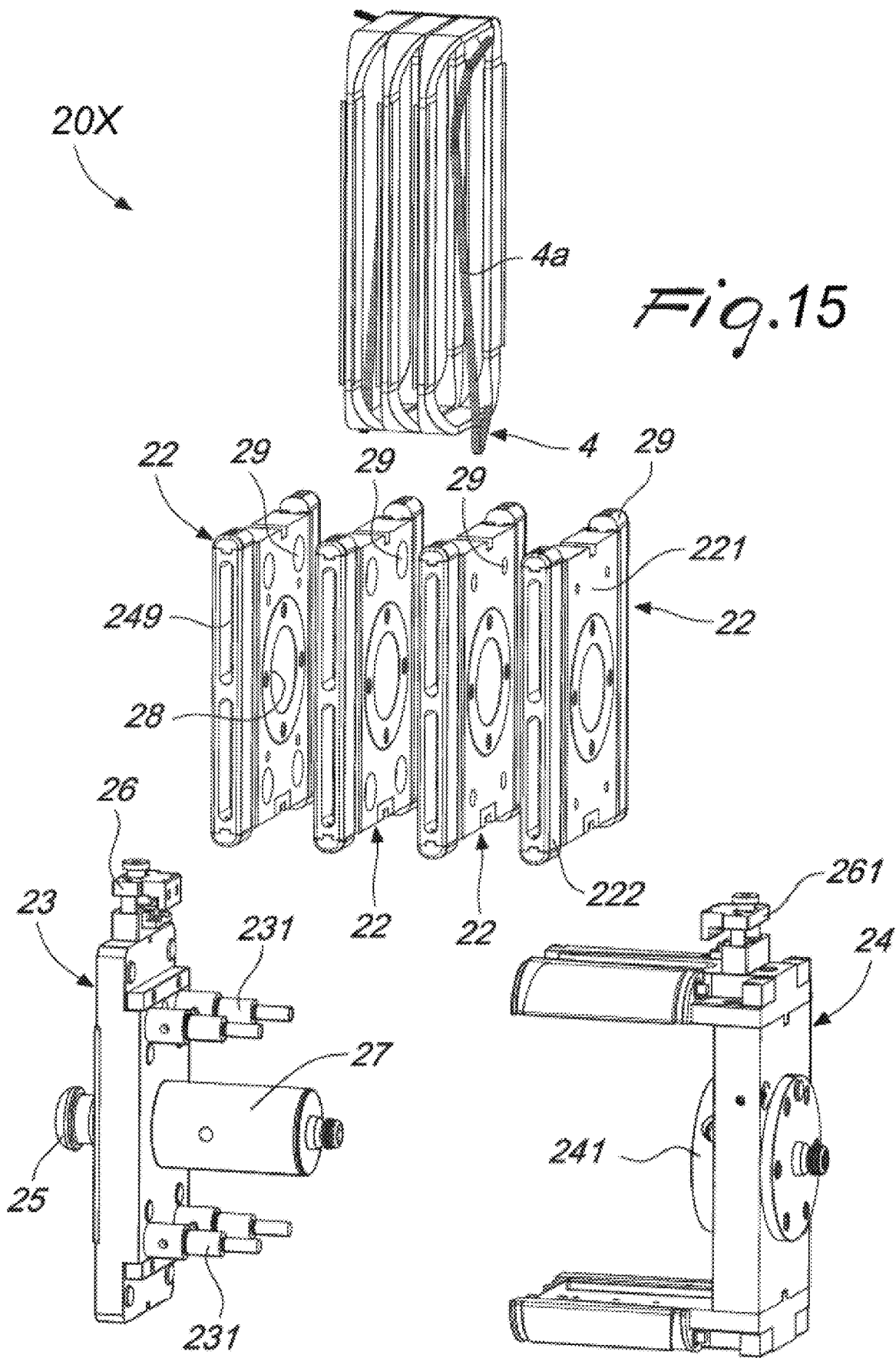
FIGS. 15 and 16 are exploded views of a first embodiment of a winding tool according to the present invention.
Figure 16:
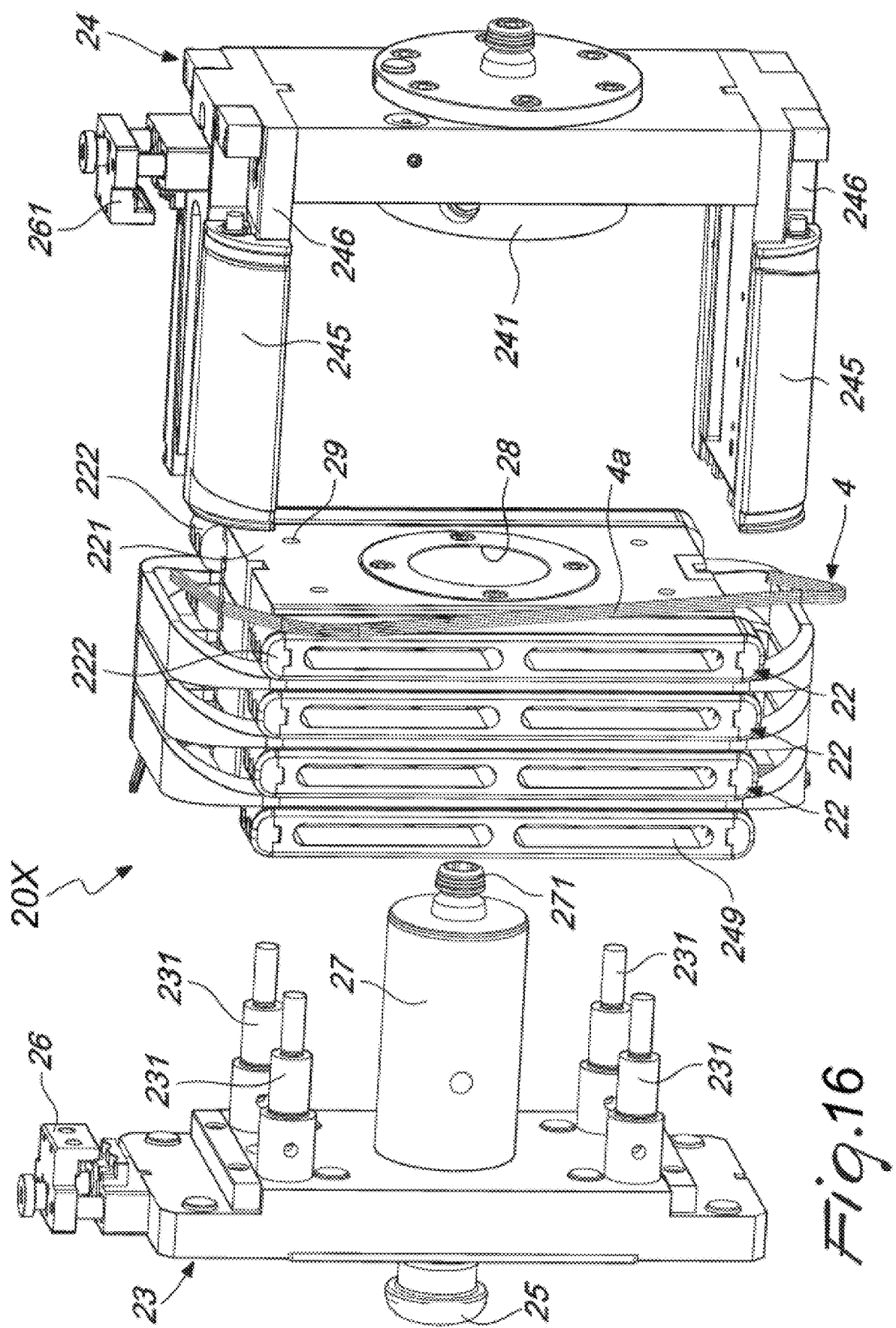
Figure 17:
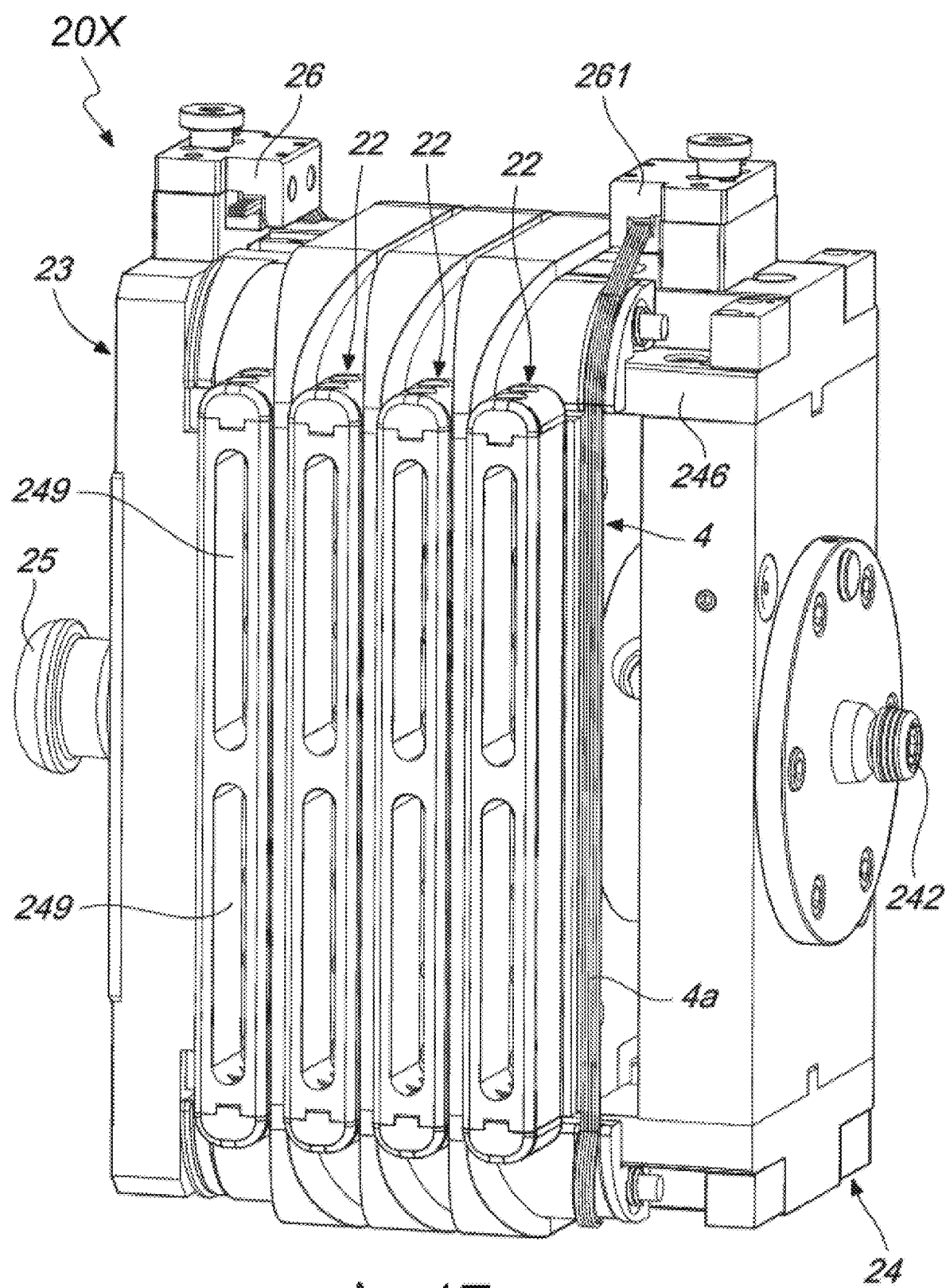
FIGS. 17 and 18 are perspective views of the winding tool in successive steps.
Figure 18:
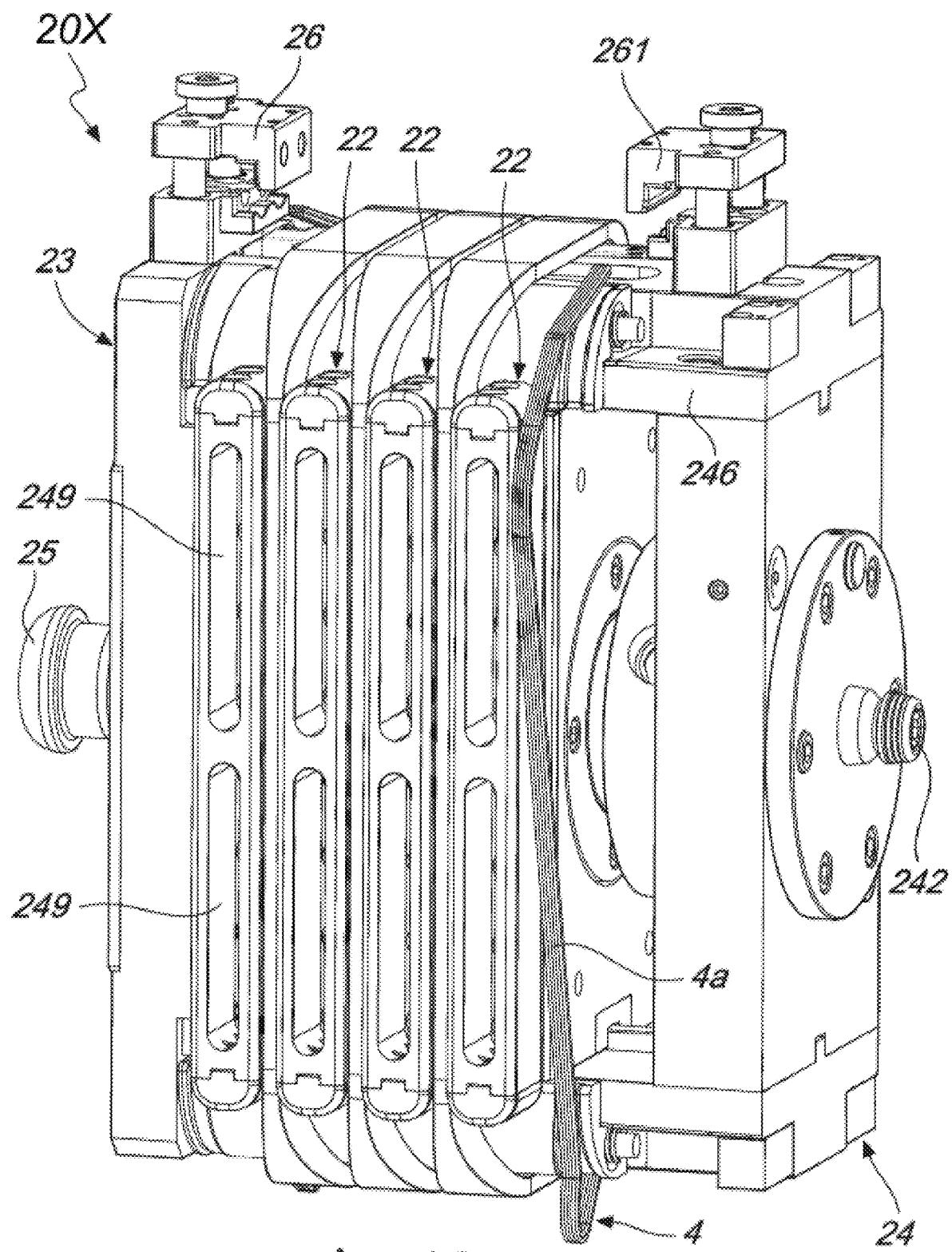
Figure 19:
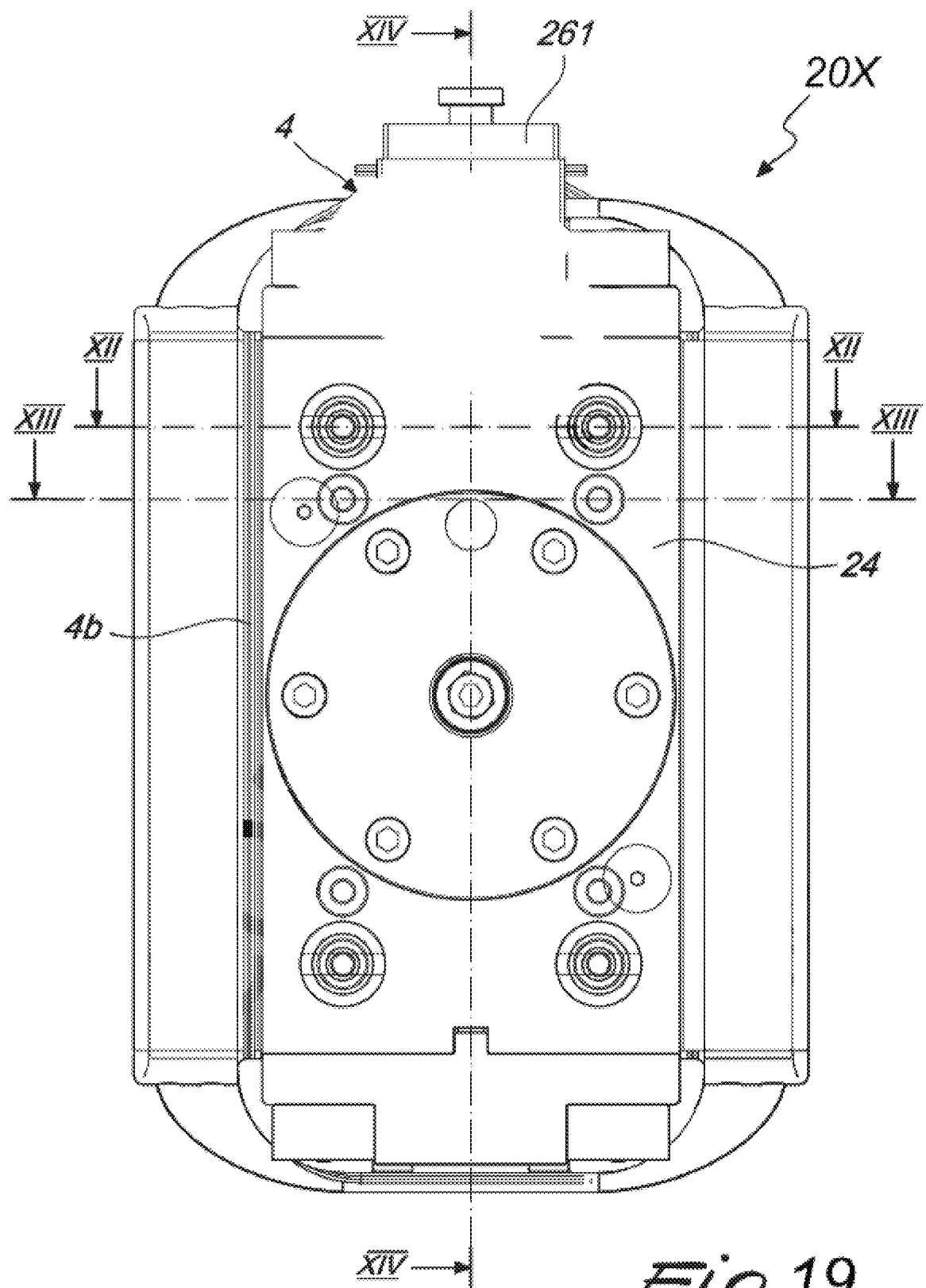
FIG. 19 is a side elevation view of the winding tool.
Figure 20:
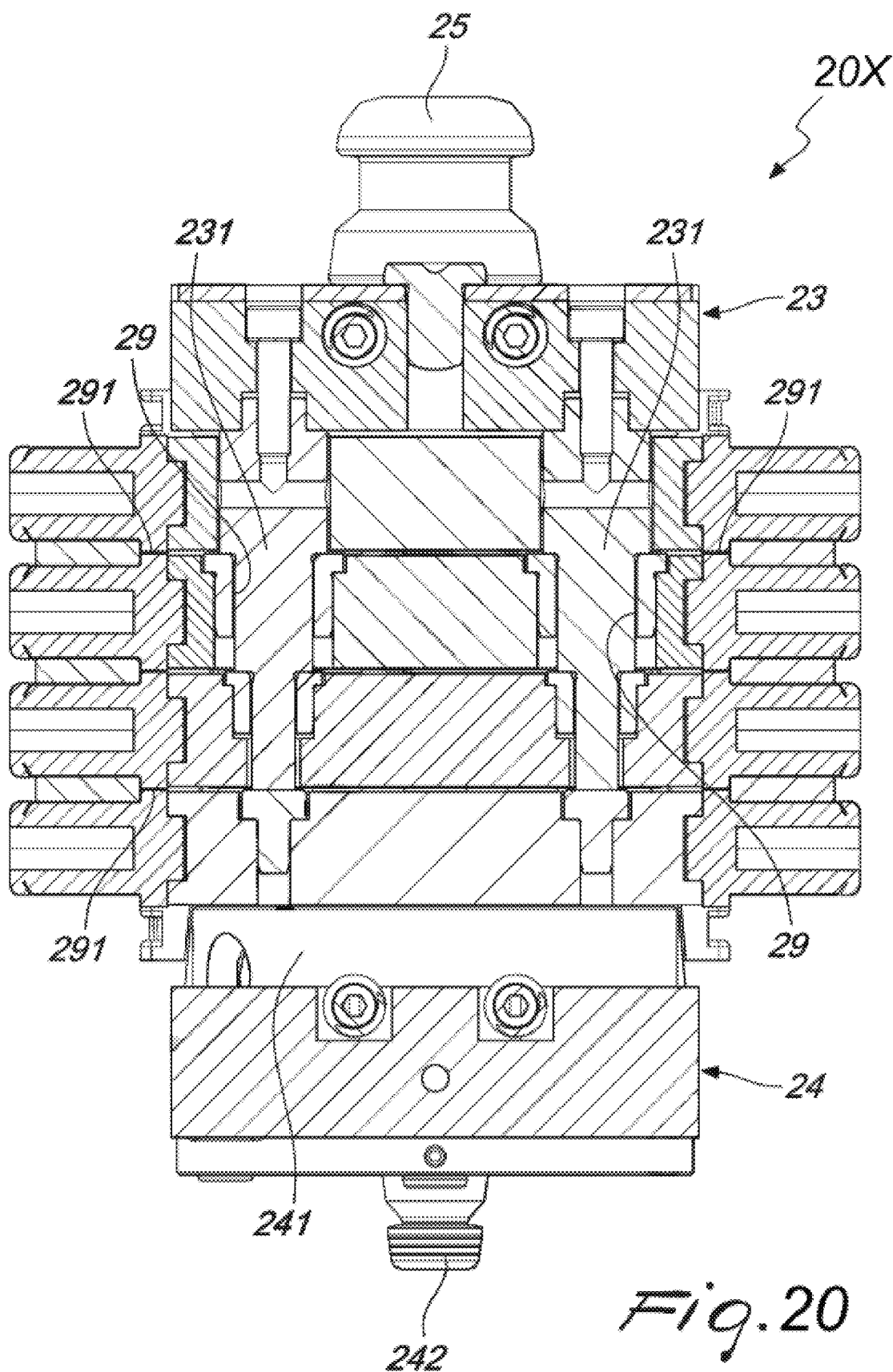
FIGS. 20, 21 and 22 are sectional views, along different planes, of the winding tool of FIG. 19.
Figure 21:
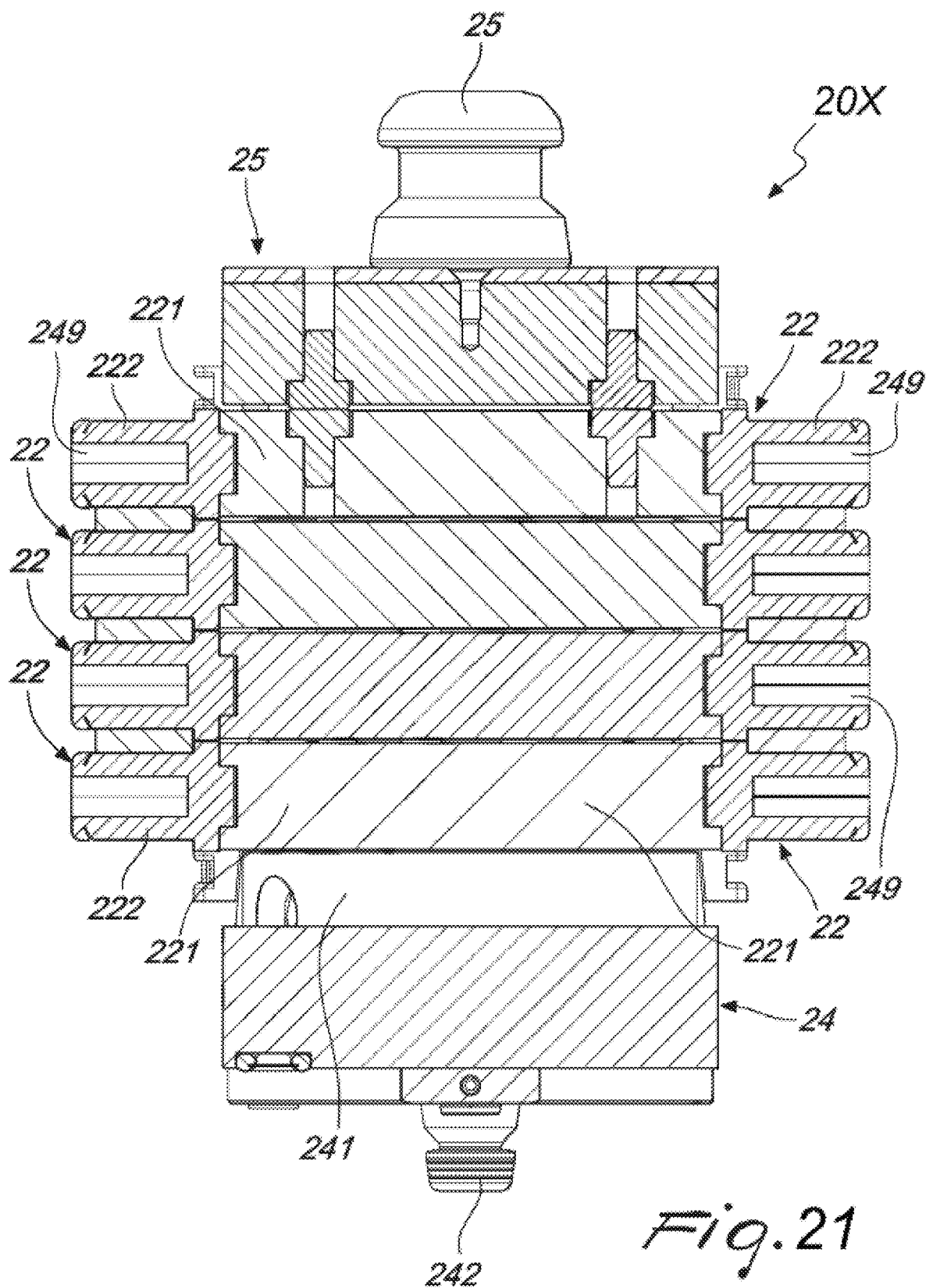
Figure 22:
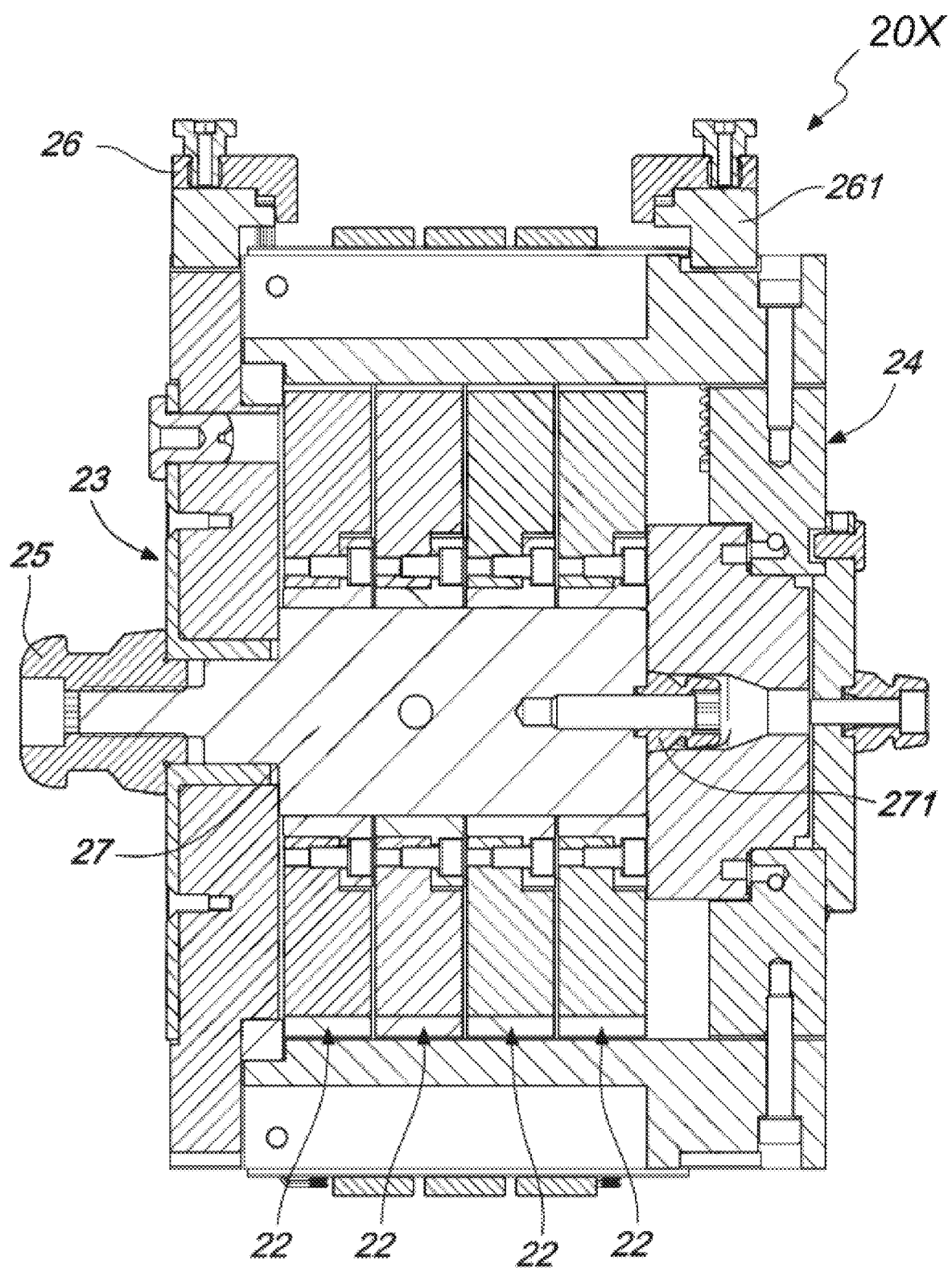

The details of a reeling member 218, which is preferably present in the winding machine 200 and positioned coaxially to the spindle 244, in which the wires 14 coming out of the wire guiding tube 204 are aligned in loops before being wound on the winding tool 20X, are depicted in FIGS. 12 and 13.

Figure 14:
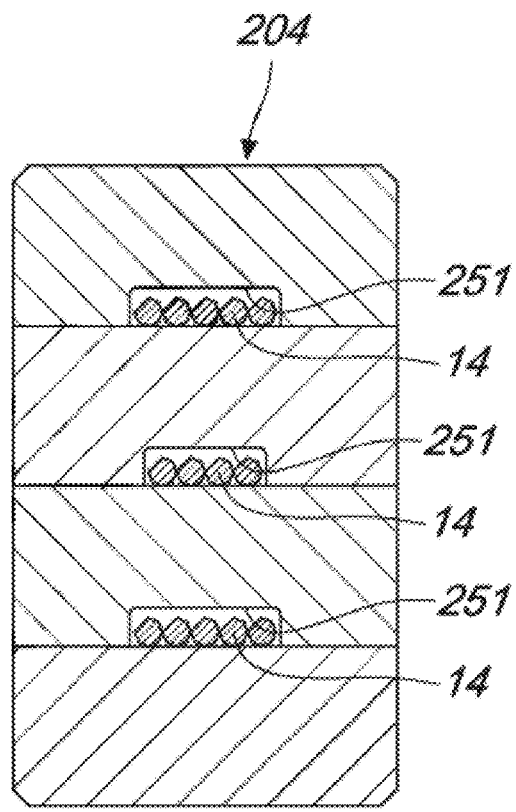

FIG. 14 shows a section of the wire guiding tube 204 composed of a plurality of sectors which define a plurality of separate ducts 251 for the conducting wires 14, such as the conducting wires 14 intended to form a level of a loop are kept in position in each duct 251. There are three ducts 251 in the example depicted and the wires are arranged on three levels with a 5-4-5 sequence (five wires on the first level, four on the second level and five on the third level) for a total of fourteen wires in parallel per each loop, each of which conducting wires 14 comes from and is managed by one of the fourteen wire tensioning devices 203 visible in FIG. 10.

Optionally, after the step A of forming the windings 4 and before the step C, it is possible to perform a pressing and/or carburizing step B, as depicted schematically in FIG. 1a, wherein the linear wire portions 4a, 4b of the windings 4 are pressed and/or subjected to a thermal carburizing treatment, such as to compact the individual linear wire portions 4a, 4b one to another. This is a step during which at least one of the linear portions 4a, 4b of the windings 4 is subjected to a pressing step, or is subjected to a thermal carburizing treatment, or to both the pressing step and the thermal carburizing treatment, in the desired order or contemporaneously, such as to compact said individual linear wire portions according to the orderly arrangement achieved during the step A of forming the windings 4.

Advantageously, the conducting wires 14 of the linear portions of the windings 4 which were subjected to the pressing and carburizing remain aggregated, they do not separate and they are not displaced one with respect to the other. This detail allows to make and keep the coil in the best geometric configuration possible such as to maximize the filling factor, for each dimension of the slot 22', 22" to be filled, and to avoid fraying during the movement of the windings 4.

Preferably, the step B lasts between 15 seconds and 2 minutes.

In a possible method, in the pressing and/or carburizing step B, the thermal carburizing treatment is performed by inserting one or more heating elements between the linear portions of the windings 4, such as to heat them up to a predetermined carburizing temperature, generally in the range of 170-210° C.

In a possible method, in the carburizing and pressing step B, the linear portions 4a, 4b are pressed by means of a pressing device which is inserted between said linear portions 4a, 4b of the winding 4 after having removed the heating elements, by keeping the winding 4 accommodated on the winding tool.

Figure 25:
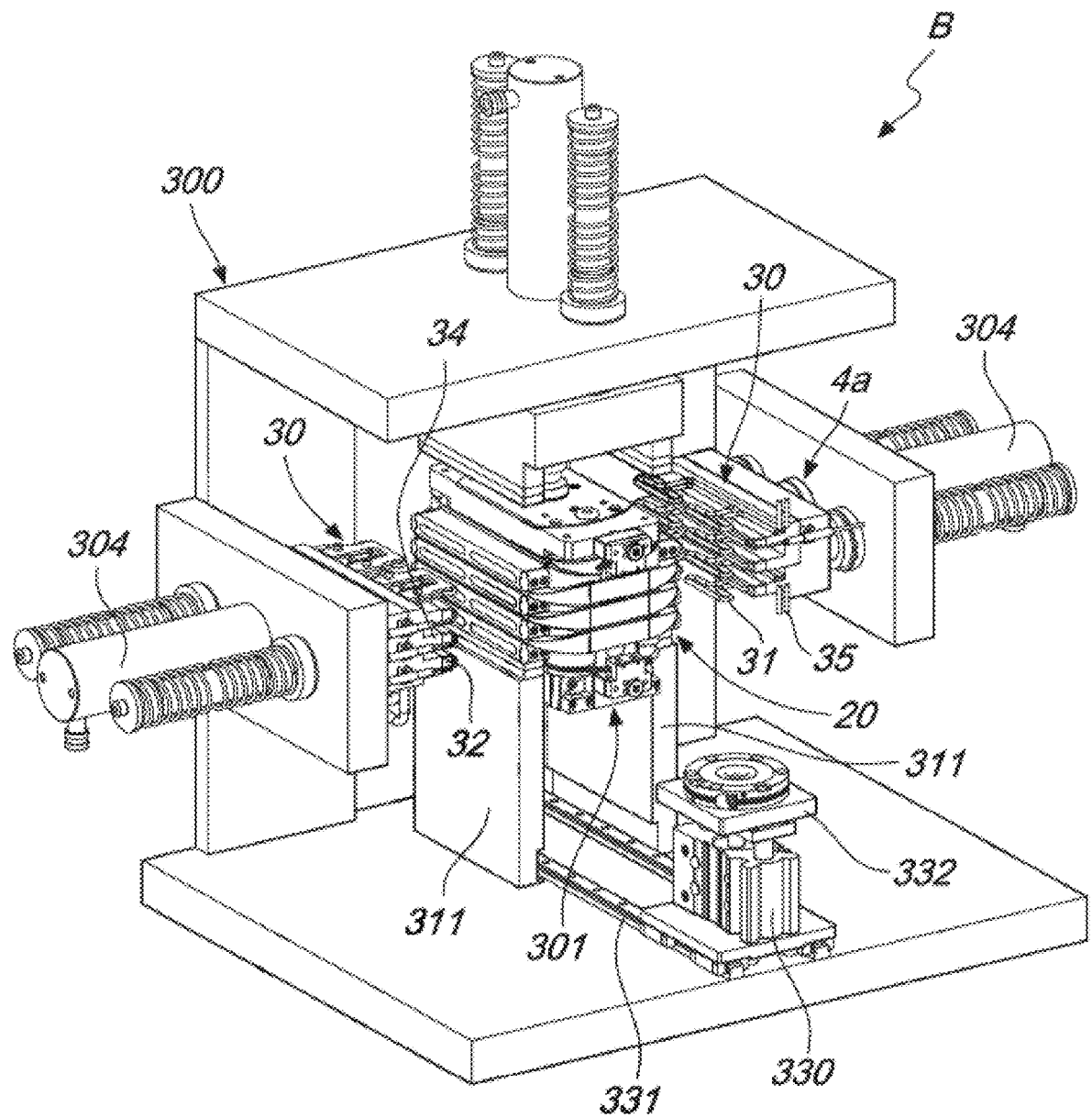
FIG. 25 is a perspective view of a pressing and carburizing apparatus during the pressing and/or carburizing step of the method.
Figure 26:
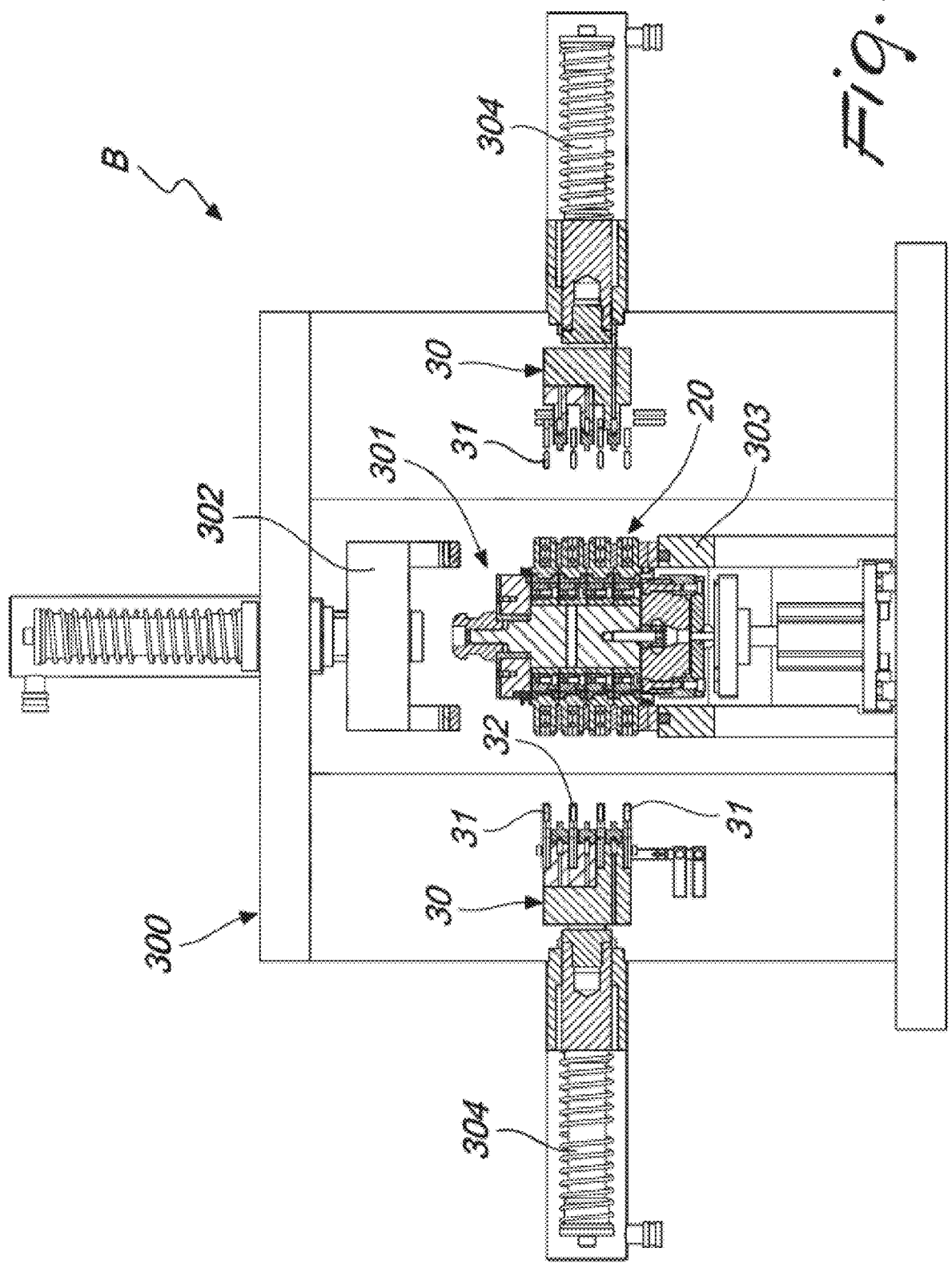
FIGS. 26 and 27 are vertical views of the apparatus of FIG. 25 at successive times of the pressing and/or carburizing step.
Figure 27:
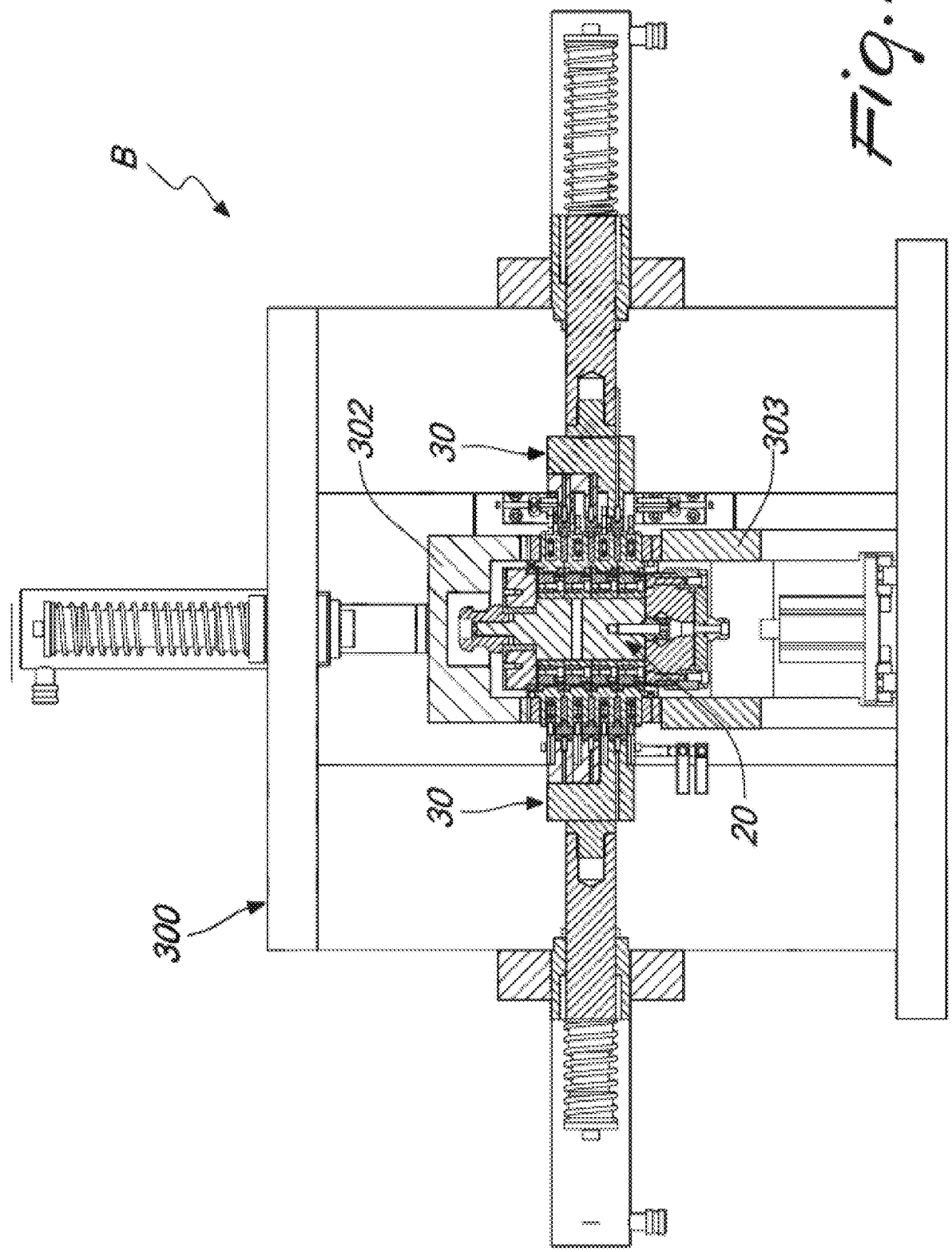

FIGS. 25-27 show an example of a pressing and/or carburizing apparatus 300 usable to achieve the windings 4 with the characteristics described above.

In the example shown, the apparatus 300 carries out both the pressing and carburizing and comprises a housing seat 301 configured to house the winding tool 20X and one or more presser elements 30 configured to exert a pressure on the at least one linear portion 4a, 4b of the winding 4 wound on the winding tool 20X.

Preferably, there are two presser elements 30 positioned coaxially on opposite sides of the housing seat and which exert a pressure one in direction of the other, preferably in horizontal direction, such as to press each one of the two opposite linear portions 4a, 4b of each winding.

The presser elements 30 are provided with at least one heating device 31 (preferably comprising one or more inductors) configured to heat the linear portion 4a, 4b before, after or during said pressure, such as to make the thermal carburizing treatment while the winding 4 is wound on the winding tool 20X.

The presser elements 30 are activated by means of a pressure kinematic system 304 which, in the embodiment depicted, comprises a piston and a spring coaxial thereto.

In some embodiments, the heating devices 31 are comprised in, or coupled to, the presser elements 30 and more precisely in their heads 32, which constitute the end of the presser elements 30 themselves and which come into contact with the linear portions 4a, 4b during the pressing.

Conveniently, there is a number of heating devices 31 equal to the number of movable walls 2.

Optionally, the pressing and/or carburizing apparatus 300 comprises thermal probes 34 and/or pyrometers 35, preferably coupled to the presser elements 30, such as to allow the feedback control of the carburizing treatment by a control system which controls the heating elements 31.

More in detail, the pressing and/or carburizing apparatus 300 comprises, at the housing seat 301, fixed abutments 311 on which the winding tool 20X is leaned. Such fixed abutments 311 have leaning planes made of a thermally insulating material, on which the winding tool 20X is leaned to limit heat loss.

Preferably, the pressing and/or carburizing apparatus 300 further comprises a pressing head 302 which moves orthogonally with respect to the presser elements 30, vertically 302 in the example depicted, such as to compress the winding tool (and thus the winding 4) in orthogonal direction with respect to the presser elements 30, thus causing the movable walls 22 to move closer, such as to further compact the linear portions 4a, 4b of the winding 4 and to determine the thickness thereof using the mechanical reference elements 291, which act as limit abutments, as a reference. In practice, the press head 320 compresses the winding tool 20X (and thus the winding 4) against the fixed abutments 311.

Thus, in the preferred embodiment, the linear portions 4a, 4b of each winding 4 are subjected to two pressures in directions orthogonal to each other, as shown in FIG. 27. Conveniently, only the linear portions 4a, 4b of the winding 4 are pressed and subjected to the thermal treatment, while the non linear portions (i.e. the parts of the winding 4 connecting the linear portions 4a, 4b, which are mainly curved and form the head of the winding 4) are left untreated such as to be able to easily shape them in the successive steps.

Once the predetermined carburizing temperature has been reached, which depends on the characteristics of the wire 14 used, the presser elements 30, and possibly the vertical press 320, keep the pressure for the time needed to cool, which is assisted by cooling devices (not depicted), such as to stabilize the linear portions 4a, 4b at final dimensions.

In the example shown in the figures, the pressure exerted is in the range of 140-300 bars and the temperature reached by the heating elements 31 is in the range of 170°–210° C. The duration of step B is between 15 seconds to 2 minutes.

Optionally, the pressing and/or carburizing apparatus 300 comprises a loading slide 330 configured to bring the winding tool 20X with the winding 4 into the housing seat 301 and to deposit it on the fixed abutments 311. As visible in FIG. 25, the loading slide can slide along horizontal tracks 331 and is provided with a platform movable vertically and adapted to raise the winding tool 20X.

Advantageously, the pressing and/or carburizing step B conforms and makes the dimension of the linear portions 4a, 4b of the windings 4 repeatable and compacts them by maximizing the filling factor. Moreover, the linear portions 4a, 4b thus treated solidify between them such as the arrangement of the wires 14 stays unchanged during the entire process; the wires are arranged and kept in an orderly, repeatable, matrix configuration and are not grouped in casual order as they keep the order given during the initial winding.

In the example described, the linear portions 4a, 4b of the winding 4 are first subjected to pressing and then to carburizing, but in general the method can be made by performing either the pressing or the carburizing, or both in the order described and also backwards, or even by performing the pressing and carburizing contemporaneously.

After the pressing and/or carburizing step B, when the winding 4 has cooled and thus solidified in the linear portions 4a, 4b, the winding itself is disassembled from the winding tool 20X. By supporting the winding tool 20X by means of the sleeve for hooking to the spindle 25 and/or the gripping element 242, the coupling device 241 is unlocked (pneumatically).

The wire clamps 26, 261 are thus opened, for example by means of two external controls, to release the wires 14 coming in and out of the coil. At this point, a manipulator (not depicted), which guides the removable wall 24 of the winding tool, starts to move away axially from the anchoring wall 23. During the first step of this movement, the corner elements 245, sliding on the respective guides 246, start to move towards the center of the winding tool 20X, such as to loosen the wire and allow the disassembly of the windings.

The manipulator which guides the removable wall 24 thus continues to move away axially from the anchoring wall 23 and a second manipulator takes the movable walls 22 by means of the manipulation seats 249 and moves them until pulling them out from the anchoring wall 24 (pulling them out from the pins 27, 231).

At this point, the winding 4, or windings 4, is/are removed from the winding tool 20X, for example by means of a movement system.

In an alternative embodiment of the winding machine 200, shown in FIGS. 28 and 29, comprising a further embodiment of the winding tool 20X", a wire directing device 150, which automatically allows to manage the distance between the various levels of the wires 14 coming in by means of a controlled axis, is used instead of the wire guiding device 206 with a single wire guiding tube 204 of FIG. 206.

This wire directing device 150 comprises an axial guide 151 along which a plurality of wire guiding tubes 152 slide in a controlled way and independently of one another.

The axial guide 151 in turn slides along a perpendicular guide 153, such as the wire guiding tubes 152 are movable along at least two axes.

Each wire guiding tube 152 is crossed by, and in practice directs, a layer of wires 14.

During the various winding steps, the wire guiding tubes 152 can move close to each other up to bringing the various levels of wire into contact, or can move away from each other such as each layer enters the coil independently and at a different time than the others.

This makes it possible to deposit each layer on the winding tool 20X' independently of the others to prevent them from getting in each other's way.

When required, the wire guiding tubes 152 move close to each other again to facilitate the operations which require that the wires 14 are all close to each other.

Optionally, in this embodiment, the winding tool 20X' is rotated by a winding spindle 244' which is integral to a motor assembly 157 fixed to a carriage 158 movable along a track 159 (guide or rail or the like).

Figure 30A:
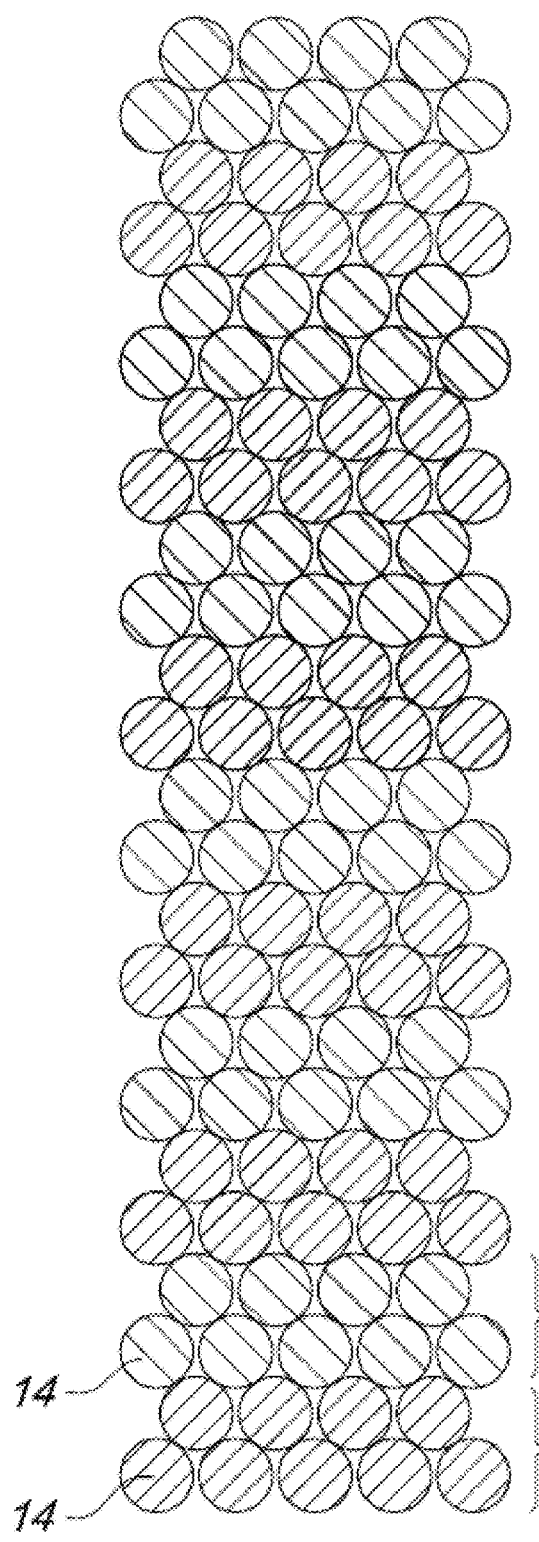
Figure 30B:
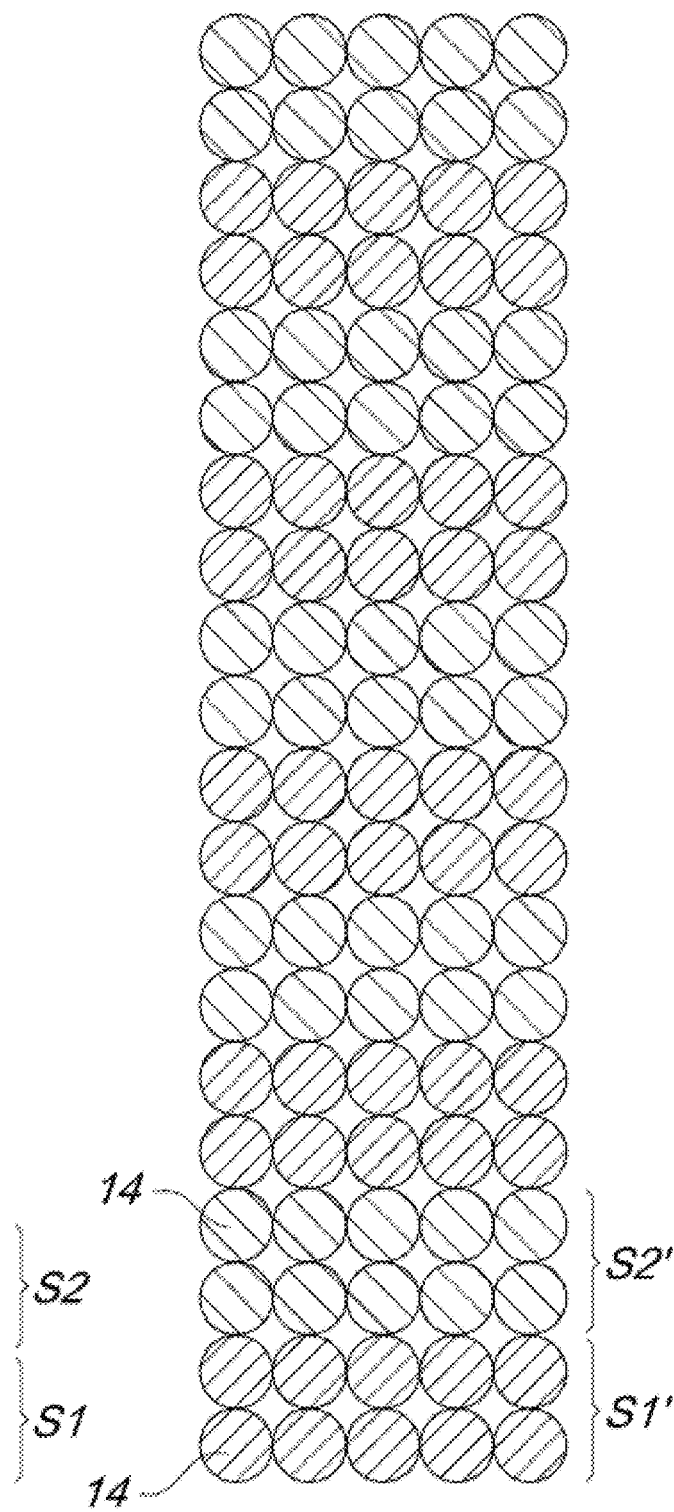

FIGS. 30a, 30b, 30c show three different examples of loops obtainable with both the first and second embodiments of the winding tool described herein, wherein: in FIG. 30a, each loop S1, S2 is formed by two layers: a first layer of five wires and a second layer of four wires; in FIG. 30b, each loop S1', S2' is formed by two layers, both of five wires; and in FIG. 30C, each loop S1", S2" is formed by three layers: a first layer of five wires, a second layer of four wires and a third layer of five wires.

Figure 31B:
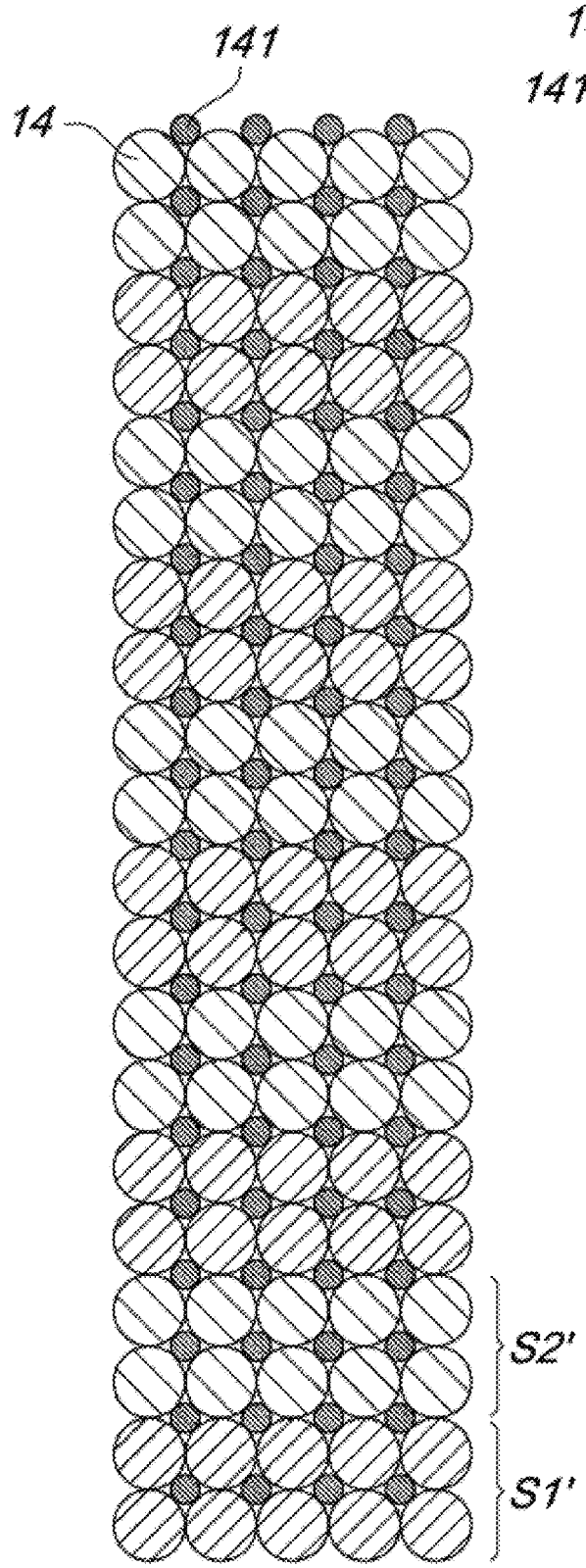
Figure 31C:
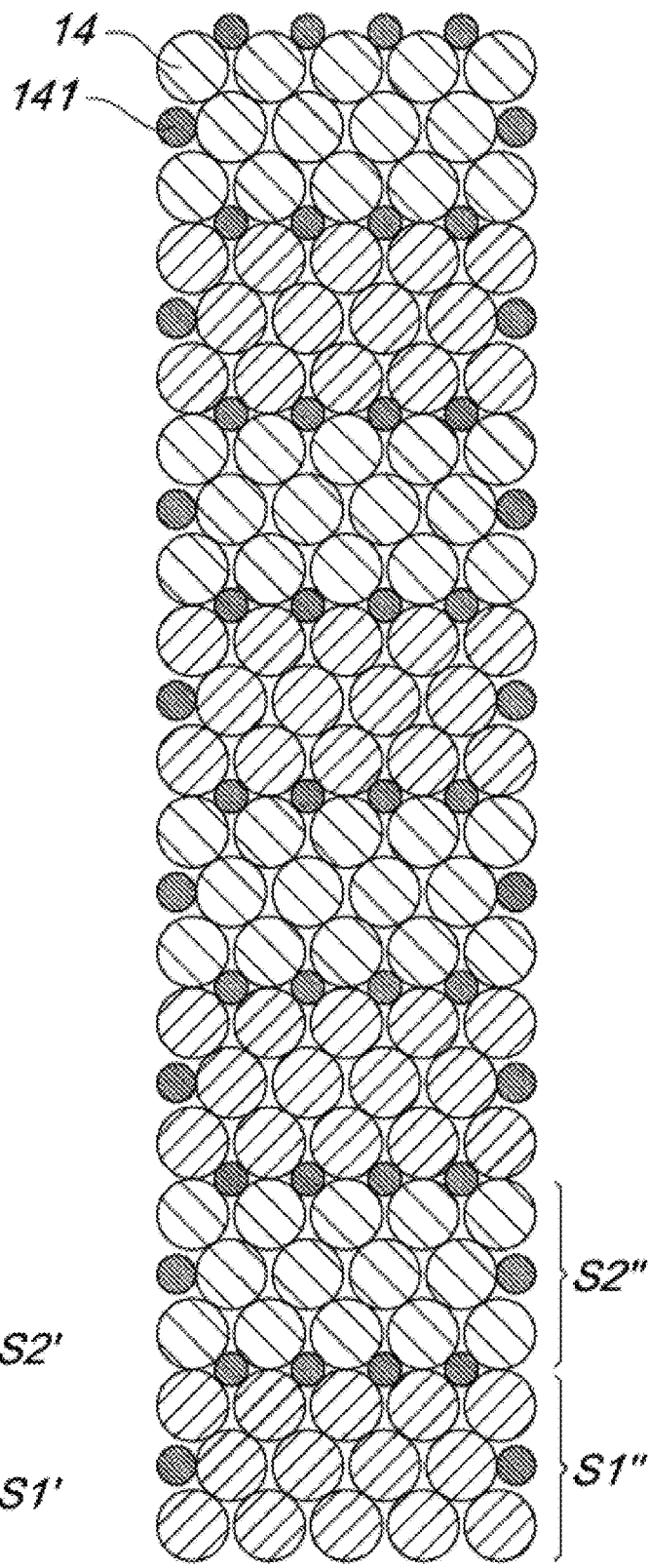
Figure 32:
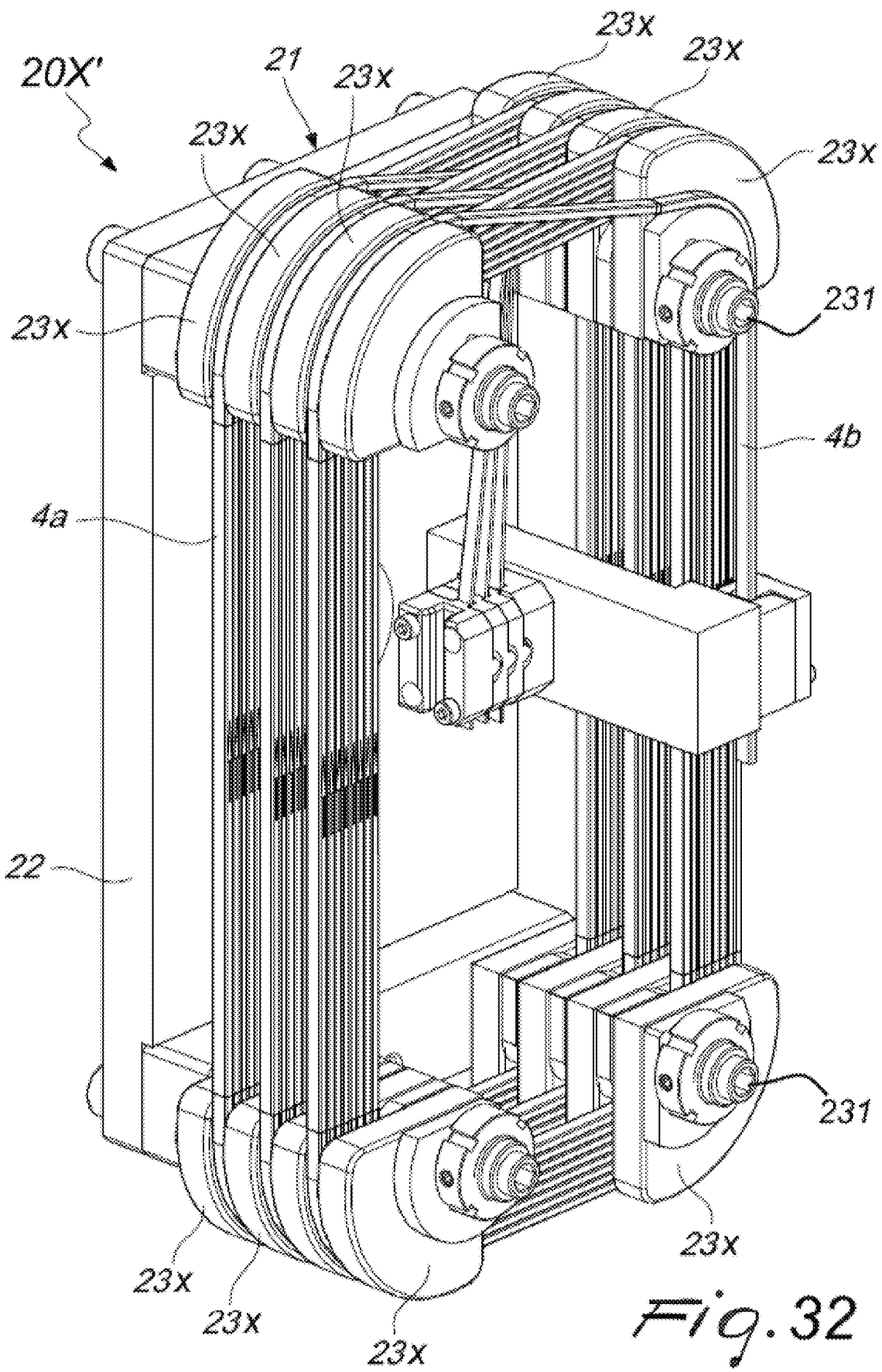
FIG. 32 is a perspective view of a detail of the second possible embodiment of a winding tool.
Figure 33:
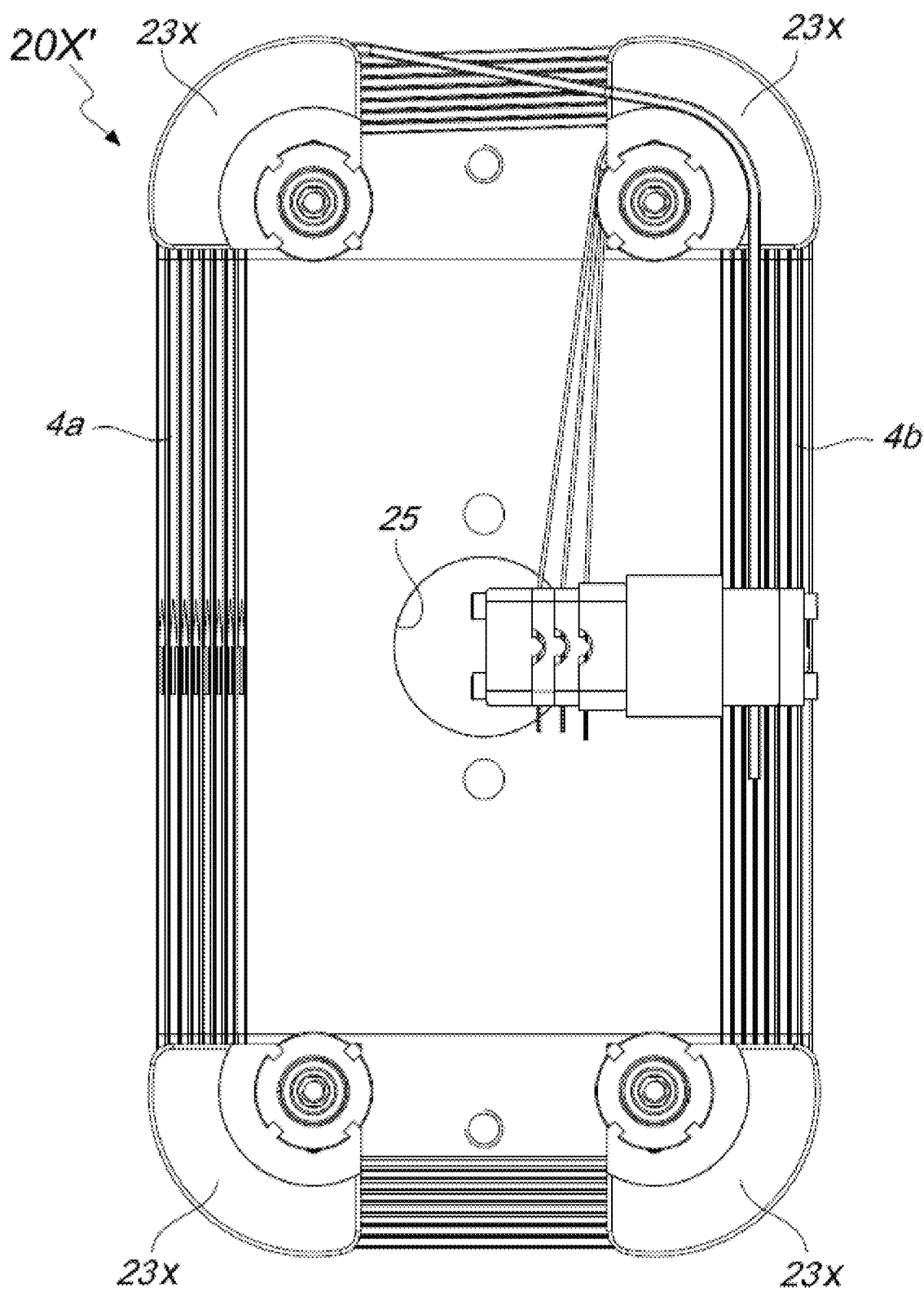
FIG. 33 is a front and elevation view of the winding tool of FIG. 32.
Figure 34:
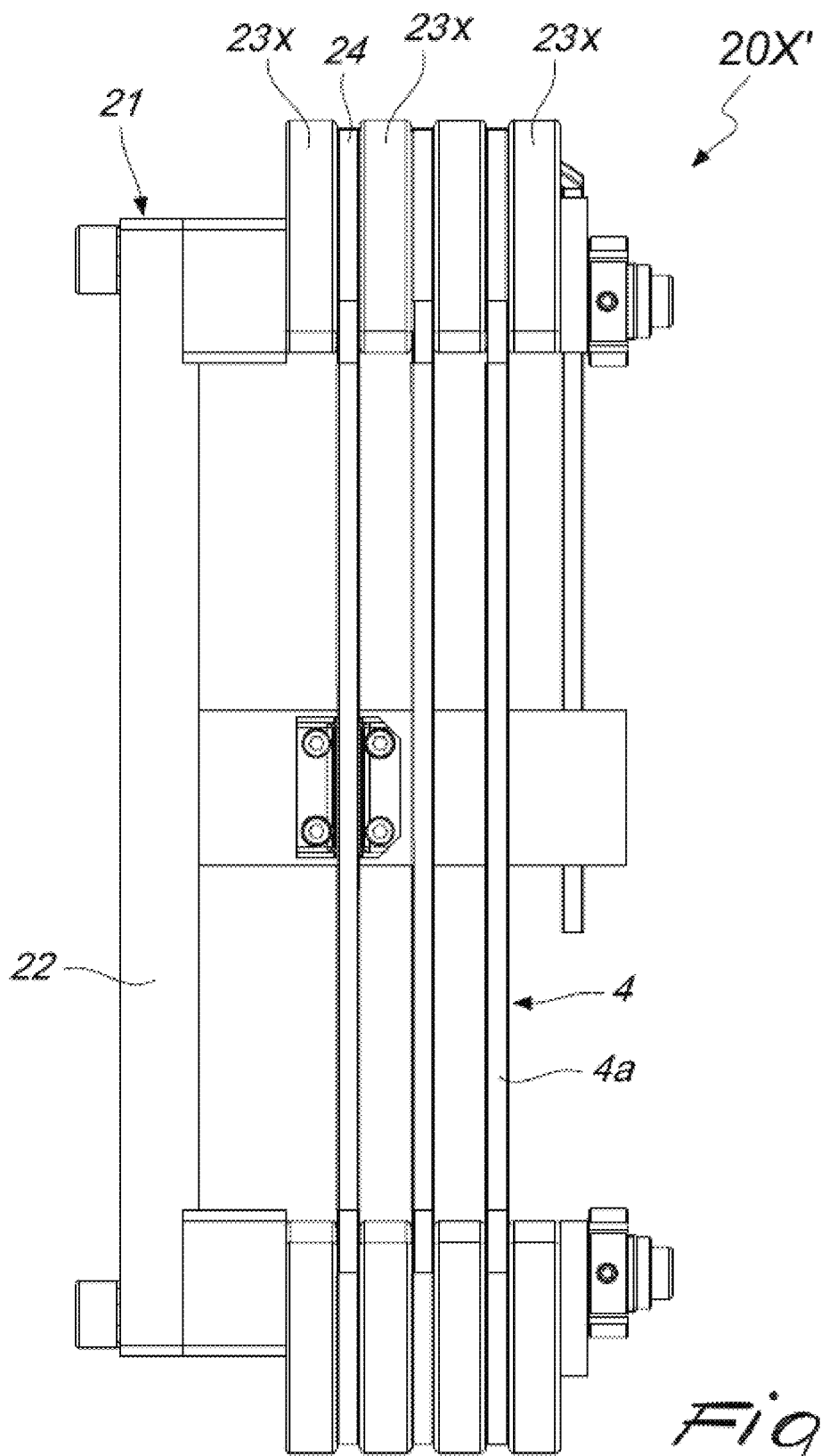
FIG. 34 is a side and elevation view of the winding tool of FIG. 32.
Figure 35:
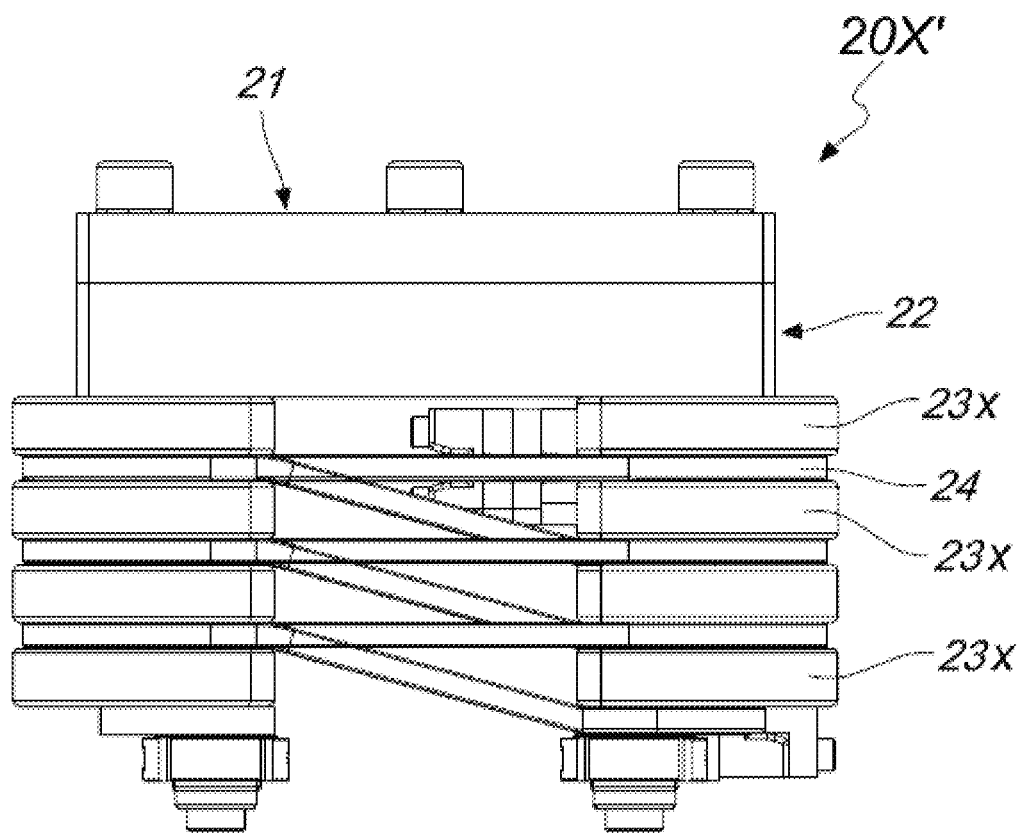
FIG. 35 is a top plan view of the winding tool of FIG. 32.

As can also be noted from the aforementioned figures, the round wires tend to leave free spaces; to overcome this problem, it is possible to resort to an optional solution depicted in FIGS. 31a, 31b, 31c.

According to this optional and advantageous solution, during the winding making step A and, more precisely, during the winding, complementary conducting wires of a smaller section 141, which go to occupy the space left free from the tangency of the wires 14 of a greater section (i.e. the free spaces between the aforesaid wires 14 of greater section), are added to each loop S1, S2. This way, in the winding step, each loop S1, S2 will be formed by layers of wires of different section, alternated with each other, which, once wound, allow to achieve an even greater filling factor.

FIGS. 32-40 refer to the second embodiment of the winding tool 20X' and show the tool 20X' with one or several windings 4 being formed.

In particular, the winding tool 20X' comprises a supporting frame 21x, 22x which supports four series of angular elements 23x. Each series of angular elements 23x is arranged substantially along an edge of an ideal parallelepiped, and wherein the angular elements 23x of each series are spaced from each other such as to define a series of winding chambers 24' (FIGS. 34 and 35) to accommodate the conducting wire forming the winding 14. This configuration of the winding tool 20X", which allows to mount the desired number of angular elements 23*x* onto the respective guides 231, with the desired pitch, allows to make windings 4 with the desired number of linear portions 4*a*, 4*b* and with the desired pitch distance between the linear portions 4*a*, 4*b*.

Figure 36:
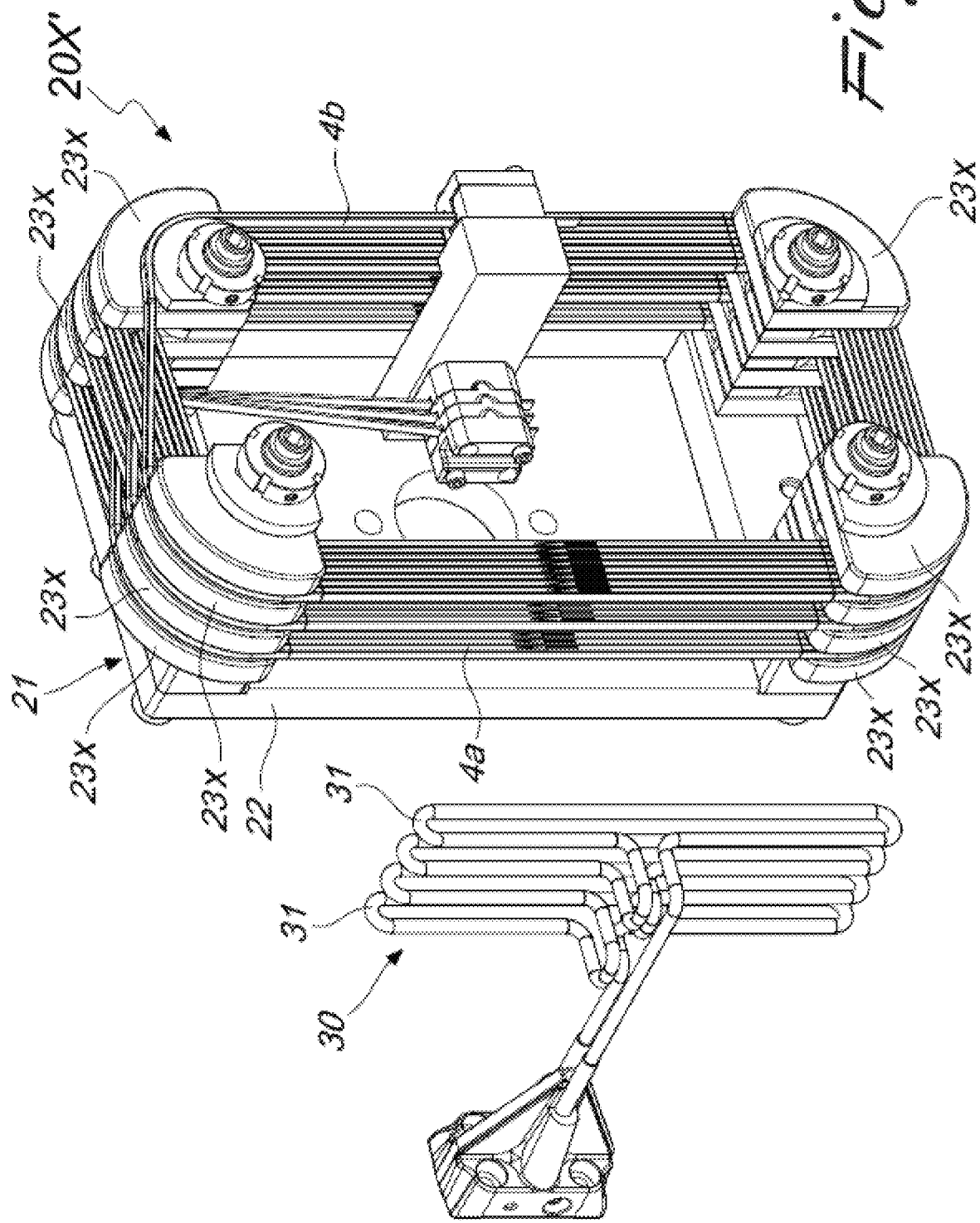
FIGS. 36 and 37 are perspective views which depict the two successive steps of the thermal treatment process performed on a winding housed on the winding tool of FIG. 32.
Figure 37:
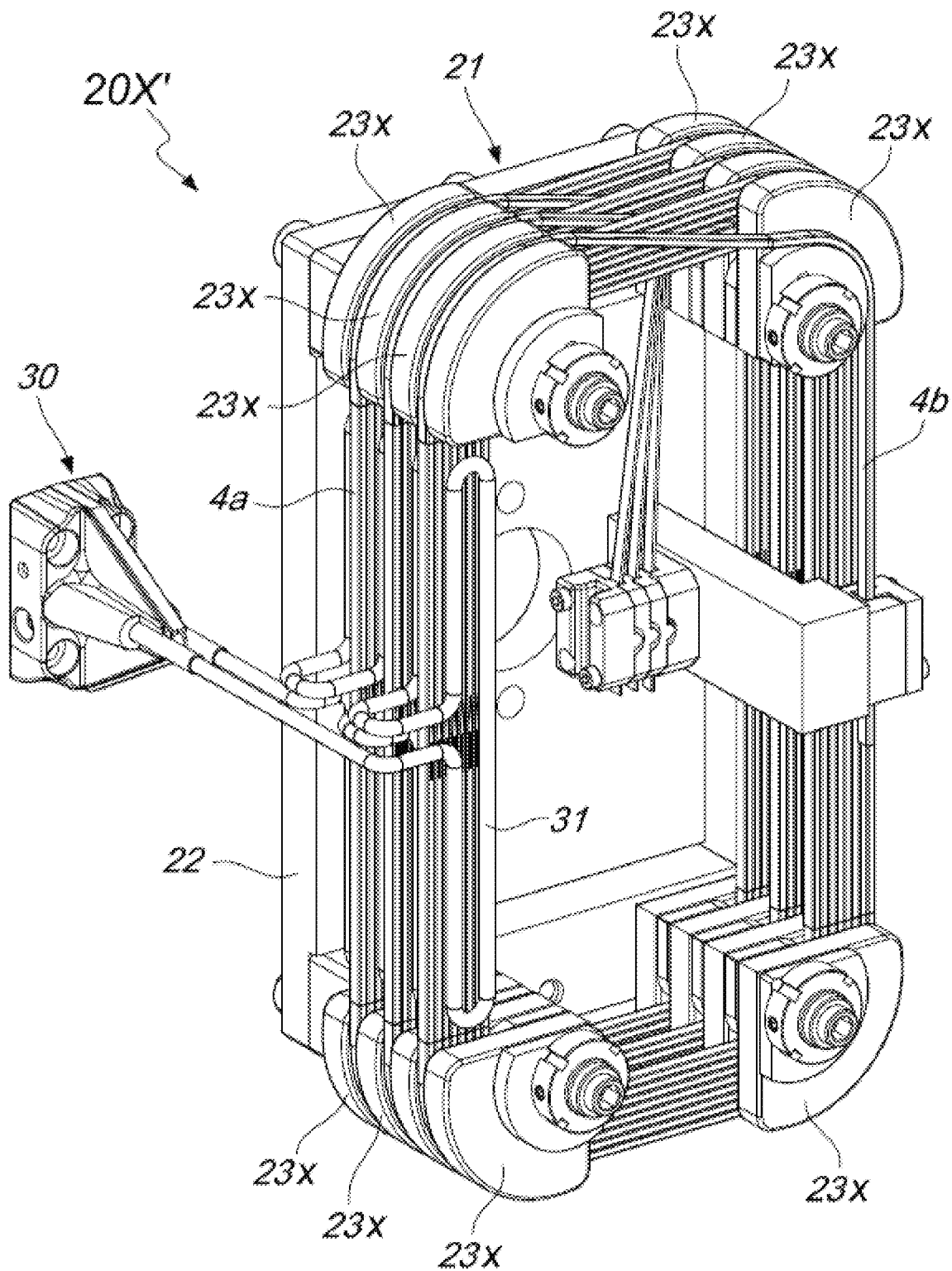

With reference to FIGS. 36 and 37, the heating device 30 comprises one or more heating elements 31, preferably by induction. These heating elements 31 are shaped and arranged such as to be inserted between the linear portions 4*a*, 4*b* of the windings 4, into contact with or adjacent thereto. It is possible to perform this operation while the winding 4 is still accommodated on the winding tool 20X' thanks to the fact that the linear portions 4*a*, 4*b* are left free.

Thus, these heating elements 31 have a longitudinal extent substantially equivalent to that of the linear portions 4*a*, 4*b* to be heated.

It should be noted that in the embodiment depicted, the heating elements 31 substantially form a comb of elements parallel to each other.

In practice, the heating elements 31 are inserted between the linear portions 4*a*, 4*b* of the windings, such as to heat them up to the carburizing temperature.

There is thus the time to remove the heating elements 31 and to insert, in their place, the pressing device 300 which presses the coil, by exploiting the thermal inertia of the material.

Figure 38:
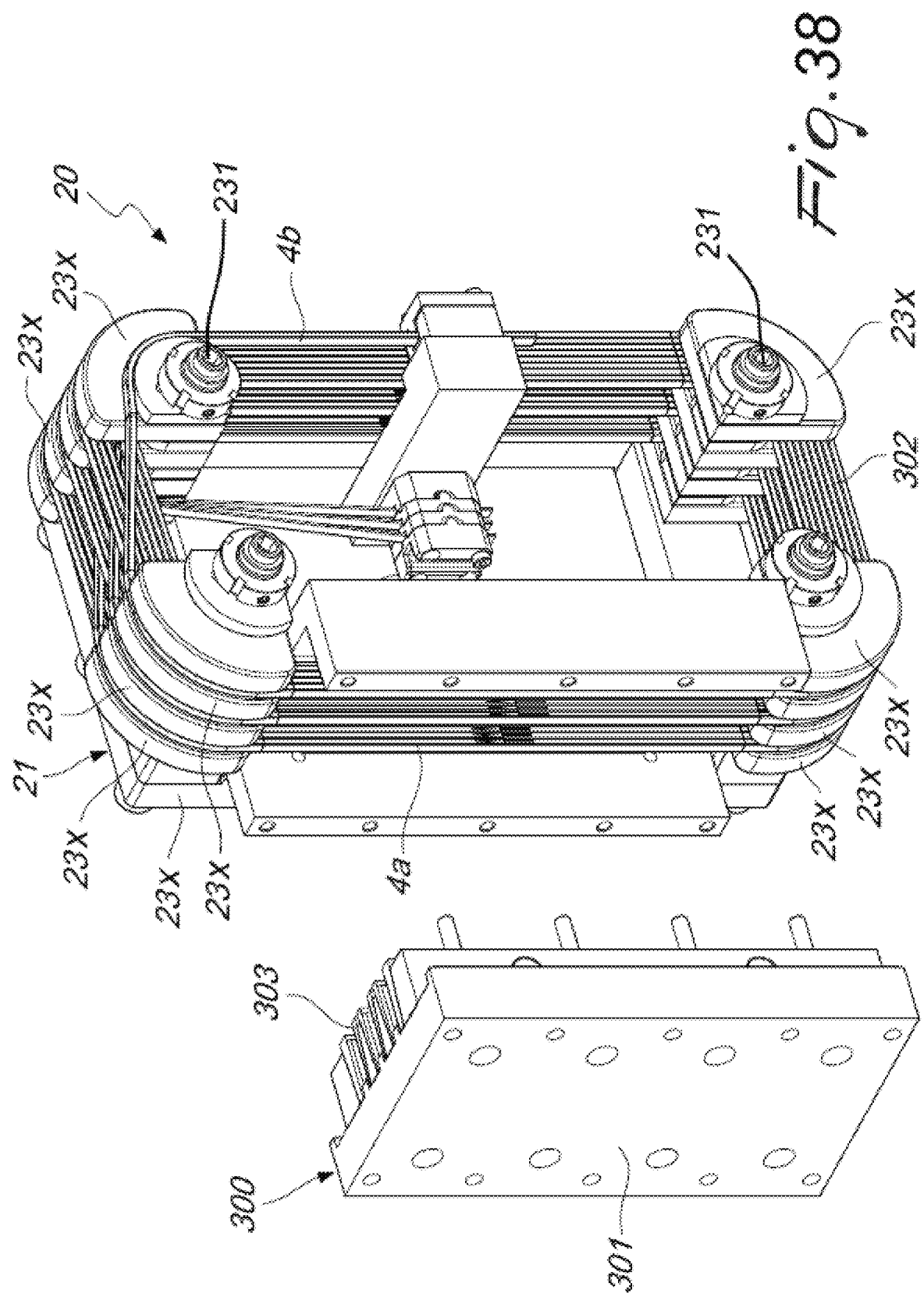
FIGS. 38 and 39 are perspective views which depict two successive steps of the pressing process performed on a winding housed on the winding tool of FIG. 32.
Figure 39:
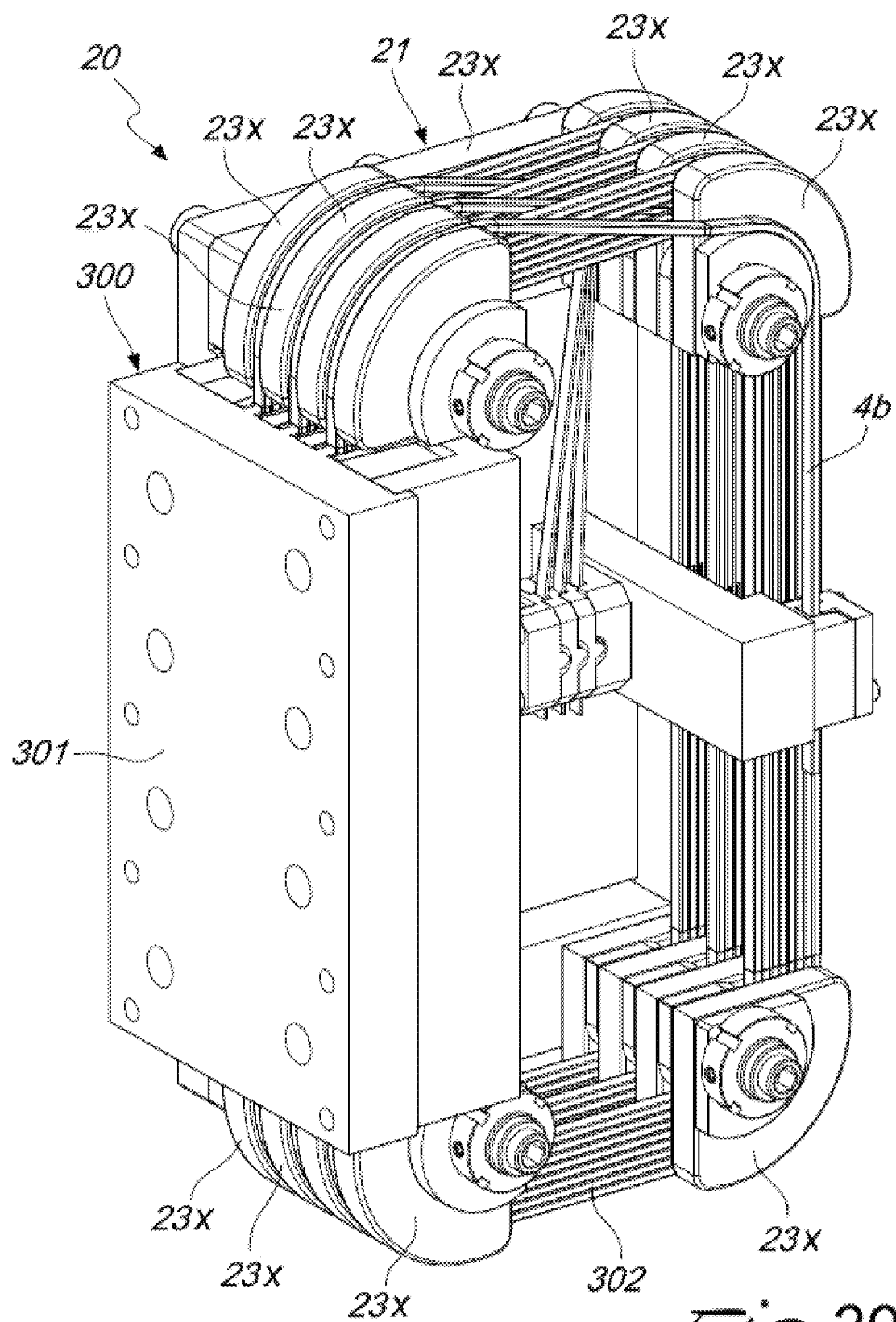
Figure 40:
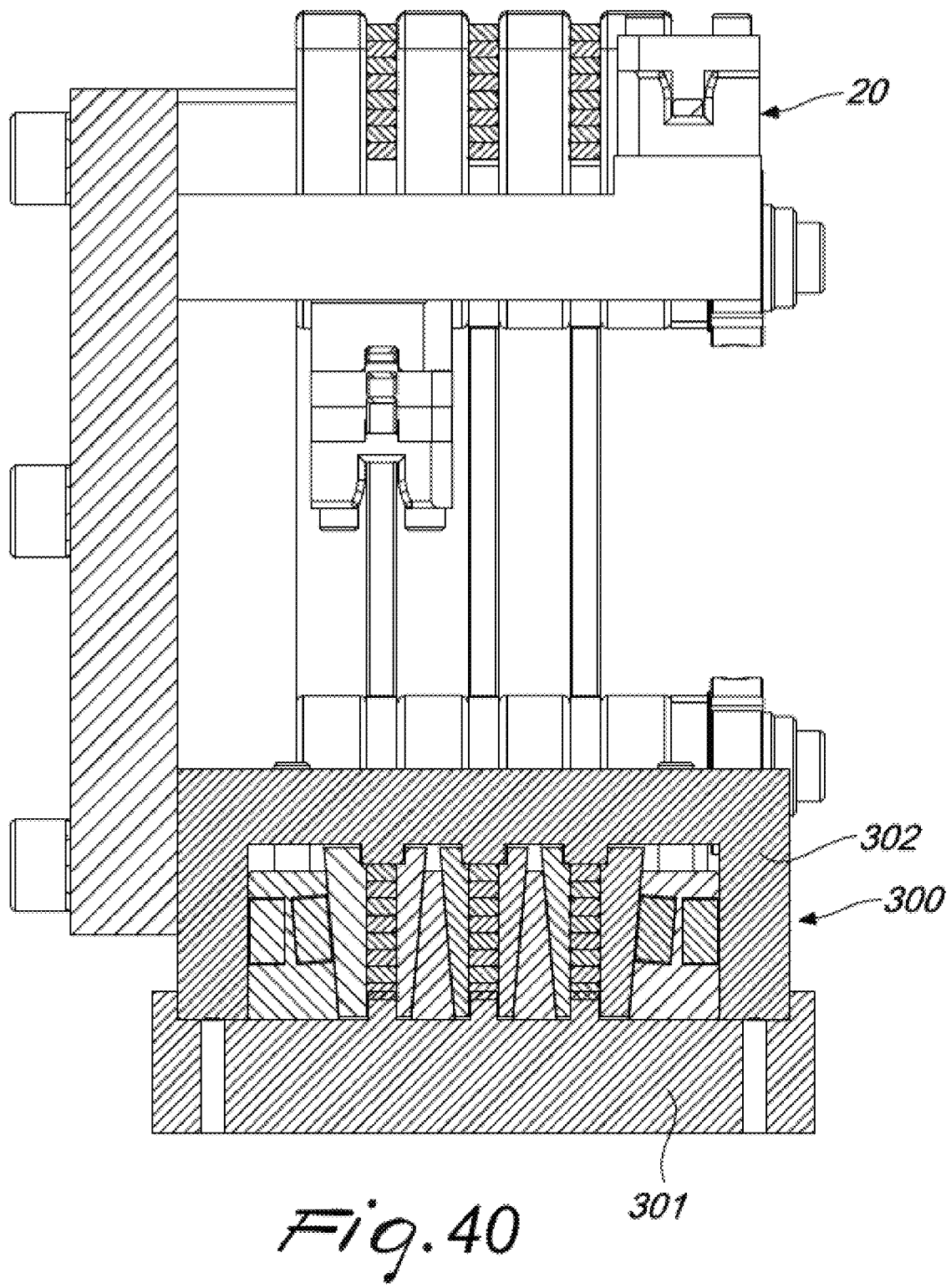
FIG. 40 is a top and partial sectional view of FIG. 39.

In the embodiment depicted, with reference to FIGS. 38 and 39, the pressing device 300 comprises a plate 301 with which a series of inclined planes 303 adapted to come into contact with the linear portions 4*a*, 4*b* to be pressed, is combined.

Advantageously, the plate 301 is inserted into, or is anyhow mechanically coupled to, a complementary counterplate 302 positioned on the opposite side of the linear portions 4*a*, 4*b*, which complementary counterplate 302 in practice acts as an abutment element.

The plate 301 is pushed by means of a thrust device (not depicted) against the counterplate 302. The inclined planes 303 are configured such as the moving of the plate 301 towards the counterplate 302 causes, by direct mechanical interaction, the compacting of the linear portions 4*a*, 4*b* of the winding.

Thus, the linear portions 4*a*, 4*b* of the coil are compacted to the desired dimensions by exploiting the force of the thrust device and the appropriately made inclined planes 303.

These carburizing and pressing operations can be made alternately or contemporaneously on the two sides of the winding tool 20X", depending on the cycle time required by the plant during production.

Conveniently, only the linear portions 4*a*, 4*b* of the winding 4 are pressed and/or subjected to thermal treatment, while the non linear portions (i.e. the parts of the winding 4 connecting the linear portions 4*a*, 4*b*, which are mainly curved and form the head of the winding 4) are left untreated such as to be able to easily shape them in the successive steps.

After the optional pressing and/or carburizing step B, when the winding 4 has cooled and thus solidified in the linear portions 4*a*, 4*b*, the winding 4 can be removed from the winding tool 20X, 20X".

Optionally, with reference to FIGS. 41 and 42, when, in the winding making step, a series of multiple windings 4 is made on the same winding tool 20X, 20X" such as a linear portion 4*a*, 4*b* of a winding 4 is spaced from the linear portion of the successive winding 4 by a predetermined pitch distance, a step of correcting the pitch between the windings is performed before the housing step on the jigs 2, 2' and comprises the steps of: making the series of windings 4 interact mechanically with a pitch-correcting device 50 configured to correct the pitch distance between the linear portions 4*a*, 4*b* of the different windings 4, the windings are taken and brought into the pitch-correcting device 50 for this purpose; and displacing the windings 4 by means of pliers 51 configured to keep said pitch distance between the linear portions 4*a*, 4*b* of the windings 4.

More in detail, the pitch-correcting device 50) comprises a series of longitudinal seats 55 parallel to each other inside which the linear portions 4*a*, 4*b* of the windings, defined inside longitudinal blocks 56 parallel to each other, are inserted.

Once the linear portions 4*a*, 4*b* are inserted into the longitudinal seats 55, the distance between them, and thus the pitch distance between the linear portions 4*a*, 4*b*, can be adjusted by modifying the distance between the longitudinal blocks 56 by means of adjustment elements 58 (such as for example screws or the like).

Additional adjustment elements 57 (for example screws) are also present to tighten the slits and to fasten the linear portions 4*a*, 4*b* during the adjustment.

Optionally, during the pitch-correcting process, it is possible to introduce insulating papers 59, which protect the same windings 4 from damages inside the stator 1, inside the windings 4 (preferably around the linear portions 4*a*, 4*b*).

At this point, the windings 4 are ready to be positioned on the jigs 2, 2", as previously described and as shown in FIGS. 2-5, by means of a movement apparatus (not shown) which comprises the aforesaid pliers 51 and further devices of known type (for example arms, kinematic chains, etc.) selected according to the requirements.

With reference to FIGS. 6-9, the method according to the invention provides an assembling step D, which consists in inserting, from the inside (i.e. from the central axis Y towards the outside), a plurality of first stator portions 6 between the linear wire portions 4*a*, 4*b*.

In the preferred embodiments, such first stator portions 6 comprise an enlarged end 61 which, after having been inserted, remains inside the stator body 10 between the linear wire portions 4*a*, 4*b* and the central axis Y. The joining of the enlarged ends 61 defines the cylindrical inner surface of the stator 10.

In practice, these enlarged ends form the "pole shoes" of the stator, as visible in FIG. 9.

The first stator portions 6 then have a portion of radial extent 62 that is inserted between the linear wire portions 4*a*, 4*b*.

After (or alternatively before) having inserted the first stator portions 6, a plurality of second stator portions 7 complementary to the first stator portions 6 is inserted, from the outside (thus in direction of the central axis Y), between the linear wire portions 4*a*, 4*b*.

Preferably, the second stator portions 7 are substantially wedge-shaped and, more in detail, comprise an enlarged base 71 which remains outside the linear wire portions 4*a*, 4*b* after having been inserted, thus contributing to form a cylindrical outer surface of the stator body 10.

Figure 8:
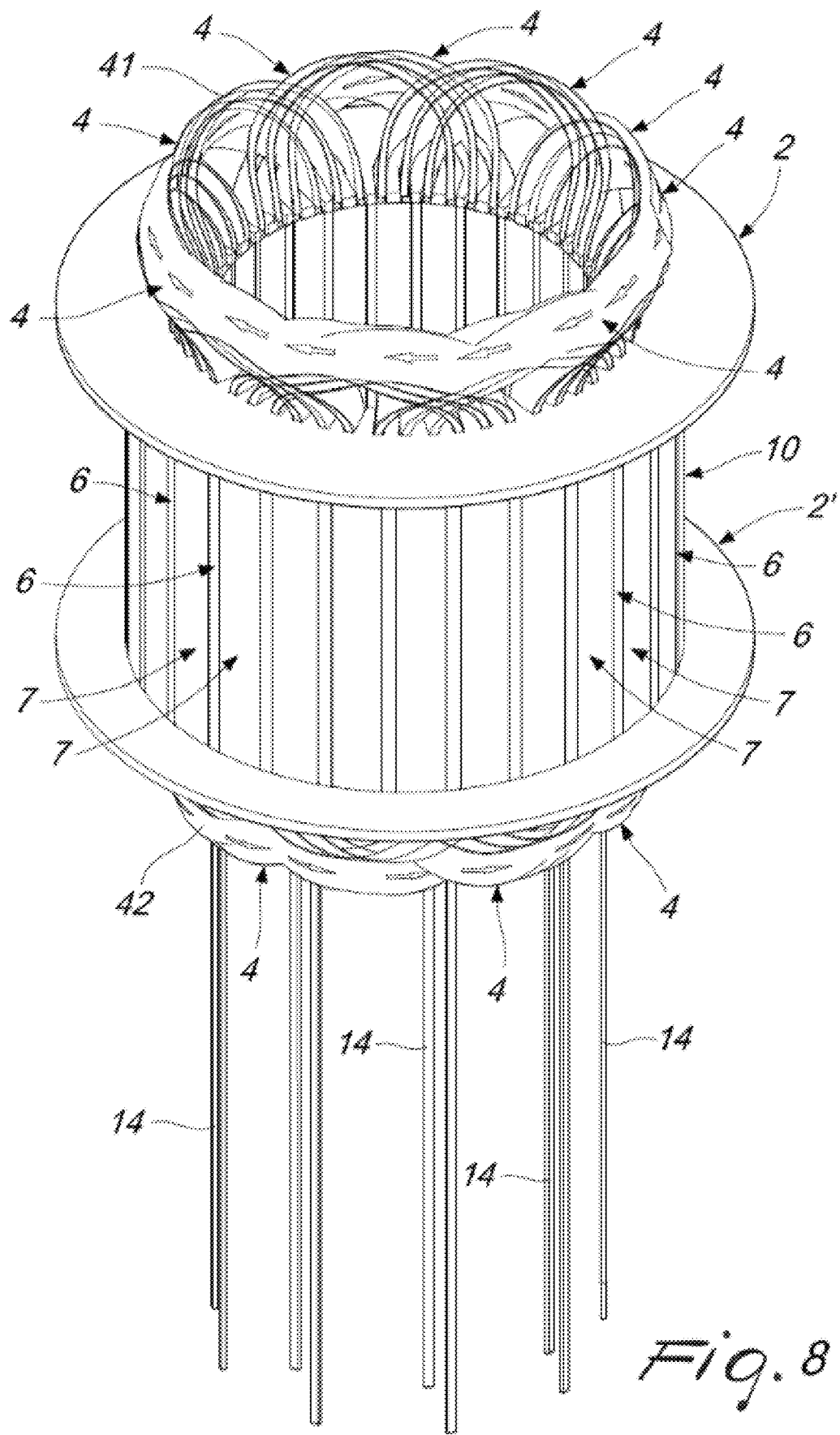
FIG. 8 shows the conclusion of the inserting stage of the second stator portions and thus of the stator body formed.

The first 6 and second 7 portions are inserted alternately, such as each second portion 7 matches at least in part with an adjacent first portion 6, such as the joining of such first 6 and second 7 stator portions forms a single stator body 10 including the linear wire portions 4*a*, 4*b* inside separate sectors 3, which are defined between the aforesaid first 6 and second 7 stator portions (as depicted in FIGS. 8 and 9). In practice, the first 6 and second 7 stator portions form the stator teeth, in the finished stator body 10.

Preferably, all the first portions 6 are inserted first and successively all the second portions 7, but the stator portions 6, 7 can be inserted in any order depending on the design decisions: they can be inserted one at a time, or firstly all the first sectors 6 contemporaneously and then all the second sectors contemporaneously (or vice-versa) or alternately.

The insertion of the stator portions 6, 7 is carried out with an appropriate industrial manipulator.

The shape of the portions 6, 7 is not binding: the one shown in the figures is, in fact, only an example. In general, it is wedge-shaped but the corners and aspect ratio can change between different embodiments according to the requirements.

At this point, the stator body 10 can be delivered to successive processing steps of known type which can comprise: pressing and welding the stator body 10 or direct insertion of the stator body 10 into a stator case, binding of the winding heads (the non linear portion 41 and 42 of the wires 14 coming out of the sectors 3), shaping and/or pressing them, impregnation of the stator body, etc.

Specific templates can be made on the outer diameter of the stator body 10 depending on the requirements; for example, cavities with undercuts or substantially semicircular niches. Preferably, the jigs 2, 2' are removed before the successive steps.

In a first particular embodiment, after having inserted stator portions 6, 7, the same are fixed to each other by means of a welding process, preferably by laser.

In another embodiment, the stator portions 6, 7 are mechanically locked in position by inserting an outer ring, by jointing it.

It should further be noted that the inner enlarged ends of the teeth 61 ("pole shoes"), which consist of the first stator portions 6, can be moved close to each other up to the minimal desirable distance such as to minimize the noise phenomena, in particular, torque ripples and efficiency losses.

It is thus advantageously possible to decrease the total number of sectors 3 to be assembled.

Figure 43:
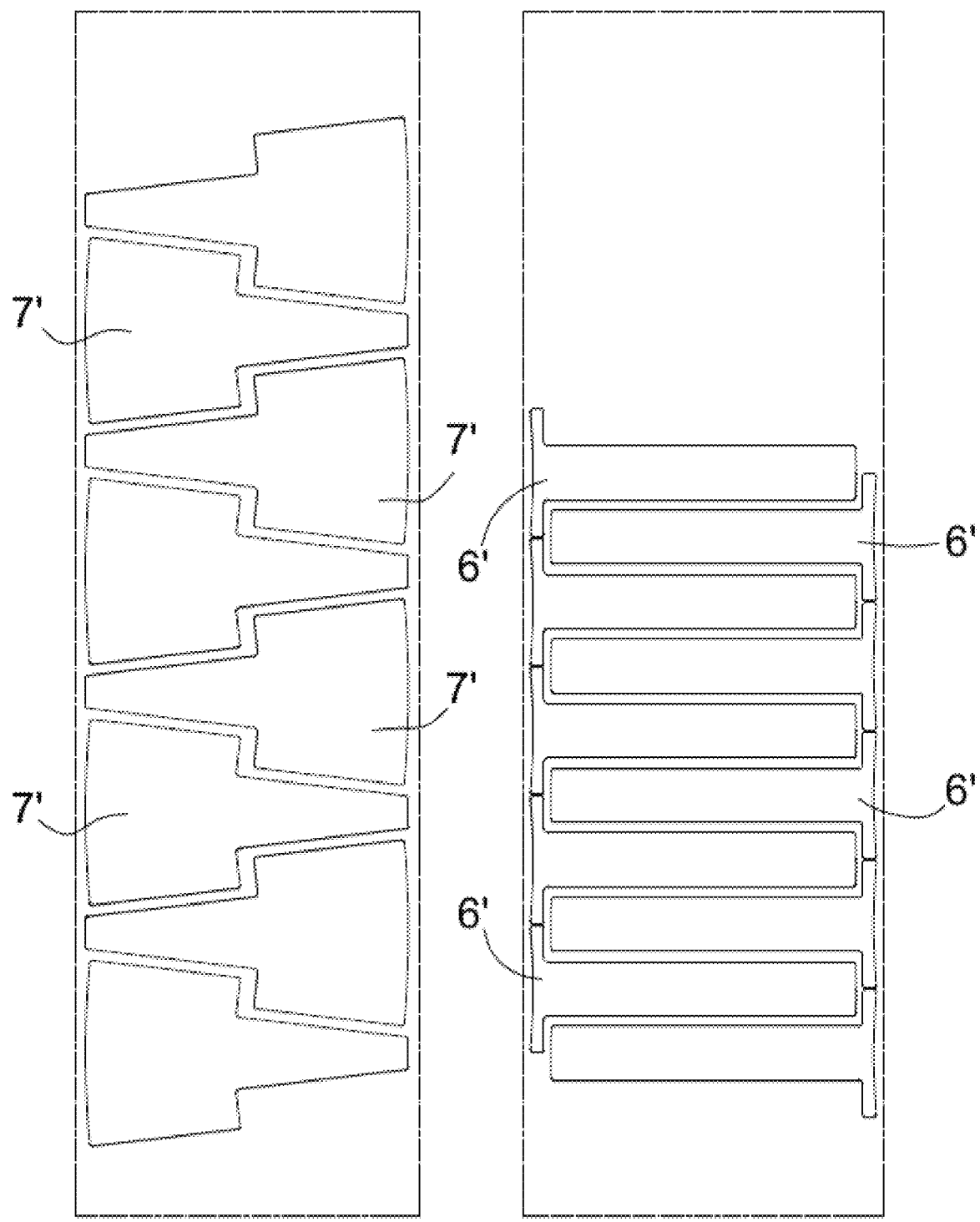
FIG. 43 is a plan view of a possible blanking layout adapted for making components of the stator.

FIG. 43 shows a possible blanking configuration as far as the making of the stator portions 6, 7 is concerned. Each stator portion 6, 7 is in fact made by stacking an appropriate number of laminations 6', 7' until reaching a desired stator height.

The blanking configuration shown in FIG. 43 allows to minimize the processing waste. This can be easily understood by comparing FIG. 43 with a possible die of a whole circular-shaped stator; in this case, the excess material along the outer edges (and often also that in the center) is discarded.

Moreover, the machine adapted for blanking whole circular stators must be of considerable size in order to perform the operation "in one go". The simplicity of the blanking layout of FIG. 43 instead implies the use of a blanking machine of little size.

Both factors, i.e. the minimization of the waste and the downgrading of the blanking machine, thus lead to an optimization of the total manufacturing costs.

A first advantage of the method according to the present invention thus consists in that it is easy to make and economically competitive with respect to the known art.

A further advantage of the method according to the present invention consists in that it improves the filling factor of the sectors inside the stator.

The Applicant has calculated that, all other factors being equal, the method according to the present invention allows to increase the filling factor of a percentage value between 15% and 30%.

Consequently, an electric motor built with a stator directly obtained with the method described herein allows to achieve better performances with respect to a motor built with a traditional stator, all other conditions being equal, in particular in terms of efficiency, vibrations and noises.

The table 1 hereunder is the result of a simulation carried out by the Applicant: it is the calculation of the efficiency of two motors with equal characteristics, one named DHD, which incorporates a stator directly obtained with the method described herein, and the other named standard insertion one, which incorporates a stator obtained with a traditional method of inserting the windings of conducting wire, within a range of 0-10,000 revolutions per minute of motor rotation.

TABLE 1

| Speed [RPM] | Efficiency DHD [%] | Efficiency Standard insertion [%] | Variations [%] | Delta intervals [%] |
|---|---|---|---|---|
| 1000 | | | | |
| 2000 | | | | |
| 3000 | | | | 0.7% |
| 3250 | 96.94 | 96.06 | −0.91% | |
| 4000 | | | | −0.7% |
| 5000 | | | | |
| 6000 | | | | 0.7% |
| 7000 | 94.9 | 93.5 | −1.48% | |
| 8000 | | | | −0.7% |
| 9000 | | | | 0.7% |
| 10000 | 92.45 | 90.50 | −2.11% | |
| | | | | −0.7% |

Table 1 shows that at three values representative of the number of revolutions of the motor, measured in revolutions per minute, RPM, i.e. 3250 RPM, 7000 RPM and 10,000 RPM, the DHD motor provides a significantly greater efficiency, also considering an uncertainty between −0.7% and +0.7%.

Figure 44:
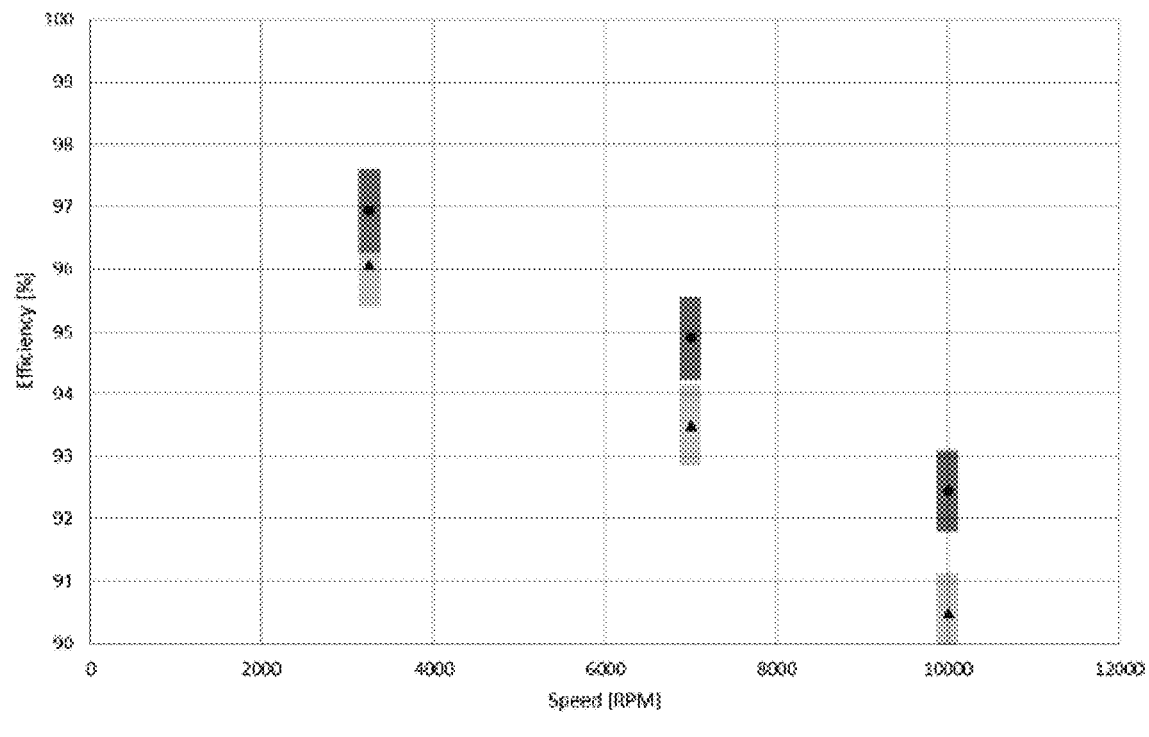
FIG. 44 is a comparative diagram of the efficiency, with respect to the rotation speed (expressed in number of revolutions), of a motor provided with a stator according to the present invention, compared to the same motor provided with a stator obtained with a traditional coil inserting technique.

In fact, at 3250 RPM the efficiency of the DHD motor is greater than 0.91%, at 7000 RPM the efficiency is greater than 1.48% and at 10,000 RPM the efficiency is greater than 2.11%. FIG. 44 is a graph showing the information contained in table 1.

A further advantage of the method according to the present invention consists in that it reduces the torque ripple (torque ripple and cogging) phenomena in the stator. The table 2 hereunder is the result of a simulation carried out by the Applicant: it is the calculation of the torque ripple of two motors with equal characteristics, one named DHD, which incorporates a stator directly obtained with the method described herein, and the other named standard insertion one, which incorporates a stator obtained with a traditional method of inserting the windings of conducting wire, within a range of 0-10,000 revolutions per minute of motor rotation.

TABLE 2

| Speed of rotation [RPM] | Ripple DHD [Nm] | Ripple Standard insertion [Nm] | Variations [%] | Delta Intervals [%] |
|---|---|---|---|---|
| 1000 | | | | |
| 2000 | | | | |
| 3000 | | | | 6% |

TABLE 2-continued

| Speed of rotation [RPM] | Ripple DHD [Nm] | Ripple Standard insertion [Nm] | Variations [%] | Delta Intervals [%] |
|---|---|---|---|---|
| 3250 | 29.3324 | 32.0087 | −8.36% | |
| 4000 | | | | −6% |
| 5000 | | | | |
| 6000 | | | | |
| 7000 | | | | |
| 8000 | | | | |
| 9000 | | | | 6% |
| 10000 | 27.714 | 34.000 | −18.49% | |
| | | | | −6% |

Table 2 shows that at two values representative of the number of revolutions of the motor, measured in revolutions per minute, RPM, i.e. 3250 RPM and 10,000 RPM, the DHD motor provides a significantly smaller torque ripple, also considering an uncertainty between-6% and +6%.

In fact, at 3250 RPM, torque ripple of the DHD motor, measured in Nm, is less than a percentage value equal to 8.36% and at 10,000 RPM torque ripple of the DHD motor is less than a percentage value equal to 18.49%.

Figure 45:
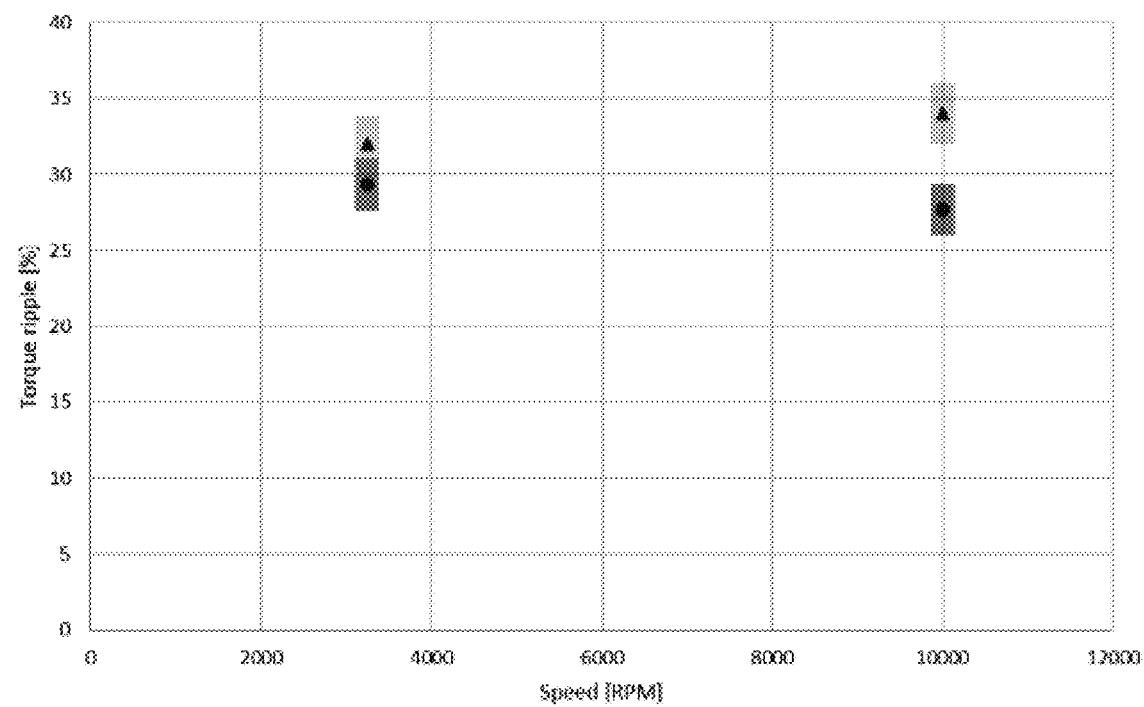
FIG. 45 is a comparative diagram of the torque ripple phenomena, with respect to the rotation speed (expressed in number of revolutions), of a motor provided with a stator according to the present invention, compared to the same motor provided with a stator obtained with a traditional coil inserting technique.

FIG. 45 is a graph showing the information contained in table 2.

The invention claimed is:

1. Method for the making of a stator for electric motors comprising a stator body which comprises a plurality of stator teeth arranged radially about a common central axis and defining, between them, sectors in which one or more windings of conducting wire are at least partially inserted, characterized by:
providing two jigs, each of which has an inner circumference defining a circular opening inside the jig and a series of teeth arranged along the inner circumference and jutting out inside the circular opening towards a common central axis, said teeth defining, between them, a series of slots;
arranging the two jigs coaxially, centered on said common central axis and spaced along said central axis;
arranging or forming, between the teeth of the jigs, a plurality of windings of conducting wires, such as the conducting wires of each winding occupy a plurality of said slots of both jigs, said windings comprising linear wire portions extending between the two jigs;
inserting, from the inside, a plurality of first stator portions between said linear wire portions;
inserting, from the outside, a plurality of second stator portions complementary to the first stator portions between the linear wire portions, such as the joining of said first and second stator portions forms a stator body which includes said linear wire portions inside separate sectors which are defined between said first and second stator portions.

2. Method according to claim 1, wherein said first stator portions comprise an enlarged end which, after having been inserted, remains inside the stator body between linear wire portions and the central axis, and a portion of radial extent that is inserted between the linear wire portions.

3. Method according to claim 2, wherein the enlarged ends of the first stator portions define together the inner cylindrical surface of the stator.

4. Method according to claim 1, wherein said second stator portions are substantially wedge-shaped and comprise an enlarged base which, after having been inserted, remains outside the linear wire portions, thus contributing to form an outer surface of the stator body.

5. Method according to claim 1, wherein said jigs are substantially shaped like a circular crown in plan.

6. Method according to claim 1, comprising:
fixing said stator portions to each other by means of a welding process, preferably by laser.

7. Method according to claim 1, comprising:
mechanically locking said stator portions in position with an outer ring.

8. Method according to claim 1, wherein a step of pressing and/or carburizing said linear wire portions of the windings is performed before positioning them on the jigs (2, 2') or before inserting said stator portions.

9. Method according to claim 8, wherein the pressing and carburizing of the linear wire portions are both performed in the desired order or contemporaneously.

10. Method according to claim 1, wherein the windings are made on a winding tool such as to be successively removed from and positioned on said jigs, or are formed directly onto the jigs.

11. A stator for electric motors, which is directly obtained with the method according to claim 1.

12. A stator for electric motors, comprising a body extending about a central axis and a plurality of windings of conducting wire each having at least one linear wire portion, wherein the linear wire portions are arranged parallel to the central axis and are distributed circumferentially about the central axis at a constant pitch, wherein the body comprises a plurality of first stator portions inserted between said linear wire portions, which radially jut out in the direction opposite the central axis, and a plurality of second stator portions, complementary to the first stator portions, inserted between said linear wire portions and between said first stator portions, radially jutting out towards the central axis, and wherein the linear wire portions are encapsulated between said first and said second stator portions.

13. Stator according to claim 12, wherein the first stator portions comprise an enlarged end lying on an inner circumference of the stator body and a wedge-shaped portion of radial extent inserted between the linear wire portions.

14. Stator according to claim 12, wherein the second stator portions comprise an enlarged base, which lies on an outer circumference of the stator body, and a wedge-shaped portion of radial extent inserted between the linear wire portions and the first stator portions.

15. Stator according to claim 12, wherein the first stator portions are welded to the second stator portions.

* * * * *